(12) United States Patent
Kim et al.

(10) Patent No.: US 12,549,740 B2
(45) Date of Patent: *Feb. 10, 2026

(54) INTER-PREDICTION METHOD AND APPARATUS FOR SAME

(71) Applicants: Electronics and Telecommunications Research Institute, Daejeon (KR); University-Industry Cooperation Group of Kyung Hee University, Yongin-si (KR)

(72) Inventors: Hui Yong Kim, Daejeon (KR); Gwang Hoon Park, Seongnam-si (KR); Kyung Yong Kim, Suwon-si (KR); Sung Chang Lim, Daejeon (KR); Jin Ho Lee, Daejeon (KR); Jin Soo Choi, Daejeon (KR); Jin Woong Kim, Daejeon (KR)

(73) Assignees: Electronics and Telecommunications Research Institute, Daejeon (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/890,884

(22) Filed: Sep. 20, 2024

(65) Prior Publication Data

US 2025/0016332 A1   Jan. 9, 2025

Related U.S. Application Data

(63) Continuation of application No. 18/300,282, filed on Apr. 13, 2023, now Pat. No. 12,126,815, which is a
(Continued)

(30) Foreign Application Priority Data

Jun. 21, 2011   (KR) .................. 10-2011-0060285
Jul. 1, 2011    (KR) .................. 10-2011-0065714
(Continued)

(51) Int. Cl.
  *H04N 19/159*   (2014.01)
  *H04N 19/105*   (2014.01)
(Continued)

(52) U.S. Cl.
  CPC ......... *H04N 19/159* (2014.11); *H04N 19/105* (2014.11); *H04N 19/109* (2014.11);
(Continued)

(58) Field of Classification Search
  None
  See application file for complete search history.

(56) References Cited

U.S. PATENT DOCUMENTS 7,154,952 B2    12/2006  Tourapis et al.
2004/0047418 A1  3/2004  Tourapis et al.
(Continued)

FOREIGN PATENT DOCUMENTS

JP    2010-268199 A     11/2010
KR  10-2005-0118965 A   12/2005
(Continued)

OTHER PUBLICATIONS

Lin et al., "Fast temporal prediction selection for H.264/AVC scalable video coding," Proc. IEEE Int. Conf. Image Process, 2009, pp. 3425-3428.
(Continued)

*Primary Examiner* — Rebecca A Volentine
(74) *Attorney, Agent, or Firm* — Michael Best & Friedrich LLP

(57) ABSTRACT

An inter-prediction method according to the present invention comprises the steps of: deriving motion information of
(Continued)

a current block; and generating a prediction block for the current block on the basis of the derived motion information. According to the present invention, computational complexity can be reduced and encoding efficiency can be improved.

11 Claims, 26 Drawing Sheets

Related U.S. Application Data continuation of application No. 17/857,765, filed on Jul. 5, 2022, now Pat. No. 11,706,423, which is a continuation of application No. 17/198,720, filed on Mar. 11, 2021, now Pat. No. 11,412,231, which is a continuation of application No. 16/696,319, filed on Nov. 26, 2019, now Pat. No. 10,986,348, which is a continuation of application No. 16/107,208, filed on Aug. 21, 2018, now Pat. No. 10,536,704, which is a continuation of application No. 15/810,867, filed on Nov. 13, 2017, now Pat. No. 10,085,031, which is a continuation of application No. 15/337,309, filed on Oct. 28, 2016, now Pat. No. 9,854,248, which is a continuation of application No. 14/127,617, filed as application No. PCT/KR2012/004882 on Jun. 20, 2012, now Pat. No. 9,532,042.

(30) Foreign Application Priority Data

| | | | |
|---|---|---|---|
| Jul. 4, 2011 | (KR) | ........................ | 10-2011-0066173 |
| Jan. 18, 2012 | (KR) | ........................ | 10-2012-0005948 |
| Jun. 20, 2012 | (KR) | ........................ | 10-2012-0066191 |

(51) Int. Cl.

| | |
|---|---|
| H04N 19/109 | (2014.01) |
| H04N 19/117 | (2014.01) |
| H04N 19/124 | (2014.01) |
| H04N 19/13 | (2014.01) |
| H04N 19/139 | (2014.01) |
| H04N 19/15 | (2014.01) |
| H04N 19/176 | (2014.01) |
| H04N 19/52 | (2014.01) |
| H04N 19/61 | (2014.01) |

(52) U.S. Cl.
CPC ......... *H04N 19/117* (2014.11); *H04N 19/124* (2014.11); *H04N 19/13* (2014.11); *H04N 19/139* (2014.11); *H04N 19/15* (2014.11); *H04N 19/176* (2014.11); *H04N 19/52* (2014.11); *H04N 19/61* (2014.11)

(56) References Cited

U.S. PATENT DOCUMENTS

| | | |
|---|---|---|
| 2004/0066848 A1 | 4/2004 | Jeon |
| 2004/0258153 A1 | 12/2004 | Linzer |
| 2005/0062885 A1 | 3/2005 | Kadono et al. |
| 2006/0209959 A1 | 9/2006 | Sun |
| 2006/0268166 A1 | 11/2006 | Bossen et al. |
| 2009/0067505 A1 | 3/2009 | Tourapis et al. |
| 2009/0190655 A1* | 7/2009 | Shimada ............... H04N 19/164 375/E7.076 |
| 2009/0257664 A1 | 10/2009 | Kao et al. |
| 2010/0208818 A1 | 8/2010 | Mn et al. |
| 2010/0266042 A1 | 10/2010 | Koo et al. |
| 2011/0007802 A1 | 1/2011 | Karczewicz et al. |
| 2011/0261882 A1 | 10/2011 | Zheng et al. |
| 2012/0027089 A1 | 2/2012 | Chien et al. |
| 2012/0134416 A1 | 5/2012 | Lin et al. |
| 2012/0189053 A1 | 7/2012 | Chen et al. |
| 2012/0236941 A1 | 9/2012 | Lin et al. |
| 2012/0250765 A1 | 10/2012 | Wu et al. |
| 2012/0269270 A1 | 10/2012 | Chen et al. |
| 2012/0307902 A1 | 12/2012 | Sugio et al. |
| 2012/0320968 A1 | 12/2012 | Zheng et al. |
| 2013/0003850 A1 | 1/2013 | Sugio et al. |
| 2014/0003521 A1 | 1/2014 | Lee et al. |
| 2014/0023144 A1 | 1/2014 | Park et al. |
| 2014/0049605 A1 | 2/2014 | Chen et al. |
| 2014/0133560 A1 | 5/2014 | Kim et al. |

FOREIGN PATENT DOCUMENTS

| | | |
|---|---|---|
| KR | 10-2009-0129412 A | 12/2009 |
| KR | 10-2399001 B1 | 5/2022 |

OTHER PUBLICATIONS

Li et al., "Redundancy reduction in B-frame coding at temporal level zero," Collaborative Team on Video Coding (JCT-VC) of ITU-T SG16 WP3 and ISO/IEC JTC/SC29/WG11, 3rd Meeting: Guangzhou, CN, Oct. 7-15, 2010, pp. 1-6.

International Search Report issued on Dec. 18, 2012 in counterpart International Patent Application No. PCT/KR2012/004882 (3 pages, in Korean).

* cited by examiner

FIG. 6
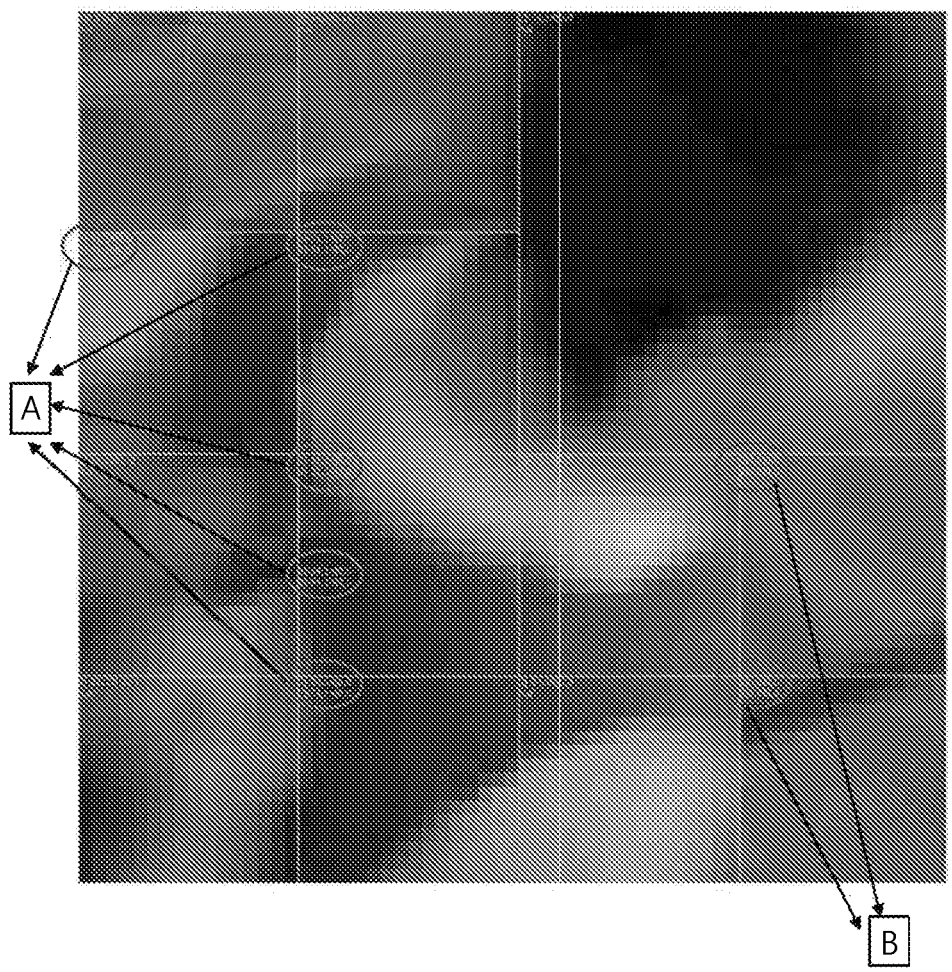
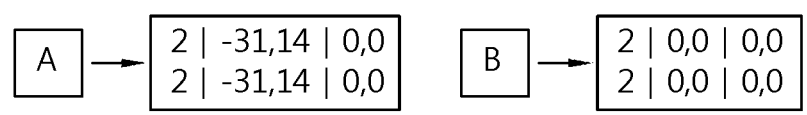

MC : MOTION COMPENSATION
W.MC : WEIGHTING MC
MV : MOTION VECTOR
RP : REFERENCE PICTURE

INTER-PREDICTION METHOD AND APPARATUS FOR SAME

CROSS-REFERENCE TO RELATED APPLICATIONS

This application is a continuation of application Ser. No. 18/300,282, filed on Apr. 13, 2023, which is a continuation of application Ser. No. 17/857,765, filed on Jul. 5, 2022, now U.S. Pat. No. 11,706,423, which is a continuation of application Ser. No. 17/198,720, filed on Mar. 11, 2021, now U.S. Pat. No. 11,412,231 issued on Aug. 9, 2022, which is a continuation of application Ser. No. 16/696,319 filed on Nov. 26, 2019, now U.S. Pat. No. 10,986,348 issued on Apr. 20, 2021, which is a continuation of application Ser. No. 16/107,208 filed on Aug. 21, 2018, now U.S. Pat. No. 10,536,704 issued on Apr. 14, 2020, which is a continuation of application Ser. No. 15/810,867 filed on Nov. 13, 2017, now U.S. Pat. No. 10,085,031 issued on Sep. 25, 2018, which is a continuation of application Ser. No. 15/337,309 filed on Oct. 26, 2016, now U.S. Pat. No. 9,854,248 issued on Dec. 26, 2017, which is a continuation of application Ser. No. 14/127,617 having a 371 (c) date of Dec. 19, 2013, now U.S. Pat. No. 9,532,042 issued on Dec. 27, 2016, which is a U.S. national stage application of International Application No. PCT/KR2012/004882 filed on Jun. 20, 2012, which claims the benefit of Korean Patent Applications Nos. 10-2011-0060285, filed on Jun. 21, 2011, 10-2011-0065714, filed on Jul. 1, 2011, 10-2011-0066173, filed on Jul. 4, 2011, 10-2012-0005948, filed on Jan. 18, 2012, and 10-2012-0066191, filed on Jun. 20, 2012, in the Korean Intellectual Property Office, the entire disclosures of which are incorporated herein by reference for all purposes.

TECHNICAL FIELD

The present invention relates to image processing, and more particularly, to inter prediction method and apparatus.

BACKGROUND ART

Recently, in accordance with the expansion of broadcasting services having high definition (HD) resolution in the country and around the world, many users have been accustomed to a high resolution and definition image, such that many organizations have attempted to develop the next-generation image devices. In addition, as the interest in HDTV and ultra high definition (UHD) having a resolution four times higher than that of HDTV have increased, a compression technology for a higher-resolution and higher-definition image has been demanded.

For image compression, an inter prediction technology of predicting pixel values included in a current picture from a picture before and/or after the current picture, an intra prediction technology of predicting pixel values included in a current picture using pixel information in the current picture, an entropy encoding technology of allocating a short code to symbols having a high appearance frequency and a long code to symbols having a low appearance frequency, or the like, may be used.

SUMMARY OF INVENTION

Technical Problem

The present invention provides image encoding method and apparatus capable of reducing calculation complexity and improving encoding efficiency.

The present invention provides image decoding method and apparatus capable of reducing calculation complexity and improving encoding efficiency.

The present invention provides inter prediction method and apparatus capable of reducing calculation complexity and improving encoding efficiency.

The present invention provides merge candidate determining method and apparatus capable of reducing calculation complexity and improving encoding efficiency.

The present invention provides motion information determining method and apparatus capable of reducing calculation complexity and improving encoding efficiency.

The present invention provided temporal motion information deriving method and apparatus capable of reducing calculation complexity and improving encoding efficiency.

Technical Solution

In an aspect, an inter prediction method is provided. The inter prediction method includes: deriving motion information of a current block; and generating a prediction block for the current block based on the derived motion information; wherein the derived motion information includes both of L0 motion information and L1 motion information, in the generating of the prediction block, one of uni-prediction and bi-direction is optionally performed, and the uni-prediction is prediction performed based on the L0 motion information and the bi-prediction is prediction performed based on the L0 motion information and the L1 motion information.

The L0 motion information may include an L0 motion vector and an L0 reference picture number, the L0 reference picture number may be a number assigned to an L0 reference picture according to a picture order count (POC) order, the L1 motion information may include an L1 motion vector and an L1 reference picture number, and the L1 reference picture number may be a number assigned to an L1 reference picture according to the POC order, and in the generating of the prediction block, one of the uni-prediction and the bi-prediction may be optionally performed according to whether the L0 motion information and the L1 motion information are the same, and when the L0 motion vector and the L1 motion vector are the same and the L0 reference picture number and the L1 reference picture number are the same, it may be determined that the L0 motion information and the L1 motion information are the same.

When the L0 motion information and the L1 motion information are the same, in the generating of the prediction block, the prediction block may be generated by performing the L0 motion compensation on the current block based on the L0 motion information.

When the L0 motion information and the L1 motion information are not the same, the generating of the prediction block may further include: generating an L0 motion compensated block by performing L0 motion compensation on the current block based on the L0 motion information; generating an L1 motion compensated block by performing L1 motion compensation on the current block based on the L1 motion information; and generating the prediction block by performing a weighting average on the L0 motion compensated block and the L1 motion compensated block.

When the L0 motion information and the L1 motion information are the same, the generating of the prediction block may include: generating an L0 motion compensated block by performing the L0 motion compensation on the current block based on the L0 reference picture; generating an L1 motion compensated block by performing the L1 motion compensation on the current block based on a reference picture that is not the same as the L1 reference picture among reference pictures configuring an L1 reference picture list; and generating the prediction block by performing a weighting average on the L0 motion compensated block and the L1 motion compensated block.

When the number of reference pictures included in the L1 reference picture list is one or less, in the generating of the prediction block, the prediction block may be generated by performing L0 motion compensation on the current block based on the L0 motion information.

The inter prediction method may further includes: determining whether default weighting prediction is applied to the current block or non-default weighting prediction is applied thereto; in the generating of the prediction block, one of the default weighting prediction and the non-default weighting prediction is optionally performed according to the determination results.

Whether the default weighting prediction is applied to the current block or the non-default weighting prediction is applied thereto may be indicated by a weighting prediction index.

In the generating of the prediction block, one of the uni-prediction and the bi-prediction may be optionally performed according to whether a size of the current block is smaller than a predetermined size.

The inter prediction method may further include: when the size of the current block is smaller than 8×8, setting only the L0 motion information among the L0 motion information and the L1 motion information as the motion information of the current block, wherein in the generating of the prediction block, the prediction block may be generated by performing L0 motion compensation on the current block based on the L0 motion information.

In another aspect, an inter prediction apparatus is provided. The inter prediction apparatus includes: a motion estimator configured to derive motion information of a current block; and a motion compensator configured to generate a prediction block for the current block based on the derived motion information, wherein the derived motion information includes both of L0 motion information and L1 motion information, the motion compensator optionally performs one of uni-prediction and bi-direction, and the uni-prediction is prediction performed based on the L0 motion information and the bi-prediction is prediction performed based on the L0 motion information and the L1 motion information.

In another aspect, an image decoding method is provided. The image decoding method includes: deriving motion information of a current block; generating a prediction block for the current block based on the derived motion information; and generating a reconstructed block for the current block based on the generated prediction block, wherein the derived motion information includes both of L0 motion information and L1 motion information, in the generating of the prediction block, one of uni-prediction and bi-direction is optionally performed, and the uni-prediction is prediction performed based on the L0 motion information and the bi-prediction is prediction performed based on the L0 motion information and the L1 motion information.

The L0 motion information may include an L0 motion vector and an L0 reference picture number, the L0 reference picture number may be a number assigned to an L0 reference picture according to a picture order count (POC) order, the L1 motion information may include an L1 motion vector and an L1 reference picture number, and the L1 reference picture number may be a number assigned to an L1 reference picture according to the POC order, and in the generating of the prediction block, one of the uni-prediction and the bi-prediction may be optionally performed according to whether the L0 motion information and the L1 motion information are the same, and when the L0 motion vector and the L1 motion vector are the same and the L0 reference picture number and the L1 reference picture number are the same, it may be determined that the L0 motion information and the L1 motion information are the same.

When the L0 motion information and the L1 motion information are the same, in the generating of the prediction block, the prediction block may be generated by performing the L0 motion compensation on the current block based on the L0 motion information.

When the L0 motion information and the L1 motion information are not the same, the generating of the prediction block may further include: generating an L0 motion compensated block by performing L0 motion compensation on the current block based on the L0 motion information; generating an L1 motion compensated block by performing L1 motion compensation on the current block based on the L1 motion information; and generating the prediction block by performing a weighting average on the L0 motion compensated block and the L1 motion compensated block.

The image decoding method may further include: determining whether default weighting prediction is applied to the current block or non-default weighting prediction is applied thereto; in the generating of the prediction block, one of the default weighting prediction and the non-default weighting prediction is optionally performed according to the determination results.

Whether the default weighting prediction is applied to the current block or the non-default weighting prediction is applied thereto may be indicated by a weighting prediction index.

Advantageous Effects

According to the image encoding method of the exemplary embodiments of the present invention, it is possible to reduce the calculation complexity and improve the encoding efficiency.

According to the image decoding method of the exemplary embodiments of the present invention, it is possible to reduce the calculation complexity and improve the encoding efficiency.

According to the inter prediction method of the exemplary embodiments of the present invention, it is possible to reduce the calculation complexity and improve the encoding efficiency.

According to the merge candidate determining method of the exemplary embodiments of the present invention, it is possible to reduce the calculation complexity and improve the encoding efficiency.

According to the motion information determining method of the exemplary embodiments of the present invention, it is possible to reduce the calculation complexity and improve the encoding efficiency.

According to the temporal motion information deriving method of the exemplary embodiments of the present invention, it is possible to reduce the calculation complexity and improve the encoding efficiency.

DESCRIPTION OF DRAWINGS

FIG. 6 is a diagram schematically showing motion information of the encoded image according to an exemplary embodiment of the present invention.

MODE FOR INVENTION

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Further, in the present invention, "comprising" a specific configuration will be understood that additional configuration may also be included in the embodiments or the scope of the technical idea of the present invention.

Terms used in the specification, 'first', 'second', etc. can be used to describe various components, but the components are not to be construed as being limited to the terms. The terms are only used to differentiate one component from other components. For example, the 'first' component may be named the 'second' component and the 'second' component may also be similarly named the 'first' component, without departing from the scope of the present invention.

Furthermore, constitutional parts shown in the embodiments of the present invention are independently shown so as to represent different characteristic functions. Thus, it does not mean that each constitutional part is constituted in a constitutional unit of separated hardware or one software. In other words, each constitutional part includes each of enumerated constitutional parts for convenience of explanation. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Figure 1:
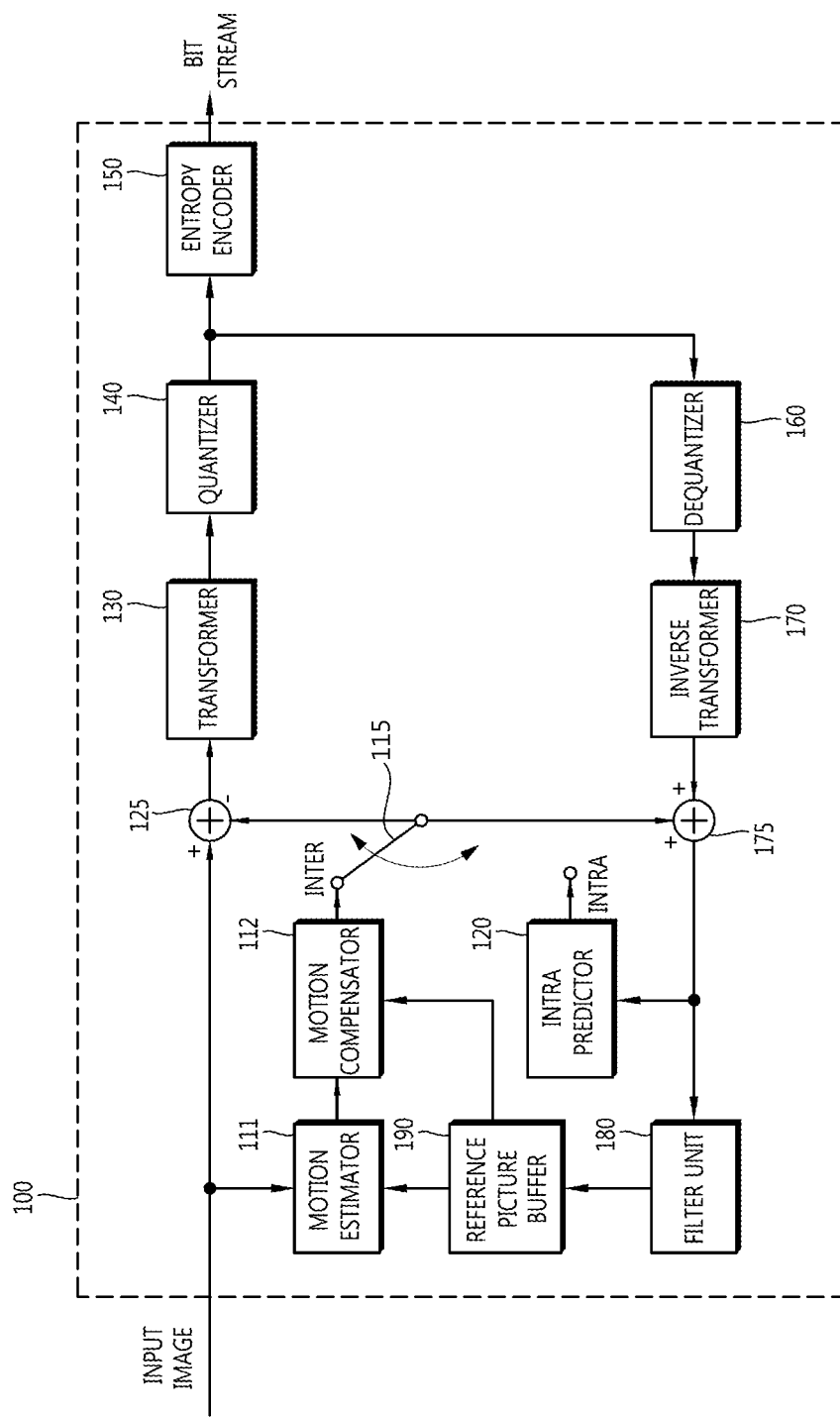
FIG. 1 is a block diagram showing a configuration of an image encoding apparatus according to an exemplary embodiment of the present invention.

FIG. 1 is a block diagram showing a configuration of an image encoding apparatus according to an exemplary embodiment of the present invention.

Referring to FIG. 1, the image encoding apparatus 100 includes a motion estimator 111, a motion compensator 112, an intra predictor 120, a switch 115, a subtractor 125, a transformer 130, a quantizer 140, an entropy encoder 150, a dequantizer 160, an inverse transformer 170, an adder 175, a filter unit 180, and a reference picture buffer 190.

The image encoding apparatus 100 may perform encoding on input pictures in an intra-mode or an inter-mode and output bit streams. The intra prediction means intra-picture prediction and the inter prediction means inter-picture prediction. In the case of the intra mode, the switch 115 may be switched to intra, and in the case of the inter mode, the switch 115 may be switched to inter. The image encoding apparatus 100 may generate a prediction block for an input block of the input pictures and then encode a residual between the input block and the prediction block.

In the case of the intra mode, the intra predictor 120 may perform spatial prediction using pixel values of blocks encoded in advance around a current block to generate the prediction block.

In the case of the inter mode, the motion estimator 111 may search a region optimally matched with the input block in reference pictures stored in the reference picture buffer 190 in a motion estimation process to obtain a motion vector. The motion compensator 112 may perform motion compensation using the motion vector to generate the prediction block.

The subtractor 125 may generate a residual block by the residual between the input block and the generated prediction block. The transformer 130 may perform transform on the residual block to output transform coefficients. Further, the quantizer 140 may quantize the input transform coefficient according to quantization parameters to output a quantized coefficient.

The entropy coding unit 150 may perform entropy coding based on values (for example, quantized coefficients) calculated in the quantizer 140 and/or coding parameter values, or the like, calculated in the coding process to output bit streams.

When the entropy encoding is applied, symbols are represented by allocating a small number of bits to symbols having high generation probability and allocating a large number of bits to symbols having low generation probability, thereby making it possible to reduce a size of bit streams for the encoding target symbols. Therefore, the compression performance of the image encoding may be improved through the entropy encoding. The entropy encoder 150 may use an encoding method such as exponential golomb, context-adaptive variable length coding (CAVLC), context-adaptive binary arithmetic coding (CABAC), or the like, for the entropy encoding.

Since the image encoding apparatus according to the exemplary embodiment of FIG. 1 performs inter prediction encoding, that is, inter-frame prediction encoding, a current encoded picture needs to be decoded and stored in order to be used as reference pictures. Therefore, the quantized coefficient is dequantized in the dequantizer 160 and inversely transformed in the inverse transformer 170. The dequantized and inversely transformed coefficient is added to the prediction block through the adder 175, such that a reconstructed block is generated.

The reconstructed block passes through the filter unit 180 and the filter unit 180 may apply at least one of a deblocking filter, a sample adaptive offset (SAO), and an adaptive loop filter (ALF) to a reconstructed block or a reconstructed picture. The filter unit 180 may also be called an adaptive in-loop filter. A deblocking filter may remove block distortion and/or blocking artifact that occur at a boundary between the blocks. The SAO may add an appropriate offset value to a pixel value in order to compensate an encoding error. The ALF may perform the filtering based on a comparison value between the reconstructed picture and the original picture and may also operate only when a high efficiency is applied. The reconstructed block passing through the filter unit 180 may be stored in the reference picture buffer 190.

Figure 2:
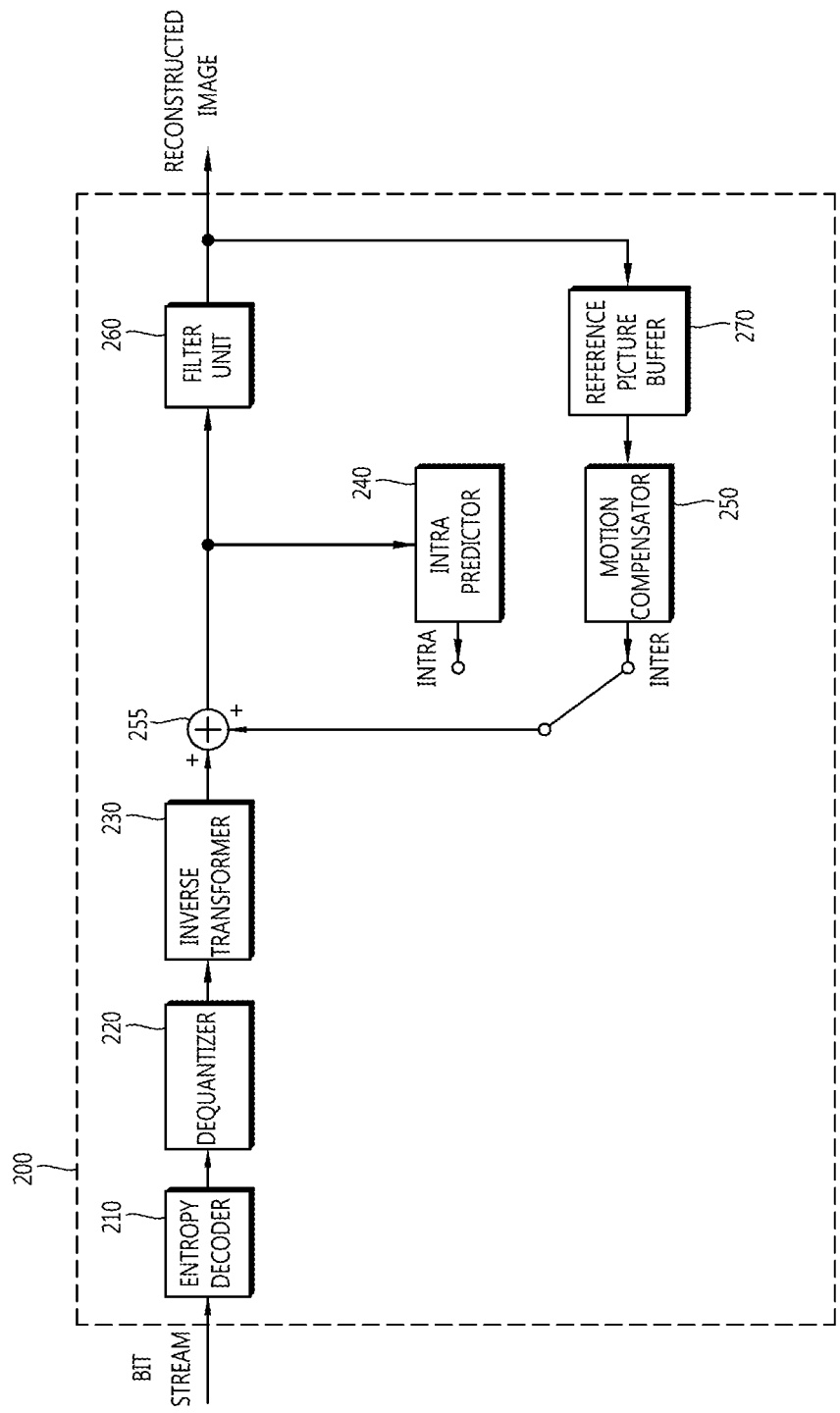
FIG. 2 is a block diagram showing a configuration of an image decoding apparatus according to an exemplary embodiment of the present invention.

FIG. 2 is a block diagram showing a configuration of an image decoding apparatus according to an exemplary embodiment of the present invention.

Referring to FIG. 2, an image decoding apparatus 200 includes an entropy decoder 210, a dequantizer 220, an inverse transformer 230, an intra predictor 240, a motion compensator 250, an adder 255, a filter unit 260, and a reference picture buffer 270.

The image decoding apparatus 200 may receive the bit streams output from the encoder to perform the decoding in the intra mode or the inter mode and output the reconstructed picture, that is, the reconstructed picture. In the case of the intra mode, the switch may be switched to the intra, and in the case of the inter mode, the switch may be switched to the inter. The image decoding apparatus 200 may obtain a residual block from the received bit streams, generate the prediction block, and then add the residual block to the prediction block to generate the reconstructed block, that is, the reconstructed block.

The entropy decoder 210 may entropy-decode the input bit streams according to the probability distribution to generate symbols including a quantized coefficient type of symbols. The entropy decoding method is similar to the above-mentioned entropy encoding method.

When the entropy decoding method is applied, symbols are represented by allocating a small number of bits to symbols having high generation probability and allocating a large number of bits to symbols having low generation probability, thereby making it possible to reduce a size of bit streams for each symbol. Therefore, the image decoding compression performance may be improved through the entropy decoding method.

The quantized coefficients may be dequantized in the dequantizer 220 and be inversely transformed in the inverse transformer 230. The quantized coefficients are dequantized/inversely transformed, such that the residual block may be generated.

In the case of the intra mode, the intra predictor 240 may perform spatial prediction using pixel values of blocks decoded in advance around a current block to generate the prediction blocks. In the case of the inter mode, the motion compensator 250 may perform the motion compensation by using the motion vector and the reference pictures stored in the reference picture buffer 270 to generate the prediction block.

The residual block and the prediction block may be added to each other through the adder 255 and the added block may pass through the filter unit 260. The filter unit 260 may apply at least one of the deblocking filter, the SAO, and the ALF to the reconstructed block or the reconstructed picture. The filter unit 260 may output the reconstructed pictures, that is, the reconstructed picture. The reconstructed picture may be stored in the reference picture buffer 270 to thereby be used for the inter prediction.

Hereinafter, the block means a unit of the picture encoding and decoding. At the time of the picture encoding and decoding, the encoding or decoding unit means the divided unit when the picture is divided and then encoded or decoded. Therefore, the unit may be called a coding unit (CU), a prediction unit (PU), a transform unit (TU), a transform block, or the like. A single block may be subdivided into sub-blocks having a smaller size. In addition, in the specification, the "picture" may be replaced with "frame", "field", and/or "slice" according to the context, which may be easily understood to a person skilled in the art to which the present invention pertains. For example, a P picture, a B picture, and a forward B picture to be described below may each be replaced with a P slice, a B slice, and a forward B slice according to the context.

Figure 3:
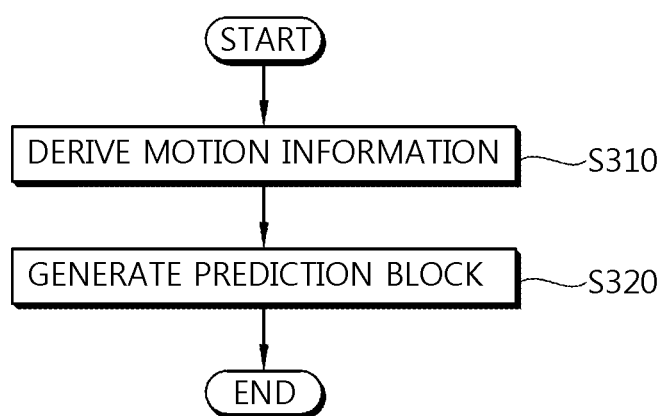
FIG. 3 is a flow chart schematically showing an inter prediction method according to an exemplary embodiment of the present invention.

FIG. 3 is a flow chart schematically showing an inter prediction method according to an exemplary embodiment of the present invention.

Referring to FIG. 3, an encoder and a decoder may derive the motion information of the current block (S310).

In the inter mode, the encoder and the decoder may derive the motion information of the current block and perform inter prediction and/or motion compensation based on the derived motion information. In this case, the encoder and the decoder may use the motion information of the reconstructed neighboring block and/or a collocated (col) block corresponding to the current block within the previously reconstructed reference pictures to improve the encoding/decoding efficiency. Here, the reconstructed neighboring blocks are blocks within the current picture that is encoded and/or decoded and reconstructed in advance and may include blocks neighboring to the current block and/or blocks located at external corners of the current block. In addition, the encoder and the decoder may determine a predetermined relative location based on blocks that are present at the same space location as the current block within the reference pictures and may derive the col block based on the predetermined determined relative position (locations in and/or out the block present at the same space location as the current block).

Meanwhile, the motion information deriving method may be changed according to the prediction mode of the current block. The prediction mode used for the inter prediction may include an advanced motion vector predictor (AMVP), a merge, and the like.

For example, when the AMVP is applied, the encoder and the decoder may use the motion vectors of the reconstructed neighboring blocks and/or the motion vector of the col block to generate the prediction motion vector candidate list. That is, the motion vectors of the reconstructed neighboring blocks and/or the motion vector of the col block may be used as the prediction motion vector candidates. The encoder may transmit a prediction motion vector index indicating an optimal prediction motion vector selected from the prediction motion vector candidates included in the list to the decoder. In this case, the decoder may use the prediction motion vector index to select the prediction motion vector of the current block from the prediction motion vector candidates included in the prediction motion vector candidate list.

The encoder may obtain a motion vector difference (MVD) between the motion vector and the prediction motion vector of the current block, encode the obtained motion vector difference, and transmit the encoded difference to the decoder. In this case, the decoder may decode the received motion vector difference and derive the motion vector of the current block by a sum of the decoded motion vector difference and the prediction motion vector.

As another example, when the merge is applied, the encoder and the decoder may use the motion information of the reconstructed neighboring blocks and/or the motion information of the col block to generate the merge candidate list. That is, when the motion information of the reconstructed neighboring blocks and/or the col block is present, the encoder and the decoder may use the information as the merge candidates for the current block.

The encoder may select the merge candidates capable of providing the optimal encoding efficiency as the motion information of the current block from the merge candidates included in the merge candidate list. In this case, the merge index indicating the selected merge candidates may be transmitted to the decoder, while being included in the bit streams. The decoder may use the transmitted merge index to select one of the merge candidates included in the merge candidate lists and may determine the selected merge candidates as the motion information of the current block. Therefore, when the merge mode is applied, the motion information of the reconstructed neighboring blocks and/or the col block may be used as the motion information of the current block as it is.

In the above-mentioned AMVP and the merge mode, in order to derive the motion information of the current block, the motion information of the reconstructed neighboring blocks and/or the motion information of the col block may be used. Hereinafter, in exemplary embodiments to be described below, the motion information derived from the reconstructed neighboring blocks may be referred to as the spatial motion information and the motion information derived from the col block may be referred to as the temporal motion information. For example, the motion vector derived from the reconstructed neighboring blocks may be referred to as the spatial motion vector and the motion vector derived from the col block may be referred to the temporal motion vector.

Referring back to FIG. 3, the encoder and the decoder may perform the motion compensation on the current block based on the derived motion information to generate the prediction block of the current block (S320). Here, the prediction block may mean the motion compensated block that is generated by performing the motion compensation on the current block. In addition, the plurality of motion compensated blocks may configure a single motion compensated picture. Therefore, the prediction block in exemplary embodiments of the present invention to be described below may be referred to as the 'motion compensated block' and/or the 'motion compensated picture', which may be easily understood to a person skilled in the art to which the present invention pertains.

Meanwhile, the picture subjected to the inter prediction may include the P picture and the B picture. The P picture may mean a picture that may be subjected to unidirectional prediction using one reference picture and the B picture may mean a picture that may be subjected to forward, reverse, or bidirectional prediction using one or more, for example, two reference pictures. For example, in the B picture, the inter prediction may be performed using a single forward reference picture (past picture) and a single reverse reference picture (future picture). In addition, in the B picture, the prediction is performed using the two forward reference pictures and the prediction may also be performed using the two reverse reference pictures.

Here, the reference pictures may be managed by a reference picture list. In the P picture, one reference picture is used and the reference picture may be assigned to a reference picture list 0 (L0 or List0). In the B picture, two reference pictures are used and the two reference pictures may each be assigned to the reference picture list 0 and a reference picture list 1 (L1 or List1). Hereinafter, the L0 reference picture list may have the same meaning as the reference picture list 0 and the L1 reference picture list may have the same meaning as the reference picture list 1.

Generally, the forward reference picture may be assigned to the reference picture list 0 and the reverse reference picture may be assigned to the reference picture list 1. However, a method for allocating reference pictures is not limited thereto, but the forward reference picture may also be assigned to the reference picture list 1 and the reverse reference picture may also be assigned to the reference picture list 0. Hereinafter, the reference picture assigned to the reference picture list 0 is referred to as a L0 reference picture and the reference picture assigned to the reference picture list 1 is referred to as a L1 reference picture.

Generally, the reference pictures may be assigned to the reference picture list in a descending order according to a reference picture number. Here, the reference picture number may mean a number assigned to each reference picture in a picture order count (POC) order, wherein the POC order may mean a display order and/or time order of pictures. For example, the two reference pictures having the same reference picture number may correspond to the same reference picture. The reference pictures assigned to the reference picture list may be rearranged by a reference picture list reordering (RPLR) or memory management control operation (MMCO) command.

As described above, in the P picture, the unidirectional prediction using the single L0 reference picture may be performed and in the B picture, the forward, reverse, or bidirectional prediction using a single L0 reference picture and a single L1 reference picture, that is, two reference pictures may be performed. The prediction using one reference picture may be referred to as uni-prediction and the two reference pictures including the L0 reference picture and the L1 reference picture may be referred to as bi-prediction.

The bi-prediction may be used as a concept including all of the forward, reverse, and bidirectional predictions, but in exemplary embodiments of the present invention to be described below, the prediction using the two reference pictures (L0 reference picture and L1 reference picture) may be referred to as the bidirectional prediction for convenience. That is, the bidirectional prediction in exemplary embodiments of the present invention to be described below may be referred to as the bi-prediction and may be understood as a concept including all the forward, reverse, and bidirectional predictions using the two reference pictures (the L0 reference picture and the L1 reference picture).

In addition, even when the bi-prediction is performed, the forward prediction or the reverse prediction may be performed, but in exemplary embodiments of the present invention to be described below, the prediction using only one reference picture may be referred to as the unidirectional prediction for convenience. That is, in exemplary embodiments of the present invention to be described below, the unidirectional prediction may mean the uni-prediction and may be understood as a concept including only the prediction using one reference picture. Hereinafter, the information indicating whether the unidirectional prediction (uni-prediction) is applied to the blocks subjected to the prediction or the bidirectional prediction (bi-prediction) is applied thereto is referred to as prediction direction information.

Figure 4:
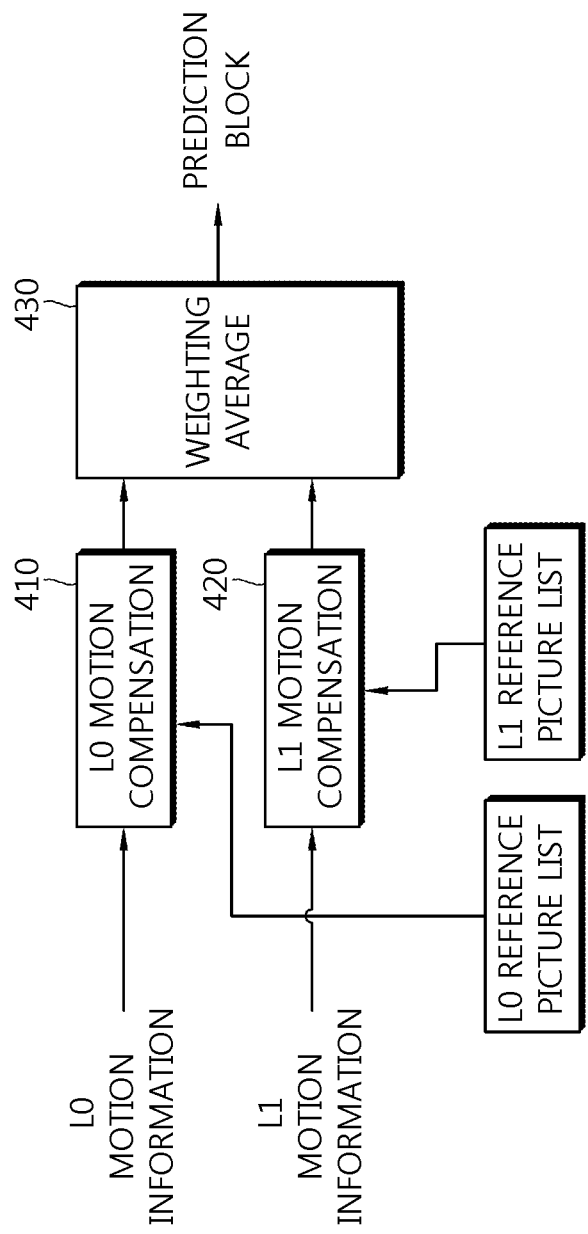
FIG. 4 is a diagram schematically showing the inter prediction method according to an exemplary embodiment of the present invention when bidirectional prediction is applied.

FIG. 4 is a diagram schematically showing the inter prediction method according to an exemplary embodiment of the present invention when the bidirectional prediction is applied.

As described above, the encoder and the decoder may perform the unidirectional prediction and the bidirectional prediction at the time of the inter prediction. When the bidirectional prediction is applied, each block subjected to the prediction may have two reference pictures (the L0 reference picture and the L1 reference picture). In this case, each block subjected to the bidirectional prediction may have two motion information. Here, the motion information may include the reference picture number, the motion vectors, and the like.

When the bidirectional prediction is performed, the encoder and the decoder each may select one reference picture from the reference picture list 0 and the reference picture list 1 and use the selected reference picture for prediction. That is, the two reference pictures including the L0 reference picture and the L1 reference picture may be used for the bidirectional prediction. Hereinafter, the motion information corresponding to the L0 reference picture may be referred to as the L0 motion information and the motion information corresponding to the L1 reference picture may be referred to as the L1 motion information. Further, the motion compensation using the L0 motion information may be referred to as the L0 motion compensation and the motion compensation using the L1 motion information may be referred to as the L1 motion compensation.

Referring to FIG. 4, the encoder and the decoder perform L0 motion compensation 410 on the current block using the L0 motion information and the L0 reference picture list to generate the L0 motion compensated block. In addition, the encoder and the decoder use the L1 motion information and the L1 reference picture list to perform L1 motion compensation 420, thereby generating the L1 motion compensated block. In this case, the L0 motion compensation 410 and L1 motion compensation 420 processes may be performed independently from each other.

The encoder and the decoder may perform a weighting average 430 on the L0 motion compensated block and the L1 motion compensated block to finally generate the single motion compensated block. For example, the weighting average 430 may be performed in a pixel unit within the L0 motion compensated block and the L1 motion compensated block. In this case, the finally generated single motion compensated block may correspond to the prediction block of the current block.

Hereinafter, the motion compensation applied at the time of the bidirectional prediction may be referred to as the bidirectional motion compensation. In connection with this, the motion compensation applied at the time of the unidirectional prediction may be referred to as the unidirectional motion compensation.

Figure 5:
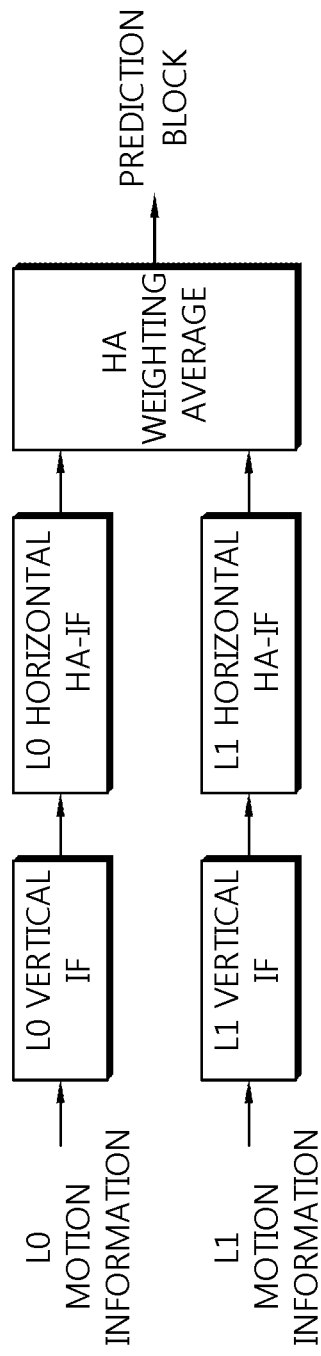
FIG. 5 is a diagram schematically showing an inter prediction method according to another exemplary embodiment of present invention when bidirectional prediction is applied.

FIG. 5 is a diagram schematically showing an inter prediction method according to another exemplary embodiment of present invention when bidirectional prediction is applied.

At the time of the bidirectional motion compensation, rounding error may occur. Therefore, the encoder and the decoder may perform a rounding control so as to remove the rounding error.

Referring to FIG. 5, the encoder and the decoder may perform using a high accuracy (HA) pixel interpolation filter (IF) to the motion compensation so as to remove the rounding error. When the high accuracy pixel interpolation method or the high accuracy motion compensation method is applied, the encoder and the decoder may increase a bit depth of a picture before the motion compensation is performed. Finally, when the weighting average is performed, the bit depth of the picture may be reduced again. In addition, the encoder and the decoder may perform a high accuracy (HA) weighting average on the L0 motion compensated block and the L1 motion compensated block to finally generate the single motion compensated block.

As described above, when a rounding control process is applied, a difference in the motion compensation method between the unidirectional motion compensation and the bidirectional motion compensation may also occur.

FIG. 6 is a diagram schematically showing motion information of the encoded picture according to an exemplary embodiment of the present invention. FIG. 6 shows the plurality of blocks configuring the encoded picture and the motion information of each of the plurality of blocks.

The encoder and the decoder may use the forward B picture so as to increase the inter prediction efficiency under low delay application environment. Here, the forward B picture may mean the B picture to which only the forward prediction is subjected. When the forward B picture is used, each block to which the prediction is subjected may have two motion information (the L0 motion information and the L1 motion information). Generally, in the forward B picture, the L0 reference picture list and the L1 reference picture list may be identically set. Hereinafter, in the specification, when the forward B picture is used, it is assumed that the L0 reference picture list and the L1 reference picture list are the same.

The decoder may also directly determine whether the current picture is the forward B picture based on the L0 reference picture list and the L1 reference picture list, but may also determine whether the current picture is the forward B picture based on the information transmitted from the encoder. For example, the encoder may encode a flag indicating whether the L0 reference picture list and the L1 reference picture list are the same as each other and transmit the encoded flag to the decoder. In this case, the decoder may receive and decode the flag and then, determine whether the current picture is the forward B picture based on the decoded flag. As another example, the encoder may transmit an NAL unit type value or a slice type value corresponding to the forward B picture to the decoder and the decoder may receive the value and determine whether the current picture is the forward B picture based on the received value.

The picture shown in FIG. 6 is the picture encoded using the forward B picture. Therefore, each block within the encoded picture may have a maximum of two motion information. Here, the motion information may include the reference picture number, the motion vectors, and the like. Referring to FIG. 6, among the blocks having the two motion information, the block in which the L0 motion information (for example, the reference picture number, the motion vectors) and the L1 motion information (for example, the reference picture number and the motion vectors) are the same may be present in plural.

In the forward B picture, the block in which the L0 motion information (for example, the reference picture number, the motion vectors) and the L1 motion information (for example, the reference picture number, the motion vectors) are the same may occur by the temporal motion information deriving method. As described above, the temporal motion information may be derived from the motion information of the col block corresponding to the current block within the previously reconstructed reference pictures. For example, when the L0 temporal motion information of the current block is derived, the encoder and the decoder may use the L0 motion information of the col block corresponding to the current block within the reference pictures. However, when the L0 motion information is not present in the col block, the encoder and the decoder may use the L1 motion information of the col block as the L0 temporal motion information of the current block. On the other hand, when the L1 temporal motion information of the current block is derived, the encoder and the decoder may use the L1 motion information of the col block corresponding to the current block within the reference pictures. However, when the L1 motion information is not present in the col block, the encoder and the decoder may use the L0 motion information of the col block as the L1 temporal motion information of the current block. As the result of the process performance as described above, the phenomenon in which the L0 motion information and the L1 motion information of the current block are the same may occur.

Further, when the block in which the L0 motion information and the L1 motion information are the same is generated, the block may affect blocks encoded later. For example, when the merge is applied, the motion information (the L0 motion information and the L1 motion information) of the reconstructed neighboring blocks and/or the col block may be used as the motion information of the current block as it is. Therefore, when the block in which the L0 motion information and the L1 motion information are the same is generated, other blocks in which the L0 motion information and the L1 motion information are the same may be generated more.

When the motion compensation is performed on the block in which the L0 motion information and the L1 motion information are the same, the same process may be repeatedly performed twice in the single block. Since this is very inefficient in terms of the encoding, the inter prediction method and/or the motion compensation method capable of reducing the calculation complexity and improving the encoding efficiency by solving the above-mentioned problem may be provided. For example, when the L0 motion information (for example, the reference picture number and the motion vectors) and the L1 motion information (for example, the reference picture number and the motion vectors) are the same, the encoder and the decoder may perform the motion compensation process once to reduce the calculation complexity.

Figure 7:
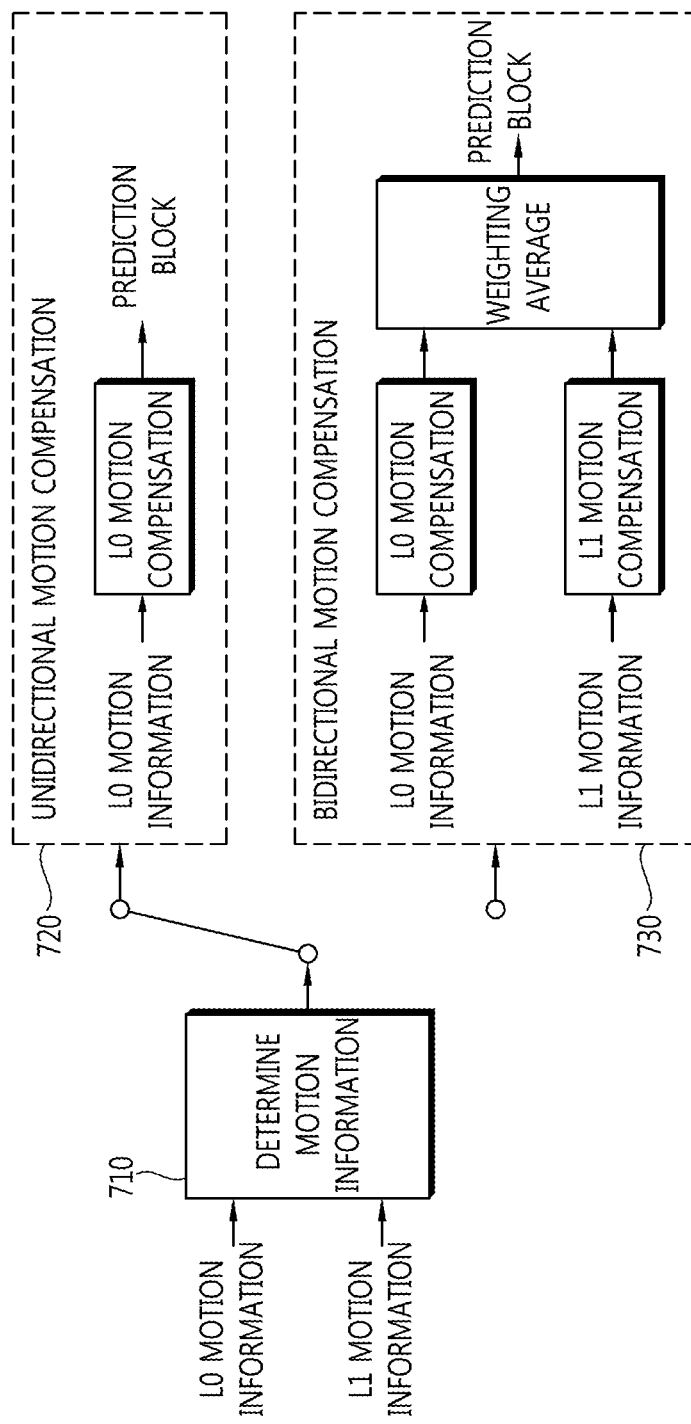
FIG. 7 is a conceptual diagram schematically showing an inter prediction method according to an exemplary embodiment of the present invention.

FIG. 7 is a conceptual diagram schematically showing an inter prediction method according to an exemplary embodiment of the present invention.

In FIG. 7, it is assumed that the current block has two motion information (the L0 motion information and the L1 motion information). When the L0 motion information (the reference picture number and the motion vectors) and the L1 motion information (the reference picture number and the motion vectors) are the same, the encoder and the decoder may perform the unidirectional motion compensation process on the current block to reduce the calculation complexity.

Referring to FIG. 7, it may be determined whether the L0 motion information (the reference picture number and the motion vectors) and the L1 motion information (the reference picture number and the motion vectors) are the same in the motion information determining process 710. The motion compensation process may be optionally performed according to the determination result. For example, when the L0 reference picture and the L1 reference picture are the same and the L0 motion vector and the L1 motion vector are not the same, the encoder and the decoder may perform a unidirectional motion compensation process 720. Otherwise, the encoder and the decoder may perform a bidirectional motion compensation process 730.

In the unidirectional motion compensation process 720, the encoder and the decoder may perform the L0 motion compensation on the current block using the L0 reference picture and the L0 motion information acquired from the reference picture buffer. The encoder and the decoder may perform the L0 motion compensation to generate the L0 motion compensated block. In this case, the L0 motion compensated block may correspond to the prediction block of the current block.

In the bidirectional motion compensation process 730, the encoder and the decoder may perform the L0 motion compensation on the current block using the L0 reference picture and the L0 motion information acquired from the reference picture buffer to generate the L0 motion compensated block. Further, the encoder and the decoder may perform the L1 motion compensation on the current block using the L1 reference picture and the L1 motion information acquired from the reference picture buffer to generate the L1 motion compensated block.

When the bidirectional motion compensation process 730 is applied, the encoder and the decoder may perform the weighting average on the L0 motion compensated block and the L1 motion compensated block to finally generate the single motion compensated block. For example, the weighting average may be performed in a pixel unit and may also be formed for, for example, any pixel within the L0 motion compensated block and the pixel within the L1 motion compensated block corresponding thereto. In this case, the finally generated single motion compensated block may correspond to the prediction block of the current block.

In the above-mentioned exemplary embodiments of the present invention, since the final prediction block is generated by the weighting average, the above-mentioned inter prediction method may be referred to as the weighting prediction. Hereinafter, as shown in FIG. 7, the weight that is applied as the default and basically applied in the weighting average process is referred to as the "default weight". It may be estimated that the prediction to which only the default weight is applied is not the weighting prediction, but in the specification, similar to 'non-default weighting prediction' to which the weight other than the default weight is separately or additionally applied, the inter prediction to which only the default weight is applied is referred to as the weighting prediction. However, in order to be differentiate from the non-default weighting prediction (for example, the weighting prediction of FIG. 8 to be described below), the weighting prediction to which only the default weight is applied is referred to as 'default weighting prediction'.

Figure 8:
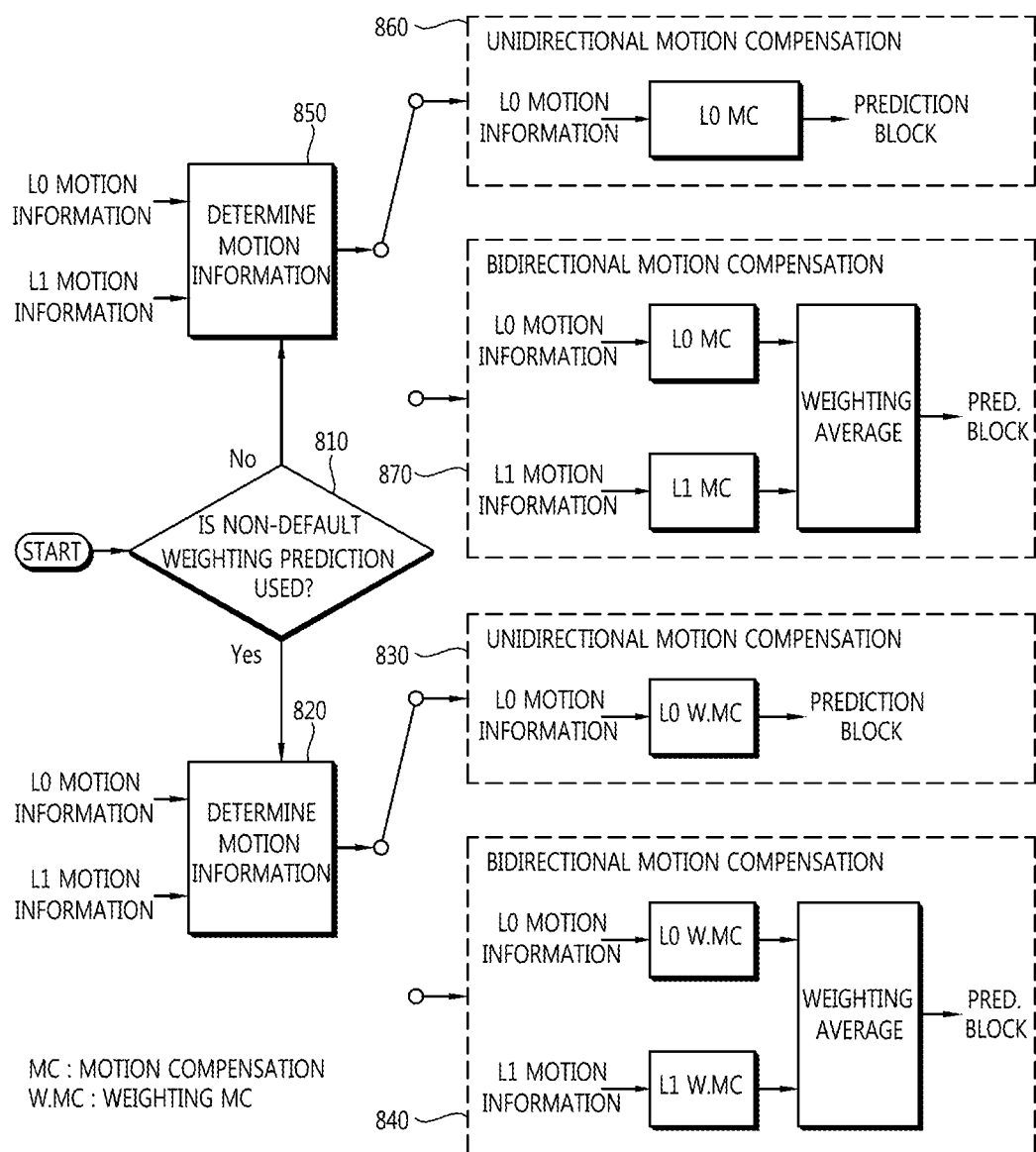
FIG. 8 is a conceptual diagram schematically showing an inter prediction method according to another exemplary embodiment of the present invention.

FIG. 8 is a conceptual diagram schematically showing an inter prediction method according to an exemplary embodiment of the present invention.

In FIG. 8, it is assumed that the current block has two motion information (the L0 motion information and the L1 motion information). In FIG. 7, the above-mentioned inter prediction method may be identically applied to the non-default weighting prediction as shown in the exemplary embodiment of FIG. 8, in addition to the default weighting prediction. When the L0 motion information (the reference picture number and the motion vectors) and the L1 motion information (the reference picture number and the motion vectors) are the same, the encoder and the decoder may perform the unidirectional motion compensation process on the current block to reduce the calculation complexity.

Referring to FIG. 8, the encoder and the decoder may determine whether the non-default weighting prediction is applied for the current block or the default weighting prediction is applied for the current block (810). For example, this may be indicated by the weighting prediction index. The detailed exemplary embodiment of the present invention of the weighting prediction index will be described below.

When the non-default weighting prediction is used, the encoder and the decoder may apply the weight other than the default weight to the L0 motion compensated block and/or the L1 motion compensated block at the time of performing the motion compensation. Hereinafter, the weight other than the default weight is referred to as the non-default weight.

For example, when the non-default weighting prediction is used, it may be determined whether the L0 motion information (the reference picture number and the motion vectors) and the L1 motion information (the reference picture number and the motion vectors) are the same in the motion information determining process 820. The motion compensation process may be optionally performed according to the determination result. For example, when the L0 reference picture and the L1 reference picture are the same and the L0 motion vector and the L1 motion vector are the same, the encoder and the decoder may perform a unidirectional motion compensation process 830. Otherwise, the encoder and the decoder may perform a bidirectional motion compensation process 840.

In the unidirectional motion compensation process 830, the encoder and the decoder may perform the L0 motion compensation on the current block using the L0 reference picture and the L0 motion information acquired from the reference picture buffer. In this case, the encoder and the decoder may apply the predetermined non-default weight and/or a predetermined offset to the L0 motion compensated block to generate the final prediction block. The L0 motion compensation to which the predetermined non-default weight and/or the predetermined offset are applied may also be referred to as the L0 weighting motion compensation. Similarly, the L1 motion compensation to which the predetermined non-default weight and/or the predetermined offset are applied may also be referred to as the L1 weighting motion compensation.

When the non-default weighting prediction is used, the method for performing the unidirectional motion compensation process 830 may be variously defined. Hereinafter, in exemplary embodiments of the present invention to be described below, the non-default weight corresponding to LX motion information (X is 0 or 1) is referred to as an LX weight and an offset corresponding to the LX motion information is referred to as an LX offset.

As described above, in the unidirectional motion compensation process 830, the encoder and the decoder may perform the L0 motion compensation on the current block using the L0 reference picture and the L0 motion information acquired from the reference picture buffer. The encoder and the decoder may perform the L0 motion compensation on the current block to generate the L0 motion compensated block. In this case, for example, the encoder and the decoder may apply the L0 weight to the L0 motion compensated block (and/or each pixel within the block) and adds the L0 offset thereto to generate the final prediction block. As another example, the encoder and the decoder multiply values obtained by adding the L0 weight and the L1 weight to the L0 motion compensated block (and/or each pixel within the block), add the L0 offset and L1 offset values, and then, obtain the average value therefor, thereby generating the final prediction block. As another example, the encoder and the decoder may multiply the L0 weight by the L0 motion compensated block (and/or each pixel within the block) and adds the average value of the L0 offset and the L1 offset to generate the final prediction block. The method for performing the unidirectional motion compensation 830 is not limited to the above-mentioned exemplary embodiments and may be variously defined according to implementations and/or demands.

When the non-default weighting prediction is used, both of the L0 weighting motion compensation process and the L1 weighting motion compensation process may be performed in the bidirectional motion compensation process 840. In the L0 weighting motion compensation process, the encoder and the decoder may generate the L0 motion compensated block using the L0 reference picture and the L0 motion information that are acquired from the reference picture buffer. In this case, the encoder and the decoder may apply the L0 weight to the L0 motion compensated block to generate the L0 weighting motion compensated block. In addition, in the L1 weighting motion compensation process, the encoder and the decoder may generate the L1 motion compensated block using the L1 reference picture and the L1 motion information that are acquired from the reference picture buffer. In this case, the encoder and the decoder may apply the L1 weight to the L1 motion compensated block to generate the L1 weighting motion compensated block.

When the bidirectional motion compensation process 840 is applied in the non-default weighting prediction, the encoder and the decoder may perform the weighting average based on the L0 weighting motion compensated block, the L0 offset, the L1 weighting motion compensated block, and the L1 offset to finally generate the single motion compensated block. For example, the weighting average may be performed in a pixel unit within the L0 motion compensated block and the L1 motion compensated block. In this case, the finally generated single motion compensated block may correspond to the prediction block of the current block.

Although the above-mentioned bidirectional motion compensation process 840 described that the L0 weight is applied in the L0 motion compensation process and the L1 weight is applied in the L1 motion compensation process, the bidirectional motion compensation process 840 is not limited to the above-mentioned exemplary embodiments of the present invention. For example, the L0 weight and the L1 weight may also be applied to the L0 motion compensated block and the L1 motion compensated block in the weighting average process other than the L0 and L1 motion compensation processes. When the default weighting prediction is used, the general motion compensation process as described in the exemplary embodiments of FIG. 7 as described above may be performed.

For example, when the default weighting prediction is used, it may be determined whether the L0 motion information (the reference picture number and the motion vectors) and the L1 motion information (the reference picture number and the motion vectors) are the same in the motion information determining process 850. The motion compensation process may be optionally performed according to the determination result. For example, when the L0 reference picture and the L1 reference picture are the same and the L0 motion vector and the L1 motion vector are the same, the encoder and the decoder may perform a unidirectional motion compensation process 860. Otherwise, the encoder and the decoder may perform a bidirectional motion compensation process 870.

In the unidirectional motion compensation process 860, the encoder and the decoder may perform the L0 motion compensation on the current block using the L0 reference picture and the L0 motion information acquired from the reference picture buffer. The encoder and the decoder may perform the L0 motion compensation to generate the L0 motion compensated block. In this case, the L0 motion compensated block may correspond to the prediction block of the current block.

In the bidirectional motion compensation process 870, the encoder and the decoder may perform the L0 motion compensation on the current block using the L0 reference picture and the L0 motion information acquired from the reference picture buffer to generate the L0 motion compensated block. Further, the encoder and the decoder may perform the L1 motion compensation on the current block using the L1 reference picture and the L1 motion information acquired from the reference picture buffer to generate the L1 motion compensated block.

When the bidirectional motion compensation process 870 is applied, the encoder and the decoder may perform the weighting average on the L0 motion compensated block and the L1 motion compensated block to finally generate the single motion compensated block. For example, the weighting average may be performed in a pixel unit and may also be performed for, for example, any pixel within the L0 motion compensated block and the pixel within the L1 motion compensated block corresponding thereto. In this case, the finally generated single motion compensated block may correspond to the prediction block of the current block.

Although the exemplary embodiments of the present invention as described above describe that the unidirectional motion compensation process is performed when the L0 motion information (the reference picture number and the motion vector) and the L1 motion information (the reference picture number and the motion vector) are the same, the present invention is not limited thereto. For example, when the L0 motion information and the L1 motion information are the same, the encoder and the decoder may also perform the bidirectional motion compensation.

Hereinafter, in terms of the decoder, the exemplary embodiments of the inter prediction and/or motion compensation process according to the exemplary embodiments of FIGS. 7 and 8 will be described.

As described above, whether the non-default weighting prediction is applied to the current block or the default weighting prediction is applied thereto may be indicated by the weighting prediction index. In exemplary embodiments of the present invention to be described below, weighted_bipred_idc may mean the weighting prediction index. For example, when a weighted_bipred_idc value is '0', the default weighting prediction for the current block may be performed. Further, when the weighted_bipred_idc value is '1', explicit non-default weighting prediction may be performed and when the weighted_bipred_idc value is '2', implicit non-default weighting prediction may be performed.

Further, in Clip1H used in exemplary embodiments of the present invention to be described below, H may be replaced with Y in the case of a luma component signal and H may be replaced with C in the case of a chroma component signal. Clip1Y, Clip1C, and Clip3 may each have a meaning as represented by the following Equation 1.

$$Clip1Y(x) = Clip3(0, (1 << BitDepthY) 1, x) \quad \text{[Equation 1]}$$

$$Clip1C(x) = Clip3(0, (1 << BitDepthC) 1, x)$$

$$Clip3(x, y, z) = \begin{cases} x; & z < x \\ y; & z > y \\ z; & \text{otherwise} \end{cases}$$

In the above Equation 1, the BitDepthY may represent a bit depth of the luma component. Further, the BitDepthC may represent a bit depth of the chroma component.

In addition, in the exemplary embodiments of the present invention to be described below, variable shift 1 may have, for example, a value of 14-bitDepth and variable shift2 may have, for example, a value of 15-bitDepth. In addition, variable offset1 may have a value of 1 << (shift1-1) and variable offset2 may have a value of 1 << (shift2-1).

1. Embodiment of Default Weighting Sample Prediction

Hereinafter, in terms of the decoder, an embodiment of the default weighting prediction (referred to as the default weighting sample prediction) according to the exemplary embodiment of FIG. 7 will be described below. The default weighting prediction process may be performed when the above-mentioned weighted_bipred_idc value is '0'. In addition, in exemplary embodiments of the present invention to be described below, the 'pixel' may be referred to as the 'sample'.

The input for the default weighting prediction process may include locations xB and yB of a leftmost sample of a current PU based on a leftmost sample of a current CU, variables nPSW and nPSH indicating a width and a height of the current PU, an L0 motion vector mvL0 for a sample, an L1 motion vector mvL1 for a sample, an L0 reference picture index refIdxL0, an L1 reference picture index refIdxL1, a flag predFlagL0 indicating whether the L0 prediction is performed (whether the L0 reference picture list is used), a flat predFlagL1 indicating whether the L1 prediction is performed (whether the L1 reference picture list is used), a bitDepth indicating the bit depth of the sample, and the like. Here, the L0 reference picture index indicates an index indicating the reference picture used for the inter prediction of the current PU among the reference pictures included in the L0 reference picture list and the L1 reference picture index may indicate an index indicating the reference pictures used for the inter prediction of the current PU among the reference pictures included in the L1 reference picture list. In addition, the L0 prediction may mean the inter prediction using the reference pictures selected from the L0 reference picture list and the L1 prediction may mean the inter prediction using the reference pictures selected from the L1 reference picture list. An output of the process may be a prediction sample value predSamples[x, y] within a prediction block having a (nPSW)×(nPSH) size.

The decoder may derive a predSamples[x, y] value as follows, based on mvL0, mvL1, refIdxL0, refIdxL1, PredFlagL0, PredFlagL1, and the like.

If the PredFlagL0 is 1 and the PredFlagL1 is 0, the decoder may perform the following process.

$$predSamples[x, y] =$$

$$Clip3(0, (1 << bitDepth) - 1, (predSamplesL0[x, y] + offset1) >> shift1)$$

Otherwise, if the PredFlagL0 is 0 and the PredFlagL1 is 1, the decoder may perform the following process.

$$predSamples[x, y] =$$

$$Clip3(0, (1 << bitDepth) - 1, (predSamplesL1[x, y] + offset1) >> shift1)$$

Otherwise, if the PredFlagL0 is 1 and the PredFlagL1 is 1, the motion vectors mvL0 and mvL1 are the same, and the RefPicOrderCnt (currPic, refIdxL0, L0) and RefPicOrderCnt (currPic, refIdxL1, L1) are the same (that is, if the L0 reference picture number and the L1 reference picture number are the same), the decoder may perform the following process.

$$predSamples[x, y] =$$

$$Clip3(0, (1 << bitDepth) - 1, (predSamplesL0[x, y] + offset1) >> shift1)$$

Otherwise, the decoder may perform the following process.

predSamples[x,y]=Clip3(0,(1<<bitDepth)−1,(pred-
SamplesL0[x,y]+predSamplesL1[x,y]+
offset2)>>shift2)

2. Embodiment (Method 1) of Non-Default Weighting Sample Prediction

Hereinafter, in terms of the decoder, an embodiment of the non-default weighting prediction (referred to as the non-default weighting sample prediction) according to the exemplary embodiment of FIG. 8 will be described below. The non-default weighting prediction process may be performed when the above-mentioned weighted_bipred_idc value is not '0'.

The input for the non-default weighting prediction process may include locations xB and yB of a leftmost sample of a current PU based on a leftmost sample of a current CU, variables nPSW and nPSH indicating a width and a height of the current PU, an L0 motion vector mvL0 for a sample, an L1 motion vector mvL1 for a sample, an L0 reference picture index refIdxL0, an L1 reference picture index refIdxL1, a flag predFlagL0 indicating whether the L0 prediction is performed (whether the L0 reference picture list is used), a flag predFlagL1 indicating whether the L1 prediction is performed (whether the L1 reference picture list is used), a bitDepth indicating the bit depth of the sample, weighting prediction variables log WDC, w0C, w1C, o0C, and o1C, and the like. Here, C represents L in the case of the luma component, Cb in the case of chroma Cb component, and Cr in the case of chroma Cr component. In addition, log WDC may represent a denominator of a weighting factor, w0C may represent an L0 weighting value, w1C may represent the L1 weighting value, o0C may represent the L0 offset value, and o1C may represent the L1 offset value. An output of the process may be a prediction sample value predSamples[x, y] within a prediction block having a (nPSW)×(nPSH) size.

The decoder may derive a predSamples[x, y] value as follows, based on mvL0, mvL1, refIdxL0, refIdxL1, Pred-FlagL0, PredFlagL1, and the like.

If the PredFlagL0 is 1 and the PredFlagL1 is 0, the decoder may perform the following process.

For example, when the log WDC value is 1 or more, the predSamples[x, y] value may be derived as follows.

$predSamples[x, y] =$ $Clip1H\big(\big(\big(predSamplesL0[x, y] * w0C + 2^{logWDC-1}\big) >> logWDC\big) + o0C\big)$ As another example, when the log WDC value is less than 1, the predSamples[x, y] value may be derived as follows.

$predSamples[x, y] = Clip1H(predSamplesL0[x, y] * w0C + o0C)$

Otherwise, if the PredFlagL0 is 0 and the PredFlagL1 is 1, the decoder may perform the following process.

For example, when the log WDC value is 1 or more, the predSamples[x, y] value may be derived as follows.

$predSamples[x, y] =$ $Clip1H\big(\big(\big(predSamplesL1[x, y] * w1C + 2^{logWDC-1}\big) >> logWDC\big) + o1C\big)$ As another example, when the log WDC value is less than 1, the predSamples[x, y] value may be derived as follows.

$predSamples[x, y] = Clip1H(predSamplesL1[x, y] * w1C + o1C)$

Otherwise, if the PredFlagL0 is 1 and the PredFlagL1 is 1, the motion vectors mvL0 and mvL1 are the same, and the RefPicOrderCnt (currPic, refIdxL0, L0) and RefPicOrderCnt (currPic, refIdxL1, L1) are the same (that is, if the L0 reference picture number and the L1 reference picture number are the same), the decoder may perform the following process.

$presSamples[x, y] = Clip1H\big(\big(\big(predSamplesL0[x, y] * (w0C + w1C) +$ $2^{logWDC}\big) >> (logWDC + 1)\big) + ((o0C + o1C) + 1)\big)$ Otherwise, the decoder may perform the following process.

$predSamples[x, y] = Clip1H\big(\big(\big(predSamplesL0[x, y] * w0C +$ $predSamplesL1[x, y] * w1C + 2^{logWDC}\big) >> (logWDC + 1)\big) +$ $((o0C + o1C + 1) >> 1)\big)$ 3. Embodiment (Method 2) of Non-Default Weighting Sample Prediction Hereinafter, in terms of the decoder, another embodiment of the non-default weighting prediction (referred to as the non-default weighting sample prediction) according to the exemplary embodiment of FIG. 8 will be described below. The non-default weighting prediction process may be performed when the above-mentioned weighted_bipred_idc value is not '0'.

The input for the non-default weighting prediction process may include locations xB and yB of a leftmost sample of a current PU based on a leftmost sample of a current CU, variables nPSW and nPSH indicating a width and a height of the current PU, an L0 motion vector mvL0 for a sample, an L1 motion vector mvL1 for a sample, an L0 reference picture index refIdxL0, an L1 reference picture index refIdxL1, a flag predFlagL0 indicating whether the L0 prediction is performed (whether the L0 reference picture list is used), a flag predFlagL1 indicating whether the L1 prediction is performed (whether the L1 reference picture list is used), a bitDepth indicating the bit depth of the sample, weighting prediction variables log WDC, w0C, w1C, o0C, and O1C, and the like. Here, C represents L in the case of the luma component, Cb in the case of chroma Cb component, and Cr in the case of chroma Cr component. In addition, log WDC may represent a denominator of a weighting factor, w0C may represent an L0 weighting value, w1C may represent the L1 weighting value, o0C may represent the L0 offset value, and O1C may represent the L1 offset value. An output of the process may be a prediction sample value predSamples[x, y] within a prediction block having a (nPSW)×(nPSH) size.

The decoder may derive a predSamples[x, y] value as follows, based on mvL0, mvL1, refIdxL0, refIdxL1, Pred-FlagL0, PredFlagL1, and the like.

If the PredFlagL0 is 1 and the PredFlagL1 is 0, the decoder may perform the following process.

For example, when the log WDC value is 1 or more, the predSamples[x, y] value may be derived as follows.

$predSamples[x, y] =$ $Clip1H\big(\big(\big(predSamplesL0[x, y] * w0C + 2^{logWDC-1}\big) >> logWDC\big) + o0C\big)$ As another example, when the log WDC value is less than 1, the predSamples[x, y] value may be derived as follows.

$predSamples[x, y] = Clip1H(predSamplesL0[x, y] * w0C + o0C)$

Otherwise, if the PredFlagL0 is 0 and the PredFlagL1 is 1, the decoder may perform the following process.

For example, when the log WDC value is 1 or more, the predSamples[x, y] value may be derived as follows.

$predSamples[x, y] =$ $Clip1H\big(\big(\big(predSamplesL1[x, y] * w1C + 2^{logWDC-1}\big) >> logWDC\big) + o1C\big)$ As another example, when the log WDC value is less than 1, the predSamples[x, y] value may be derived as follows.

$$predSamples[x, y] = Clip1H(predSamplesL1[x, y] * w1C + o1C)$$

Otherwise, if the PredFlagL0 is 1 and the PredFlagL1 is 1, the motion vectors mvL0 and mvL1 are the same, and the RefPicOrderCnt (currPic, refIdxL0, L0) and RefPicOrderCnt (currPic, refIdxL1, L1) are the same (that is, if the L0 reference picture number and the L1 reference picture number are the same), the decoder may perform the following process.

For example, when the log WDC value is 1 or more, the predSamples[x, y] value may be derived as follows.

$$predSamples[x, y] = $$
$$Clip1H\left(\left((predSamplesL0[x, y] * w0C + 2^{logWDC-1}\right) >> logWDC\right) + o0C\right)$$

As another example, when the log WDC value is less than 1, the predSamples[x, y] value may be derived as follows.

$$predSamples[x, y] = Clip1H(predSamplesL0[x, y] * w0C + o0C)$$

Otherwise, the decoder may perform the following process.

$$predSamples[x, y] = Clip1H\left(\left((predSamplesL0[x, y] * w0C + \right.\right.$$
$$\left.predSamplesL1[x, y] * w1C + 2^{logWDC}\right) >> (logWDC + 1)\right) +$$
$$((o0C + o1C + 1) >> 1))$$

Figure 9:
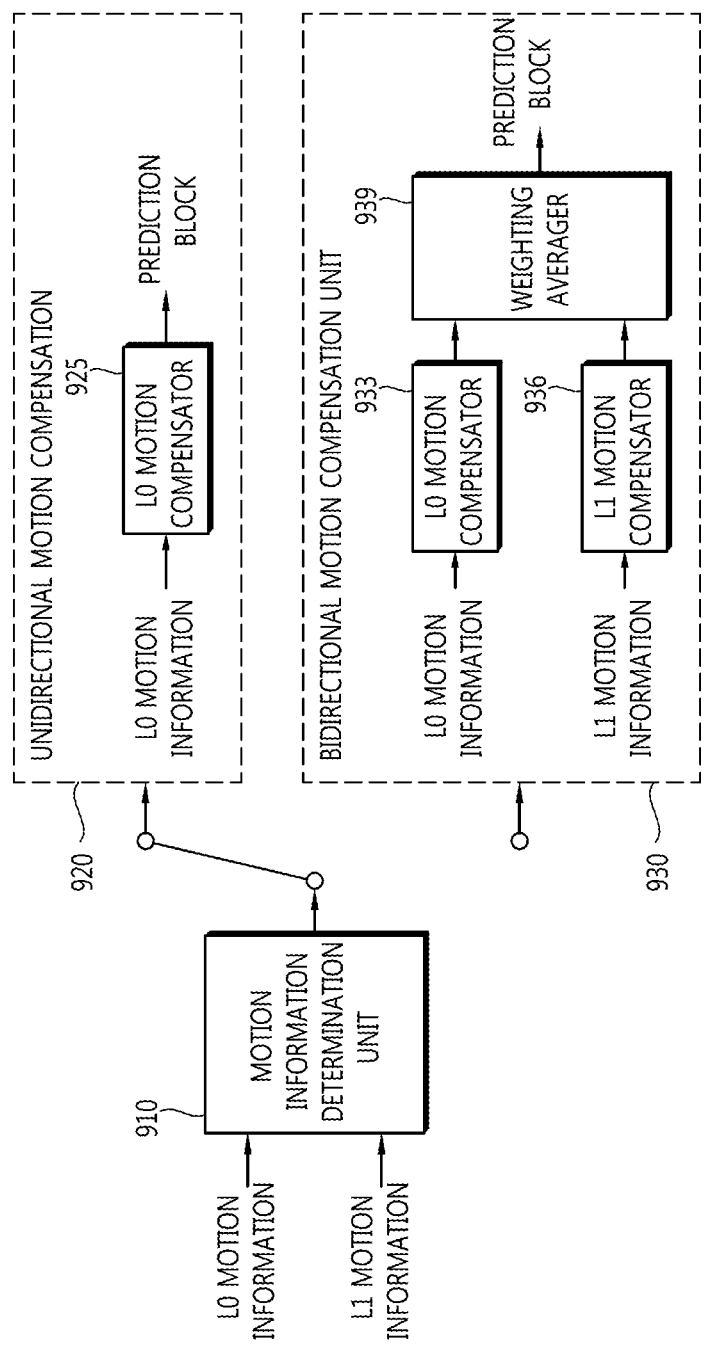
FIG. 9 is a block diagram schematically showing an inter prediction apparatus capable of performing default weighting prediction according to an exemplary embodiment of FIG. 7.

FIG. 9 is a block diagram schematically showing an inter prediction apparatus capable of performing default weighting prediction according to an exemplary embodiment of FIG. 7.

The inter prediction apparatus according to the exemplary embodiment of FIG. 9 receives the L0 motion information (the reference picture number and the motion vector) and the L1 motion information (the reference picture number and the motion vector) to generate the prediction block for the current block. The inter prediction apparatus may include a motion information determination unit 910, a unidirectional motion compensation unit 920, and a bidirectional motion compensation unit 930. In this configuration, the unidirectional motion compensation unit 920 may include an L0 motion compensator 925 and the bidirectional motion compensation unit 930 may include an L0 motion compensator 933, an L1 motion compensator 936, and a weighting averager 939.

In FIG. 9, it is assumed that the current block has two motion information (the L0 motion information and the L1 motion information). When the L0 motion information (the reference picture number and the motion vectors) and the L1 motion information (the reference picture number and the motion vectors) are the same, the inter prediction apparatus may perform the unidirectional motion compensation process on the current block to reduce the calculation complexity.

Referring to FIG. 9, the motion information determination unit 910 may determine whether the L0 motion information (the reference picture number and the motion vectors) and the L1 motion information (the reference picture number and the motion vectors) are the same. The motion compensation process may be optionally performed according to the determination result. For example, when the L0 reference picture and the L1 reference picture are the same and the L0 motion vector and the L1 motion vector are the same, the inter prediction apparatus may perform the unidirectional motion compensation process by the unidirectional motion compensation unit 920. Otherwise, the inter prediction apparatus may perform the bidirectional motion compensation process by the bidirectional motion compensation unit 930. In the unidirectional motion compensation process, the unidirectional motion compensation unit 920 receives the L0 motion information to perform the unidirectional motion compensation and in the bidirectional motion compensation process, the bidirectional motion compensation unit 930 may receive the L0 motion information and the L1 motion information to perform the bidirectional motion compensation.

In the unidirectional motion compensation process, the L0 motion compensator 925 may perform the L0 motion compensation on the current block based on the L0 reference picture and the L0 motion information. The L0 motion compensator 925 may perform the L0 motion compensation to generate the L0 motion compensated block. In this case, the L0 motion compensated block may correspond to the prediction block of the current block.

In the bidirectional motion compensation process, the L0 motion compensator 933 may perform the L0 motion compensation on the current block based on the L0 reference picture and the L0 motion information to generate the L0 motion compensated block. In addition, the L1 motion compensator 936 may perform the L1 motion compensation on the current block based on the L1 reference picture and the L1 motion information to generate the L1 motion compensated block. Here, when the high accuracy motion compensation is applied, the L0 motion compensator 933 may be referred to as the L0 high accuracy (HA) motion compensator and the L1 motion compensator 936 may also be referred to as the L1 HA motion compensator.

The weighting averager 939 may perform a weighting average on the L0 motion compensated block and the L1 motion compensated block to finally generate the single motion compensated block. Here, when the HA motion compensation is applied, the weighting averager 939 may be referred to as the HA weighting averager. In this case, the finally generated single motion compensated block may correspond to the prediction block of the current block.

The above-mentioned inter prediction apparatus may perform the motion compensation process on the current block only once when the L0 motion information and the L1 motion information are the same. Therefore, the inter prediction apparatus may reduce the calculation complexity.

Figure 10:
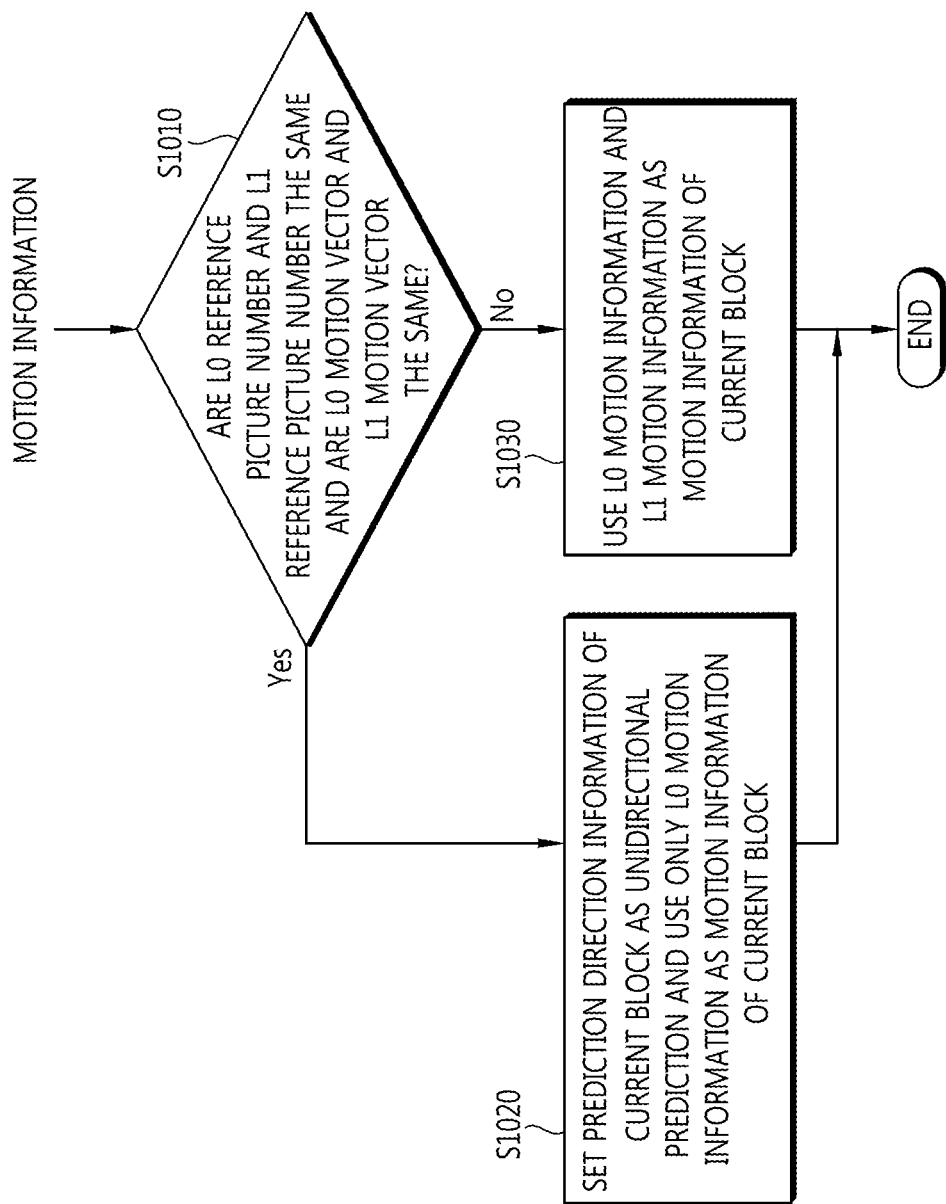
FIG. 10 is a flow chart schematically showing an inter prediction method according to another exemplary embodiment of the present invention.

FIG. 10 is a flow chart schematically showing an inter prediction method according to another exemplary embodiment of the present invention.

In the exemplary embodiment of FIG. 10, the motion information may include the prediction direction information, the L0 reference picture number, the L1 reference picture number, the L0 motion vector, the L1 motion vector, and the like. It is assumed that the prediction direction information of the motion information input to the process of FIG. 10 indicates the bidirectional prediction and the current block has the two motion information (the L0 motion information and the L1 motion information). In this case, when the L0 motion information (the reference picture number and the motion vectors) and the L1 motion information (the reference picture number and the motion vectors) are the same, the encoder and the decoder may use only the L0 motion information as the motion information of the current block to reduce the calculation complexity.

Referring to FIG. 10, the encoder and the decoder may determine whether the L0 motion information (the reference picture number and the motion vectors) and the L1 motion information (the reference picture number and the motion vectors) are the same (S1010). That is, the encoder and the decoder may determine whether the L0 reference picture number and the L1 reference picture number are the same and the L0 motion vector and the L1 motion vector are the same.

When the L0 reference picture number and the L1 reference picture number are the same and the L0 motion vector and the L1 motion vector are the same, the encoder and the decoder may again set the prediction direction information of the current block as the unidirectional prediction (S1020). In this case, when the encoded or decoded block after the current block uses the prediction direction information of the current block, the prediction direction information of the encoded or decoded block after the current block may be set as the unidirectional prediction other than the bidirectional prediction. In addition, in this case, the encoder and the decoder may use only the L0 motion information as the motion information of the current block. For example, the encoder and the decoder may perform the unidirectional motion compensation on the current block based on the L0 motion information to generate the prediction block.

When the L0 reference picture number and the L1 reference picture number are not the same and/or the L0 motion vector and the L1 motion vector are not the same, the encoder and the decoder may use the L0 motion information and the L1 motion information as the motion information of the current block (S1030). For example, the encoder and the decoder may perform the bidirectional motion compensation on the current block based on the L0 motion information and the L1 motion information to generate the prediction block.

Meanwhile, in the exemplary embodiments of the present invention as described above, the prediction direction information is set based on the identity of the L0 motion information and the L1 motion information, but the encoder and the decoder may set the prediction direction information based on the size of the current block.

As the exemplary embodiment of the present invention, the encoder and the decoder may determine whether the size of the current block is smaller than the predetermined size. Here, the current block may be the CU, PU, and/or TU and the predetermined size may be, for example, one of 8×8, 16×16, 32× 32, and the like.

When the size of the current block is smaller than the predetermined size, the encoder and the decoder may again set the prediction direction information of the current block as the unidirectional prediction. For example, the encoder and the decoder may set only the L0 motion information among the L0 motion information and the L1 motion information as the motion information of the current block. To this end, the encoder and the decoder may also use a method for removing the L1 motion information value from the motion information of the current block or setting the L1 motion information value to 0 and/or 1. In this case, the encoder and the decoder may use only the L0 motion information as the motion information of the current block. For example, the encoder and the decoder may perform the unidirectional motion compensation of the current block based on the L0 motion information to generate the prediction block.

When the size of the current block is a predetermined size or more, the encoder and the decoder may use the L0 motion information and the L1 motion information as the motion information of the current block. For example, the encoder and the decoder may perform the bidirectional motion compensation on the current block based on the L0 motion information and the L1 motion information to generate the prediction block.

Figure 11:
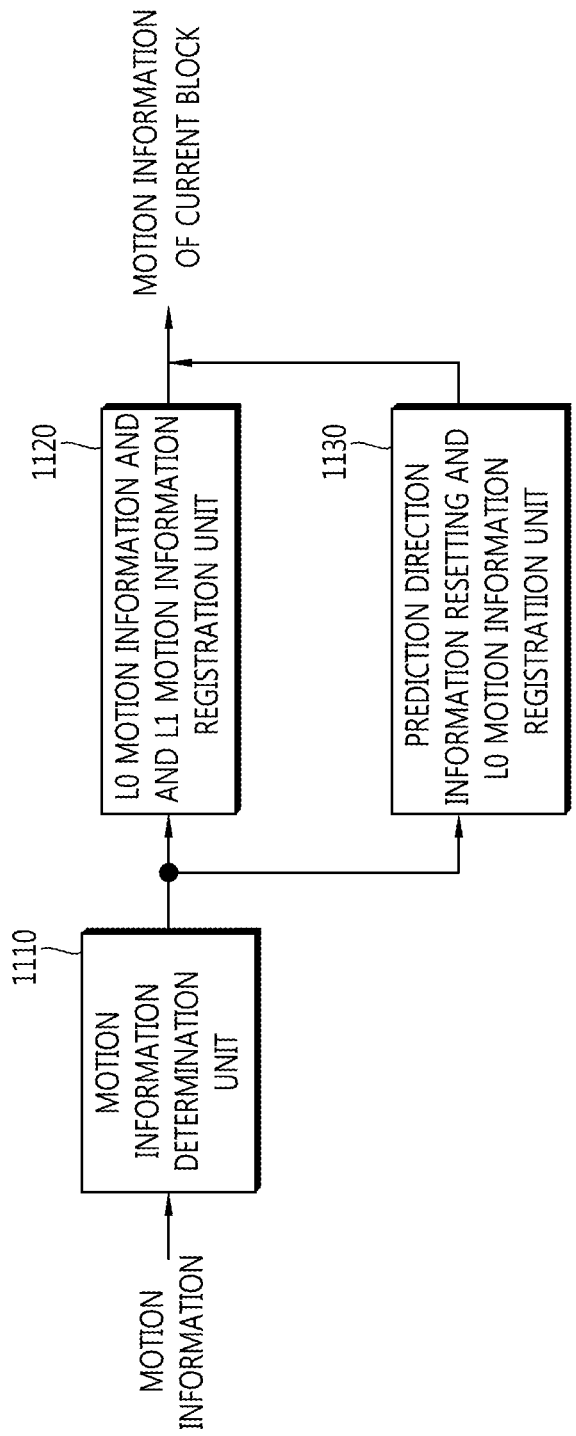
FIG. 11 is a block diagram schematically showing an inter prediction apparatus capable of performing inter prediction according to an exemplary embodiment of FIG. 10.

FIG. 11 is a block diagram schematically showing an inter prediction apparatus capable of performing inter prediction according to an exemplary embodiment of FIG. 10.

The inter prediction apparatus according to the exemplary embodiment of FIG. 11 may include a motion information determination unit 1110, an L0 motion information and L1 motion information registration unit 1120, and a prediction direction information resetting and L0 motion information registration unit 1130.

In the exemplary embodiment of FIG. 11, the motion information may include the prediction direction information, the L0 reference picture number, the L1 reference picture number, the L0 motion vector, the L1 motion vector, and the like. It is assumed that the prediction direction information of the motion information input to the motion information determination unit 1110 of FIG. 11 indicates the bidirectional prediction and the current block has the two motion information (the L0 motion information and the L1 motion information). When the L0 motion information (the reference picture number and the motion vectors) and the L1 motion information (the reference picture number and the motion vectors) are the same, the inter prediction apparatus may use only the L0 motion information as the motion information of the current block to reduce the calculation complexity.

Referring to FIG. 11, the motion information determination unit 1110 may determine whether the L0 motion information (the reference picture number and the motion vectors) and the L1 motion information (the reference picture number and the motion vectors) are the same. That is, the motion information determination unit 1110 may determine whether the L0 reference picture number and the L1 reference picture number are the same and the L0 motion vector and the L1 motion vector are the same.

When the L0 reference picture number and the L1 reference picture number are not the same and/or the L0 motion vector and the L1 motion vector are not the same, the L0 motion information and L1 motion information registration unit 1120 may perform the operation and/or calculation. The L0 motion information and L1 motion information registration unit 1120 may determine the L0 motion information and L1 motion information as the motion information used for the current block. In this case, for example, the encoder and the decoder may perform the bidirectional motion compensation on the current block based on the L0 motion information and the L1 motion information to generate the prediction block.

When the L0 reference picture number and the L1 reference picture number are the same and/or the L0 motion vector and the L1 motion vector are the same, the prediction direction information resetting and L0 motion information registration unit 1130 may perform the operation and/or calculation. When the L0 reference picture number and the L1 reference picture number are the same and the L0 motion vector and the L1 motion vector are the same, the prediction direction information resetting and L0 motion information registration unit 1130 may again set the prediction direction information of the current block as the unidirectional prediction. In this case, when the encoded or decoded block after the current block uses the prediction direction information of the current block, the prediction direction information of the encoded or decoded block after the current block may be set as the unidirectional prediction other than the bidirectional prediction. In this case, the prediction direction information resetting and L0 motion information registration unit 1130 may determine only the L0 motion information as the motion information used for the current block. In this case, for example, the encoder and the decoder may perform the unidirectional motion compensation on the current block based on the L0 motion information to generate the prediction block.

Meanwhile, in the exemplary embodiments of the present invention as described above, the prediction direction information is set based on the identity of the L0 motion information and the L1 motion information, but the inter prediction apparatus may also set the prediction direction information based on the size of the current block.

As the exemplary embodiment of the present invention, the motion information determination unit 1110 may determine whether the size of the current block is smaller than the predetermined size. Here, the current block may be the CU, PU, and/or TU and the predetermined size may be, for example, one of 8×8, 16×16, 32×32, and the like.

When the size of the current block is a predetermined size or more, the L0 motion information and L1 motion information registration unit 1120 may perform the operation and/or calculation. The L0 motion information and L1 motion information registration unit 1120 may determine the L0 motion information and L1 motion information as the motion information used for the current block. In this case, for example, the encoder and the decoder may perform the bidirectional motion compensation on the current block based on the L0 motion information and the L1 motion information to generate the prediction block.

When the size of the current block is smaller than a predetermined size, the prediction direction information resetting and L0 motion information registration unit 1130 may perform the operation and/or calculation. When the size of the current block is smaller than the predetermined size, the prediction direction information resetting and L0 motion information registration unit 1130 may again set the prediction direction information of the current block as the unidirectional prediction. For example, the prediction direction information resetting and L0 motion information registration unit 1130 may set only the L0 motion information among the L0 motion information and the L1 motion information as the motion information of the current block. To this end, the prediction direction information resetting and L0 motion information registration unit 1130 may also use the method for removing the L1 motion information value among the motion information of the current block or setting the L1 motion information value to 0 and/or 1. In this case, the prediction direction information resetting and L0 motion information registration unit 1130 may determine only the L0 motion information as the motion information used for the current block. In this case, for example, the encoder and the decoder may perform the unidirectional motion compensation on the current block based on the L0 motion information to generate the prediction block.

Figure 12:
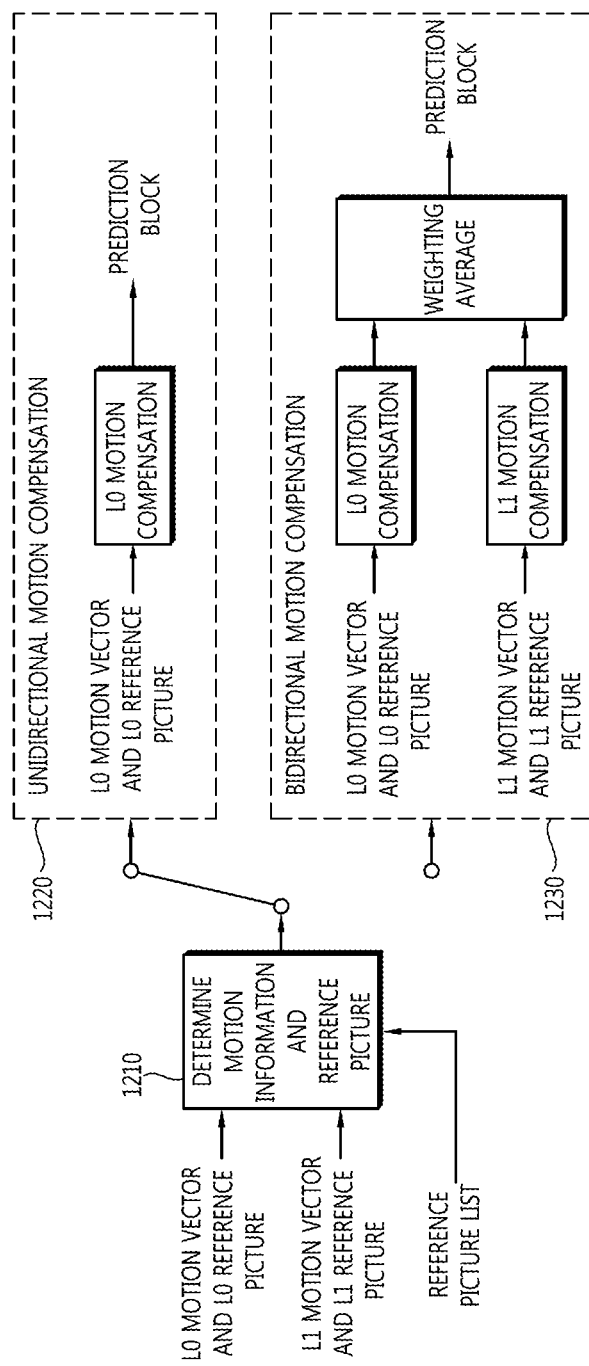
FIG. 12 is a conceptual diagram schematically showing an inter prediction method according to another exemplary embodiment of the present invention.

FIG. 12 is a conceptual diagram schematically showing an inter prediction method according to another exemplary embodiment of the present invention. FIG. 12 shows an exemplary embodiment when the default weighting prediction is applied. In FIG. 12, it is assumed that the current block has two motion information (the L0 motion information and the L1 motion information).

Referring to FIG. 12, In the motion information and reference picture determining process 1210, it may be determined whether the unidirectional motion compensation is performed or the bidirectional motion compensation is performed, based on the L0 motion information (the L0 motion vector and the L0 reference picture number), the L1 motion information (the L1 motion vector and the L1 reference picture number), and/or the L1 reference picture list. In the motion information and reference picture determining process 1210, it may be determined whether the L0 motion information (the L0 motion vector and the L0 reference picture number) and the L1 motion information (the L1 motion vector and the L1 reference picture number) are the same. The motion compensation process may be optionally performed according to the determination result.

For example, when the L0 reference picture and the L1 reference picture are the same and the L0 motion vector and the L1 motion vector are the same, the encoder and the decoder may perform the unidirectional motion compensation process 1220 when the number of reference pictures included in the L1 reference picture list is one or less and may perform the bidirectional motion compensation process 1230 when the number of reference pictures included in the L1 reference picture list is two or more.

When the L0 reference picture and the L1 reference picture are the same, the L0 motion vector and the L1 motion vector are the same, and the number of reference pictures included in the L1 reference picture list is two or more, the encoder and the decoder may set another reference picture excluding the L1 reference picture from the reference pictures within the L1 reference picture list as a new L1 reference picture. In this case, the bidirectional motion compensation process 1230 may be performed based on a newly set L1 reference picture other than the existing L1 reference picture. In this case, the encoder and the decoder may use the L1 motion vector as it is and search the new L1 motion vector in the newly set L1 reference picture so as to be used for the bidirectional motion compensation 1230 instead of the existing L1 motion vector.

In addition, when the L0 reference picture and the L1 reference picture are not the same and/or the L0 motion vector and the L1 motion vector are not the same, the encoder and the decoder may perform a unidirectional motion compensation process 1230.

In the unidirectional motion compensation process 1220, the encoder and the decoder may perform the L0 motion compensation on the current block using the L0 reference picture and the L0 motion information. The encoder and the decoder may perform the L0 motion compensation to generate the L0 motion compensated block. In this case, the L0 motion compensated block may correspond to the prediction block of the current block.

In the bidirectional motion compensation process 1230, the encoder and the decoder may perform the L0 motion compensation on the current block using the L0 reference picture and the L0 motion information to generate the L0 motion compensated block. Further, the encoder and the decoder may perform the L1 motion compensation on the current block using the L1 reference picture and the L1 motion information to generate the L1 motion compensated block.

When the bidirectional motion compensation process 1230 is applied, the encoder and the decoder may finally perform the weighting average on the L0 motion compensated block and the L1 motion compensated block to generate the single motion compensated block. In this case, the finally generated single motion compensated block may correspond to the prediction block of the current block.

Figure 13:
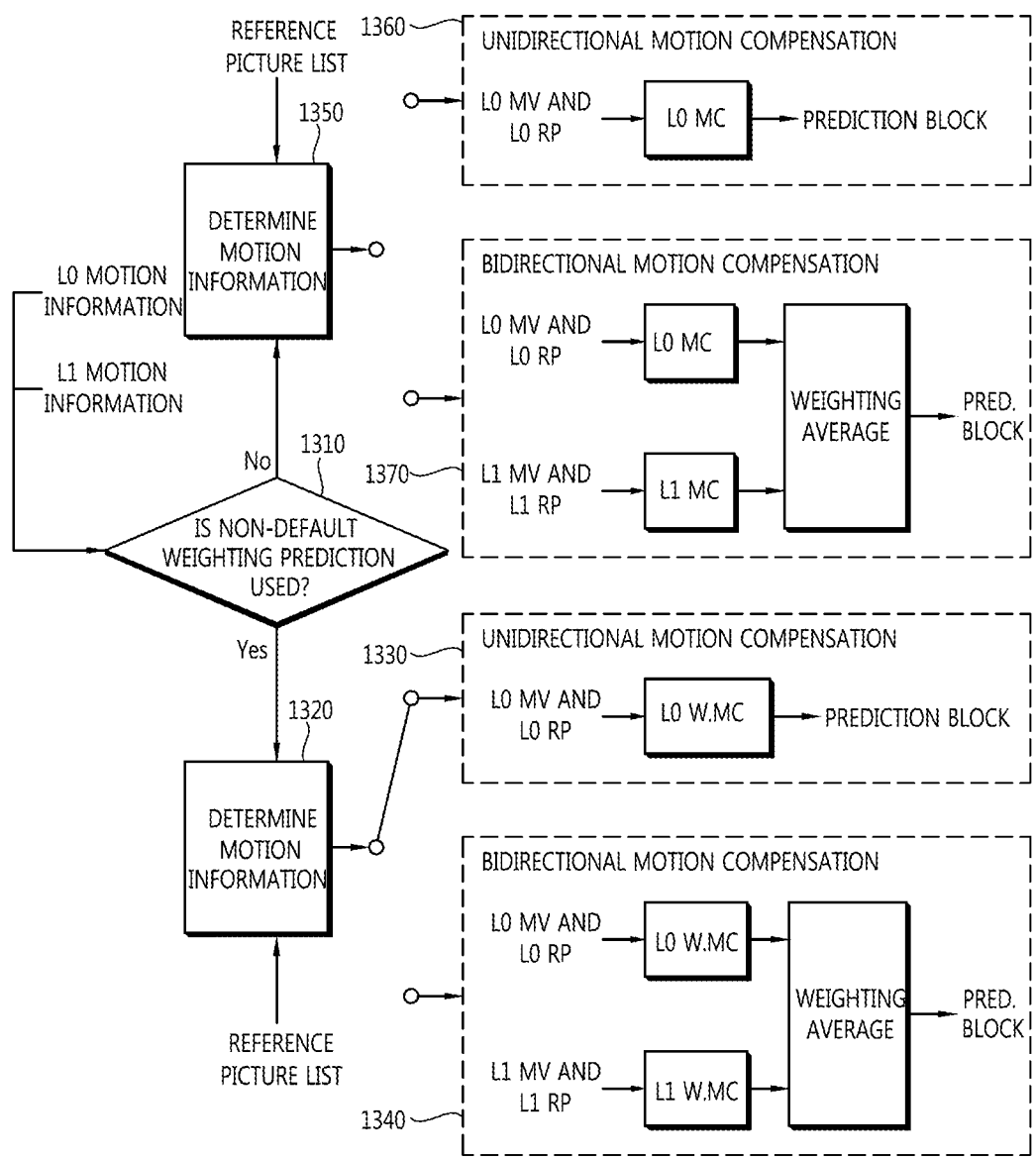
FIG. 13 is a conceptual diagram schematically showing an inter prediction method according to another exemplary embodiment of the present invention.

FIG. 13 is a conceptual diagram schematically showing an inter prediction method according to another exemplary embodiment of the present invention.

In FIG. 13, it is assumed that the current block has two motion information (the L0 motion information and the L1 motion information). In FIG. 12, the above-mentioned inter prediction method may be identically or similarly applied to the non-default weighting prediction as shown in the exemplary embodiment of FIG. 13, in addition to the default weighting prediction.

Referring to FIG. 13, the encoder and the decoder may determine whether the non-default weighting prediction is used for the current block or the default weighting prediction is used for the current block (1310). For example, this may be indicated by the weighting prediction index. The detailed exemplary embodiment of the weighting prediction index is described and therefore, the description thereof will be omitted.

When the non-default weighting prediction is used, it may be determined whether the L0 motion information (the reference picture number and the motion vectors) and the L1 motion information (the reference picture number and the motion vectors) are the same in the motion information determining process 1320. The motion compensation process may be optionally performed according to the determination result.

For example, when the L0 reference picture and the L1 reference picture are the same and the L0 motion vector and the L1 motion vector are the same, the encoder and the decoder may perform the unidirectional motion compensation process 1330 when the number of reference pictures included in the L1 reference picture list is one or less and may perform the bidirectional motion compensation process 1340 when the number of reference pictures included in the L1 reference picture list is two or more.

When the L0 reference picture and the L1 reference picture are the same, the L0 motion vector and the L1 motion vector are the same, and the number of reference pictures included in the L1 reference picture list is two or more, the encoder and the decoder may set another reference picture excluding the L1 reference picture from the reference pictures within the L1 reference picture list as a new L1 reference picture. In this case, the bidirectional motion compensation process 1340 may be performed based on a newly set L1 reference picture other than the existing L1 reference picture may be performed. In this case, the encoder and the decoder may use the L1 motion vector as it is and search the new L1 motion vector in the newly set L1 reference picture so as to be used for the bidirectional motion compensation 1340 instead of the existing L1 motion vector.

When the non-default weighting prediction is used, the encoder and the decoder may apply the weight other than the default weight, that is, the non-default weight to the L0 motion compensated block and/or the L1 motion compensated block at the time of performing the motion compensation. The process of performing the unidirectional motion compensation 1330 and the bidirectional motion compensation 1340 when the non-default weighting prediction is applied is the same in FIG. 8 other than the above-mentioned contents and therefore, the description thereof will be described.

When the default weighting prediction is applied, the same motion compensation process as the exemplary embodiments of FIG. 12 as described above may be performed. Therefore, the detailed exemplary embodiments of the present invention of the motion compensation process when the default weighting prediction is applied will be described herein.

In the inter prediction method of FIGS. 12 and 13 as described above, when the L0 motion information and the L1 motion information are the same block, the bidirectional motion compensation may be performed based on the L0 reference picture and the L1 reference picture that is not the same as the L0 reference picture. Therefore, in the inter prediction method, the problem caused by the repetitive performance of the same process can be solved and the encoding/decoding efficiency can be improved.

Figure 14:
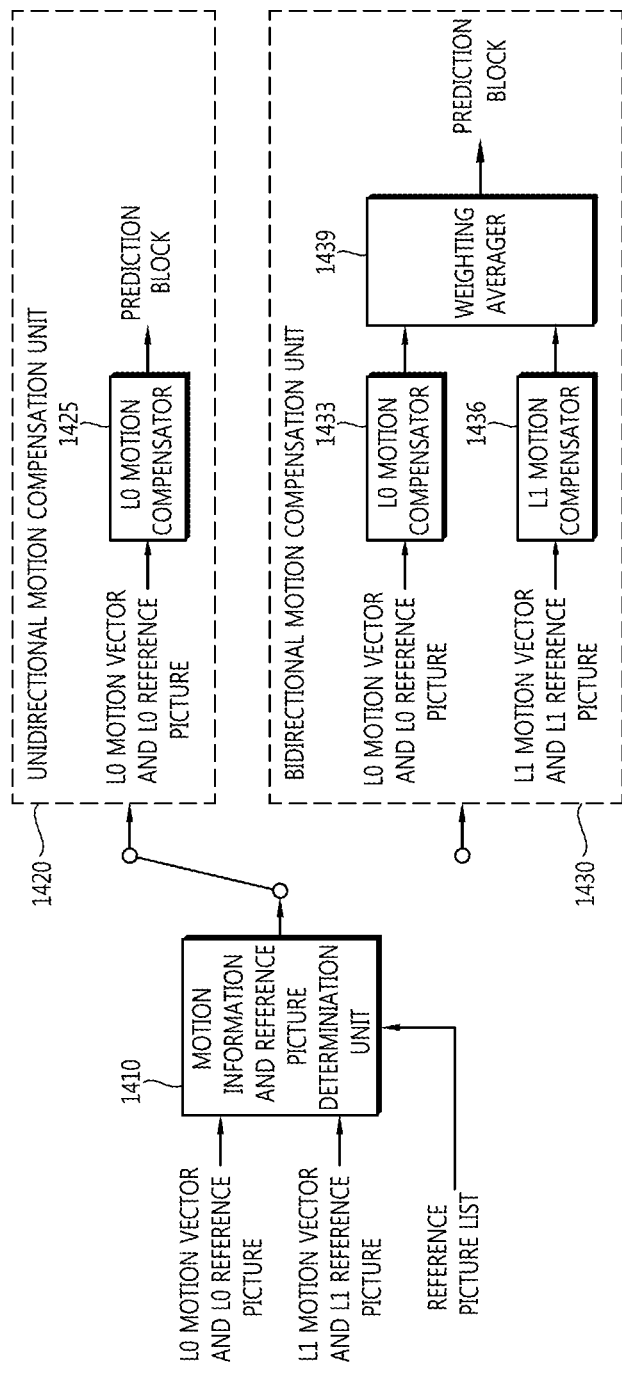
FIG. 14 is a block diagram schematically showing an inter prediction apparatus capable of performing default weighting prediction according to an exemplary embodiment of FIG. 12.

FIG. 14 is a block diagram schematically showing an inter prediction apparatus capable of performing default weighting prediction according to an exemplary embodiment of FIG. 12.

In FIG. 14, it is assumed that the current block has two motion information (the L0 motion information and the L1 motion information). The inter prediction apparatus according to the exemplary embodiment of FIG. 14 receives the L0 motion information (the reference picture number and the motion vector), the L1 motion information (the reference picture number and the motion vector), and the L1 reference picture list to generate the prediction block for the current block. The inter prediction apparatus may include a motion information and reference determination unit 1410, a unidirectional motion compensation unit 1420, and a bidirectional motion compensation unit 1430. In this configuration, the unidirectional motion compensation unit 1420 may include an L0 motion compensator 1425 and the bidirectional motion compensation unit 1430 may include an L0 motion compensator 1433, an L1 motion compensator 1436, and a weighting averager 1439.

Referring to FIG. 14, the motion information and reference picture determination unit 1410 may determine whether the unidirectional motion compensation is performed or the bidirectional motion compensation is performed, based on the L0 motion information (the L0 motion vector and the L0 reference picture number), the L1 motion information (the L1 motion vector and the L1 reference picture number), and/or the L1 reference picture list.

For example, when the L0 reference picture and the L1 reference picture are the same and the L0 motion vector and the L1 motion vector are the same, the inter prediction apparatus may perform the unidirectional motion compensation process by the unidirectional motion compensation unit 1420 when the number of reference pictures included in the L1 reference picture list is one or less and may perform the bidirectional motion compensation process by the bidirectional motion compensation unit 1430 when the number of reference pictures included in the L1 reference picture list is two or more.

When the L0 reference picture and the L1 reference picture are the same, the L0 motion vector and the L1 motion vector are the same, and the number of reference pictures included in the L1 reference picture list is two or more, the motion information and reference picture determination unit 1410 may set another reference picture excluding the L1 reference picture from the reference pictures within the L1 reference picture list as a new L1 reference picture. In this case, the bidirectional motion compensation process may be performed based on a newly set L1 reference picture other than the existing L1 reference picture. In this case, the inter prediction apparatus may use the L1 motion vector as it is and search the new L1 motion picture in the newly set L1 reference picture so as to be used for the bidirectional motion compensation 1230 instead of the existing L1 motion vector.

In addition, when the L0 reference picture and the L1 reference picture are not the same and/or the L0 motion vector and the L1 motion vector are not the same, the inter prediction apparatus may perform the bidirectional motion compensation process by the bidirectional motion compensation unit 1430.

During the unidirectional motion compensation process, the L0 motion compensator 1425 may perform the L0 motion compensation on the current block based on the L0 reference picture and the L0 motion information. The L0 motion compensator 1425 may perform the L0 motion compensation to generate the L0 motion compensated block. In this case, the L0 motion compensated block may correspond to the prediction block of the current block.

During the bidirectional motion compensation process, the L0 motion compensator 1433 may perform the L0 motion compensation on the current block based on the L0 reference picture and the L0 motion information to generate the L0 motion compensated block. In addition, the L1 motion compensator 1436 may perform the L1 motion compensation on the current block based on the L1 reference picture and the L1 motion information to generate the L1 motion compensated block. Here, when the high accuracy motion compensation is applied, the L0 motion compensator 1433 may be referred to as the L0 high accuracy (HA) motion compensator and the L1 motion compensator 1436 may also be referred to as the L1 HA motion compensator.

The weighting averager 1439 may perform the weighting average on the L0 motion compensated block and the L1 motion compensated block to finally generate the single motion compensated block. Here, when the HA motion compensation is applied, the weighting averager 1439 may be referred to as the HA weighting averager. In this case, the finally generated single motion compensated block may correspond to the prediction block of the current block.

When the L0 motion information and the L1 motion information are the same, the above-mentioned inter prediction apparatus may perform the bidirectional motion compensation for the current block based on the L0 reference picture and the L1 reference picture that are not same as the L0 reference picture. Therefore, the inter prediction apparatus may improve the encoding/decoding efficiency.

Figure 15:
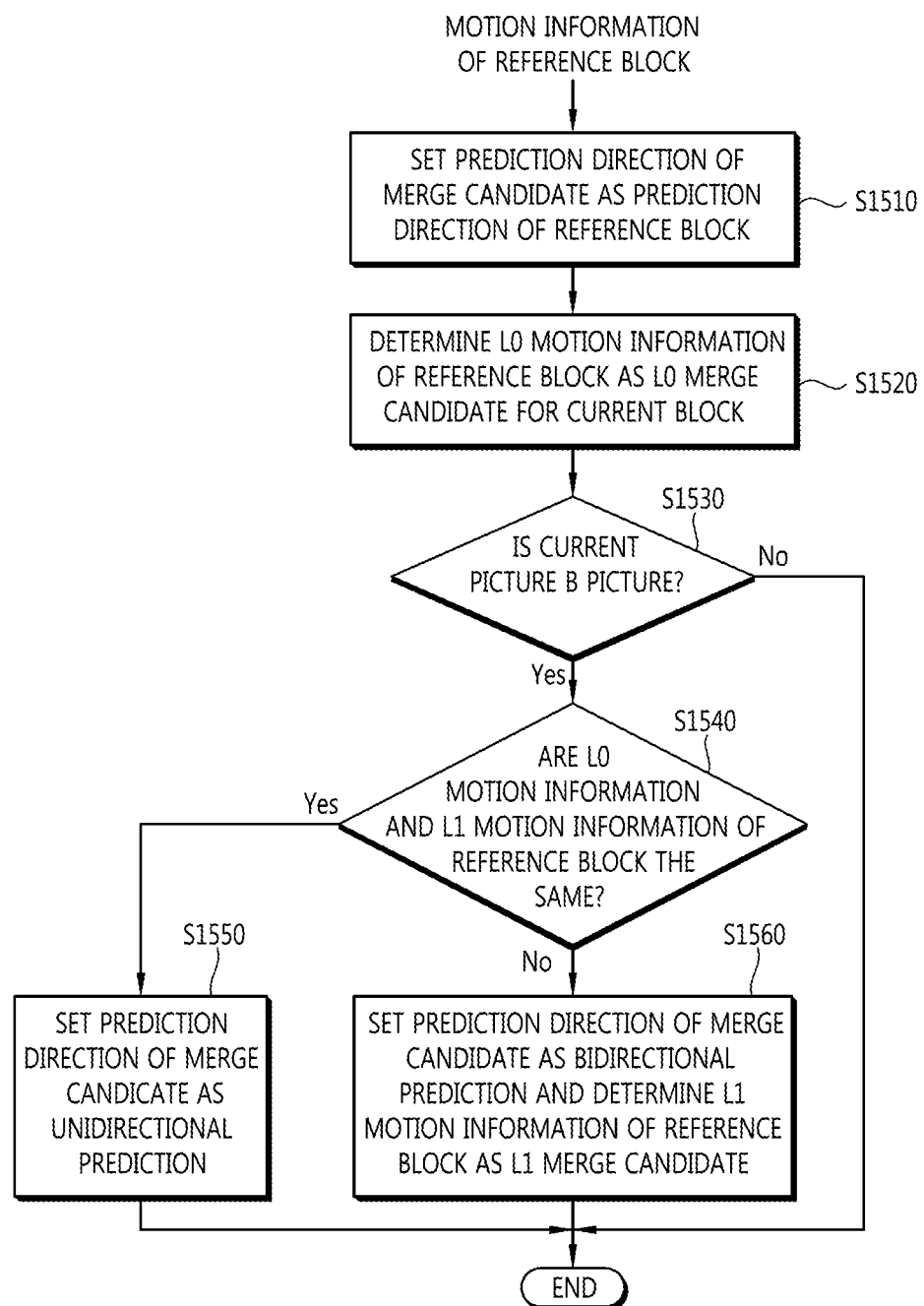
FIG. 15 is a flow chart schematically showing a merge candidate determining method according to an exemplary embodiment of the present invention when a merge is applied to a current block.

FIG. 15 is a flow chart schematically showing a merge candidate determining method according to an exemplary embodiment of the present invention when a merge is applied to a current block. Here, the merge candidates may also be referred to as the motion information candidate. Hereinafter, the merge candidate corresponding to the L0 motion information are referred to as an L0 merge candidate and the merge candidate corresponding to the L1 motion information is referred to as an L1 merge candidate.

As described above, when the merge is applied, if the motion information of the reconstructed neighboring blocks and/or the motion information of the col block are present, the encoder and the decoder may determine or register the information as the merge candidates for the current block. FIG. 15 shows a process in which the motion information of the reconstructed neighboring blocks and/or the motion information of the col block are determined and registered as the merge candidates for the current block. In the exemplary embodiment of FIG. 15, the motion information may include the prediction direction information, the L0 reference picture number, the L1 reference picture number, the L0 motion vector, the L1 motion vector, and the like. Hereinafter, the reference block may mean the reconstructed neighboring blocks and/or the col block and the reference motion information may mean the motion information of the reconstructed neighboring blocks and/or the motion information of the col block.

When the merge candidates are determined or registered, the encoder may select the merge candidates capable of providing the optimal encoding efficiency as the motion information of the current block from the determined or registered merge candidates. In this case, the merge index indicating the selected merge candidates may be transmitted to the decoder, while being included in the bit streams. The decoder may use the transmitted merge index to select one of the determined or registered merge candidates and may determine the selected merge candidates as the motion information of the current block.

Further, when the block in which the L0 motion information and the L1 motion information are the same is generated, the generated block may affect blocks encoded later. For example, when the merge is applied, the motion information (the L0 motion information and the L1 motion information) of the reconstructed neighboring blocks and/or the col block as described above may be used as the motion information of the current block as it is. Therefore, when the block in which the L0 motion information and the L1 motion information are the same is generated, other blocks in which the L0 motion information and the L1 motion information are the same may be generated more.

In order to solve the above problems, when the L0 motion information (the L0 reference picture number and the L0 motion vector) and the L1 motion information (the L1 reference picture number and the L1 motion vector) of the reference block are the same, the encoder and the decoder may determine or register only the L0 motion information of the reference block as the merge candidates for the current block.

Referring to FIG. 15, the encoder and the decoder may set the prediction directions of the merge candidates for the current block as the prediction directions of the reference block (S1510). As described above, the prediction direction information may mean information indicating whether the unidirectional prediction is applied to the block subjected to the prediction or the bidirectional prediction is applied thereto. Therefore, the prediction directions may correspond to the unidirectional prediction or the bidirectional prediction. In addition, the encoder and the decoder may determine or register the L0 motion information of the reference block for the current block as the L0 merge candidate for the current block (S1520).

Referring again to FIG. 15, the encoder and the decoder may determine whether the current picture is the B picture (S1530). Here, the current picture may means the picture including the current block. When the current picture is not the B picture, the encoder and the decoder may not perform the L1 merge candidate determining process. When the current picture is the B picture, the encoder and the decoder may determine whether the L0 motion information of the reference block and the L1 motion information of the reference block are the same (S1540).

When the L0 motion information of the reference block and the L1 motion information of the reference block are the same, the encoder and the decoder may set the prediction directions of the merge candidates for the current block as the unidirectional prediction (S1550). In this case, the encoder and the decoder may not register the L1 motion information of the reference block as the L1 merge candidate for the current block. That is, in this case, only the L0 motion information of the reference block may be determined or registered as the merge candidates for the current block. When the L0 motion information of the reference block and the L1 motion information of the reference block are not the same, the encoder and the decoder may set the prediction directions of the merge candidates for the current block as the bidirectional prediction and may determine or register the L1 motion information of the reference block as the L1 merge candidate for the current block (S1560).

Figure 16:
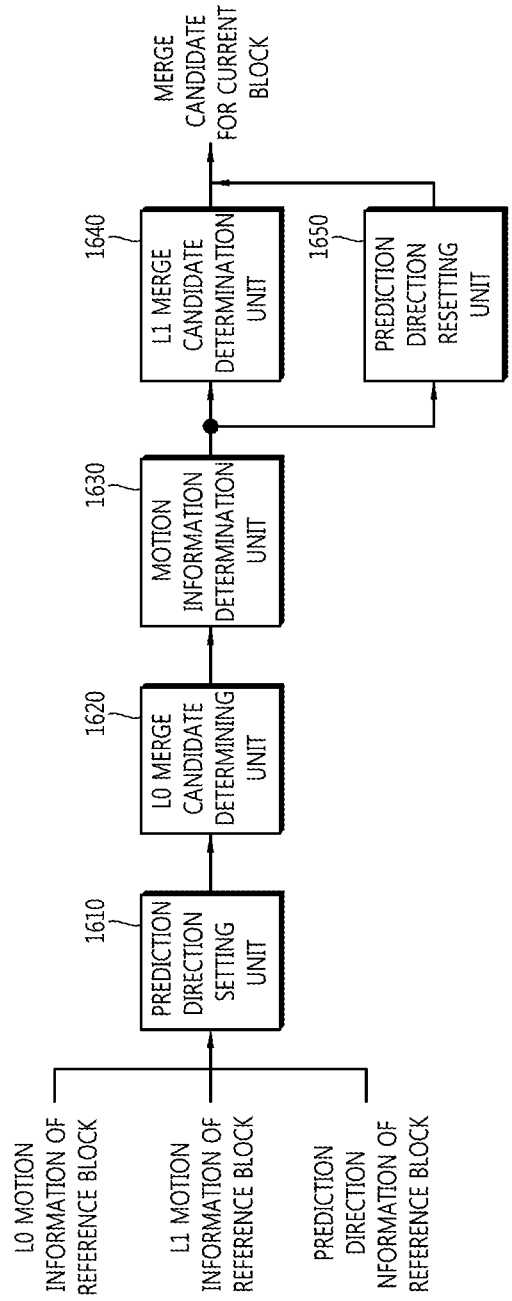
FIG. 16 is a block diagram schematically showing an inter prediction apparatus capable of performing a merge candidate determining process according to an exemplary embodiment of FIG. 15.

FIG. 16 is a block diagram schematically showing an inter prediction apparatus capable of performing a merge candidate determining process according to an exemplary embodiment of FIG. 15. The inter prediction apparatus of FIG. 16 may include a prediction direction setting unit 1610, an L0 merge candidate determination unit 1620, a motion information determination unit 1630, an L1 merge candidate determination unit 1640, and a prediction direction resetting unit 1650.

The inter prediction apparatus according to the exemplary embodiment of FIG. 16 may determine the merge candidates for the current block, based on the L0 motion information of the reference block, the L1 motion information of the reference block, and the prediction direction information of the reference block. In this case, when the L0 motion information (the L0 reference picture number and the L0 motion vector) and the L1 motion information (the L1 reference picture number and the L1 motion vector) of the reference block are the same, the inter prediction apparatus may determine or register only the L0 motion information of the reference block as the merge candidates for the current block. In the exemplary embodiment of FIG. 16, the motion information may include the L0 reference picture number, the L1 reference picture number, the L0 motion vector, the L1 motion vector, and the like.

Referring to FIG. 16, the prediction direction setting unit 1610 may set the prediction directions of the merge candidates for the current block as the prediction directions of the reference block. In addition, the L0 merge candidate determination unit 1620 may determine or register the L0 motion information of the reference block as the L0 merge candidate for the current block. The motion information determination unit 1630 may determine whether the L0 motion information of the reference block and the L1 motion information of the reference block are the same.

When the L0 motion information of the reference block and the L1 motion information of the reference block are not the same, the L1 merge candidate determination unit 1640 may determine or register the L1 motion information of the reference block as the L1 merge candidate for the current block. When the L0 motion information of the reference block and the L1 motion information of the reference block are the same, the prediction direction resetting unit 1650 may set the prediction directions of the merge candidates for the current block as the unidirectional prediction. In this case, the inter prediction apparatus may not register the L1 motion information of the reference block as the L1 merge candidate for the current block. That is, in this case, only the L0 motion information of the reference block may be determined or registered as the merge candidates for the current block.

Figure 17:
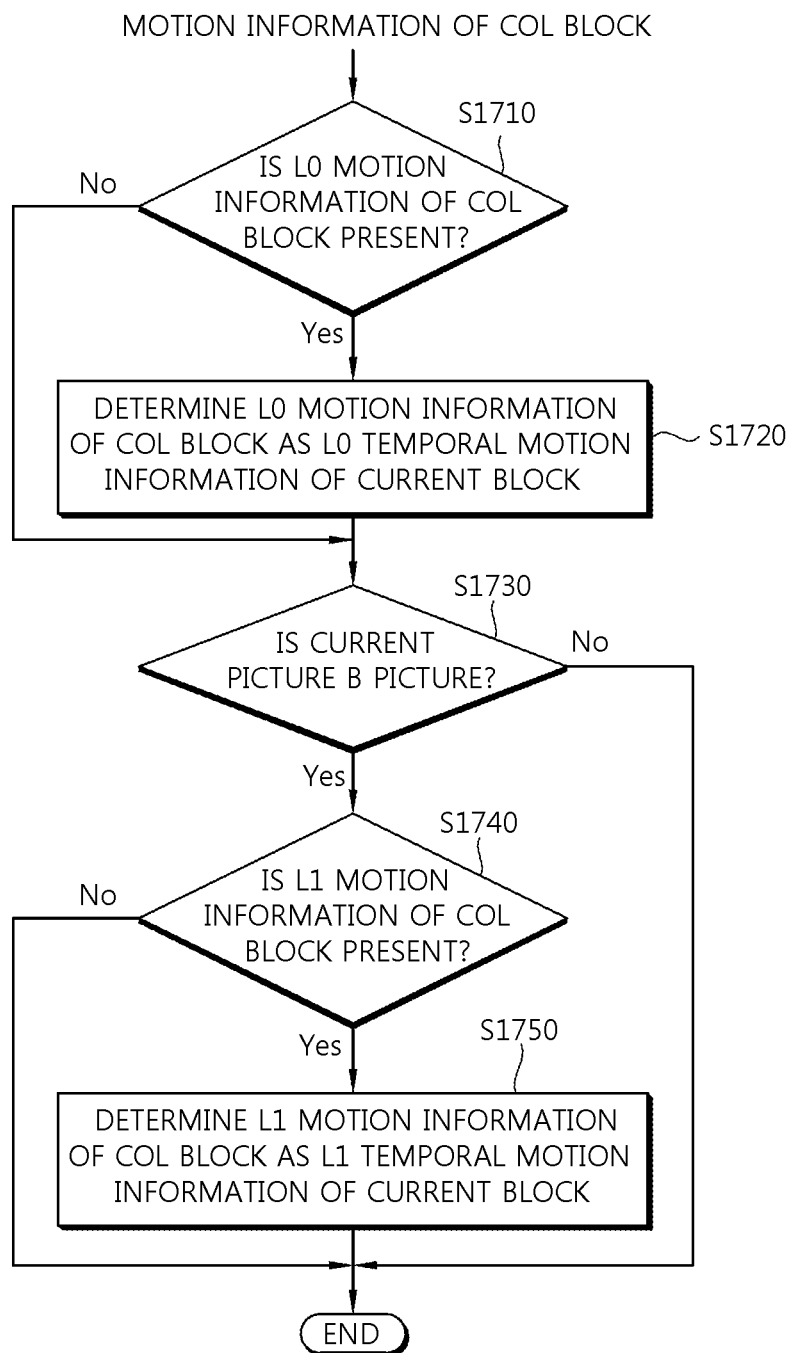
FIG. 17 is a flow chart schematically showing a temporal motion information deriving method according to an exemplary embodiment of the present invention.

FIG. 17 is a flow chart schematically showing a temporal motion information deriving method according to an exemplary embodiment of the present invention.

As described above, in the AMVP and the merge mode, in order to derive the motion information of the current block, the motion information of the reconstructed neighboring blocks and/or the motion information of the col block may be used. Here, the motion information derived from the col block may be referred to as the temporal motion information.

The temporal motion information may be derived from the motion information of the col block corresponding to the current block within the previously reconstructed reference pictures. For example, when the L0 temporal motion information of the current block is derived, the encoder and the decoder may use the L0 motion information of the col block corresponding to the current block within the reference pictures. However, when the L0 motion information is not present in the col block, the encoder and the decoder may use the L1 motion information of the col block as the L0 temporal motion information of the current block. On the other hand, when the L1 temporal motion information of the current block is derived, the encoder and the decoder may use the L1 motion information of the col block corresponding to the current block within the reference pictures. However, when the L1 motion information is not present in the col block, the encoder and the decoder may use the L0 motion information of the col block as the L1 temporal motion information of the current block. As the result of the process performance as described above, the phenomenon in which the L0 motion information and the L1 motion information of the current block are the same may occur.

In order to solve the above-mentioned problems, a temporal motion information deriving method for deriving the temporal motion information of the current block may be provided according to list information. In the exemplary embodiment of FIG. 17, the list information may mean the information indicating whether the L0 motion information and/or the L1 motion information are present in the col block.

Referring to FIG. 17, the encoder and the decoder may determine whether the L0 motion information is present in the col block for the current block (S1710). When the L0 motion information is present in the col block, the encoder and the decoder may determine or set the L0 motion information of the col block as the L0 temporal motion information of the current block (S1720). When the L0 motion information is not present in the col block, the encoder and the decoder may not set, for example, the L0 temporal motion information. That is, in this case, the L0 temporal motion information may not be derived. In this case, the temporal motion information used for the inter prediction of the current block may not include the L0 temporal motion information. When the L0 motion information is not present in the col block, as another example, the encoder and the decoder may set the L1 motion information of the col block as the L0 temporal motion information of the current block or may also set the motion vector (0,0) as the L0 temporal motion vector for the current block.

Referring again to FIG. 17, the encoder and the decoder may determine whether the current picture is the B picture (S1730). When the current picture is not the B picture, the encoder and the decoder may end the temporal motion information deriving process. When the current picture is the B picture, the encoder and the decoder may perform the L1 motion information setting process for the current block.

When the current picture is the B picture, the encoder and the decoder may determine whether the L1 motion information is present in the col block for the current block (S1740). When the L1 motion information is present in the col block, the encoder and the decoder may determine or set the L1 motion information of the col block as the L1 temporal motion information of the current block (S1750). When the L1 motion information is not present in the col block, the encoder and the decoder may not set, for example, the L1 temporal motion information. That is, in this case, the L1 temporal motion information may not be derived. In this case, the temporal motion information used for the inter prediction of the current block may not include the L1 temporal motion information. When the L1 motion information is not present in the col block, as another example, the encoder and the decoder may also set the motion block (0,0) as the L1 temporal motion vector for the current block.

Figure 18:
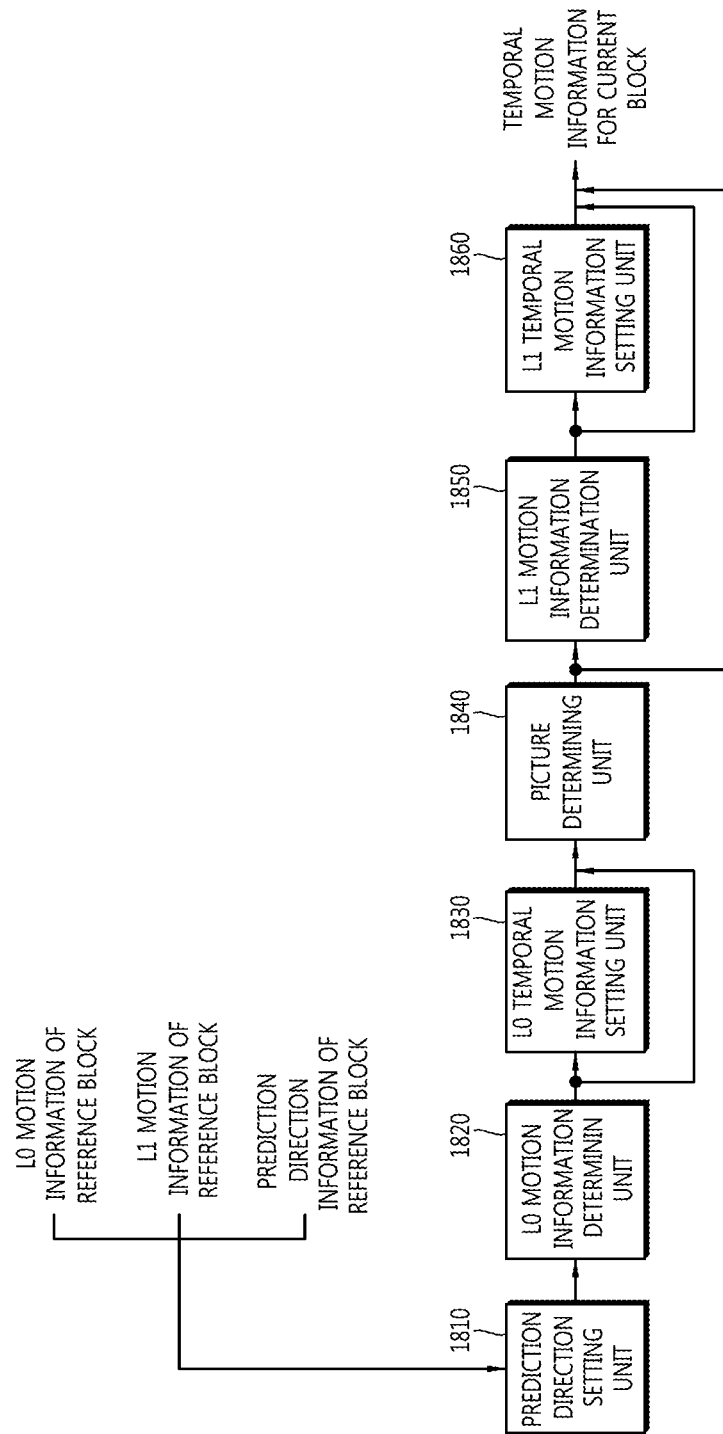
FIG. 18 is a block diagram schematically showing an inter prediction apparatus capable of performing a temporal motion information deriving process according to an exemplary embodiment of FIG. 17.

FIG. 18 is a block diagram schematically showing an inter prediction apparatus capable of performing a temporal motion information deriving process according to an exemplary embodiment of FIG. 17. The inter prediction apparatus according to the exemplary embodiment of FIG. 18 may include a prediction direction setting unit 1810, an L0 motion information determination unit 1820, an L0 temporal motion information setting unit 1830, a picture determination unit 1840, an L1 motion information determination unit 1850, and an L1 temporal motion information setting unit 1860.

The inter prediction apparatus according to the exemplary embodiment of FIG. 18, the temporal motion information of the current block may be derived according to the list information. In the exemplary embodiment of FIG. 18, the list information may mean the information indicating whether the L0 motion information and/or the L1 motion information are present in the col block.

Referring to FIG. 18, the prediction direction setting unit 1810 may set the prediction directions of the temporal motion information of the current block as the prediction directions of the col block. The L0 motion information determination unit 1820 may determine whether the L0 motion information is present in the col block for the current block. When the L0 motion information is present in the col block, the L0 temporal motion information setting unit 1830 may determine or set the L0 motion information of the col block as the L0 temporal motion information of the current block. When the L0 motion information is not present in the col block, the inter prediction apparatus may not set, for example, the L0 temporal motion information. That is, in this case, the L0 temporal motion information may not be derived. In this case, the temporal motion information used for the inter prediction of the current block may not include the L0 temporal motion information. When the L0 motion information is not present in the col block, as another example, the inter prediction apparatus may set the L1 motion information of the col block as the L0 temporal motion information of the current block or may also set the motion vector (0,0) as the L0 temporal motion vector for the current block.

The picture determination unit 1840 may determine whether the current picture is the B picture. When the current picture is not the B picture, the inter prediction apparatus may end the temporal motion information deriving process. In this case, the inter prediction apparatus may set the prediction directions of the temporal motion information of the current block as the unidirectional prediction and then, end the temporal motion information deriving process. When the current picture is the B picture, the inter prediction apparatus may perform the L1 motion information setting process for the current block.

When the current picture is the B picture, the L1 motion information determination unit 1850 may determine whether the L1 motion information is present in the col block for the current block. When the L1 motion information is present in the col block, the L1 temporal motion information setting unit 1860 may determine or set the L1 motion information of the col block as the L1 temporal motion information of the current block. When the L1 motion information is not present in the col block, the inter prediction apparatus may not set, for example, the L1 temporal motion information. That is, in this case, the L1 temporal motion information may not be derived. In this case, the temporal motion information used for the inter prediction of the current block may not include the L1 temporal motion information. When the L1 motion information is not present in the col block, as another example, the inter prediction apparatus may also set the motion vector (0,0) as the L1 temporal motion vector of the current block.

Figure 19:
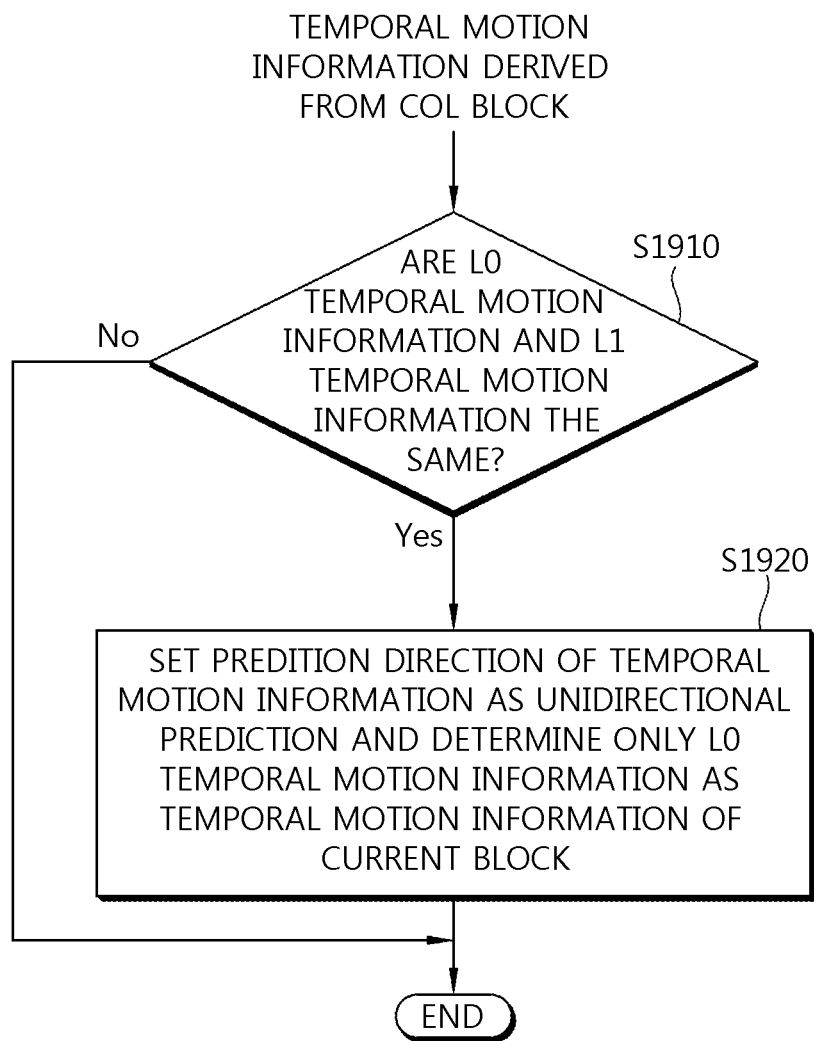
FIG. 19 is a flow chart schematically showing a temporal motion information deriving method of a current block according to another exemplary embodiment of the present invention.

FIG. 19 is a flow chart schematically showing a temporal motion information deriving method of a current block according to another exemplary embodiment of the present invention.

As described above, the temporal motion information may be derived from the motion information of the col block corresponding to the current block within the previously reconstructed reference pictures. The temporal motion information derived from the col block may include the prediction direction information, the L0 reference picture number, the L1 reference picture number, the L0 motion vector, the L1 motion vector, and the like. In this case, the case in which the L0 temporal motion information (the L0 reference picture number and the L0 motion vector) and the L1 temporal motion information (the L1 reference picture number and the L1 motion vector) that are derived from the col block are the same may be generated. When the L0 temporal motion information and the L1 temporal motion information are the same, that is, when the L0 reference picture number and the L1 reference picture number are the same and the L0 motion vector and the L1 motion vector are the same, the encoder and the decoder may use only the L0 temporal motion information as the temporal motion information of the current block.

Referring to FIG. 19, the encoder and the decoder may determine whether the L0 temporal motion information and the L1 temporal motion information are the same in the temporal motion information derived from the col block, that is, the L0 reference picture number and the L1 reference picture number are the same and the L0 motion vector and the L1 motion vector are the same (S1910).

When the L0 temporal motion information and the L1 temporal motion information are not the same, the encoder and the decoder may use the temporal motion information derived from the col block as the temporal motion information of the current block as it is. When the AMVP is applied, the temporal motion information of the current block may be determined or registered as the prediction motion vector candidate for the current block. In addition, when the merge is applied, the temporal motion information of the current block may be determined or registered as the merge candidates for the current block.

When the L0 temporal motion information and the L1 temporal motion information are the same, the encoder and the decoder may set the prediction directions of the temporal motion information of the current block as the unidirectional prediction and may use only the L0 temporal motion information among the temporal motion information derived from the col block as the temporal motion information of the current block (S1920). In this case, when the AMVP is applied, only the L0 temporal motion information may be determined or registered as the prediction motion vector candidate of the current block. In addition, when the merge is applied, only the L0 temporal motion information may be determined or registered as the merge candidates for the current block.

Meanwhile, there may be the case in which the L0 reference picture list and the L1 reference picture list for the current block art the same. For example, when the current block is a block within the forward B picture and/or the forward B slice, the L0 reference picture list and the L1 reference picture list for the current block may be the same. In this case, in order to prevent the L0 temporal motion information and the L1 temporal motion information of the current block from being the same as each other, the encoder and the decoder may set all of the prediction directions of the temporal motion information derived from the col block as the unidirectional prediction. In this case, the encoder may use only the L0 temporal motion information among the temporal motion information derived from the col block as the temporal motion information of the current block. In this case, as described above, when the AMVP is applied, only the L0 temporal motion information may be determined or registered as the prediction motion vector candidate of the current block. In addition, when the merge is applied, only the L0 temporal motion information may be determined or registered as the merge candidates for the current block.

Figure 20:
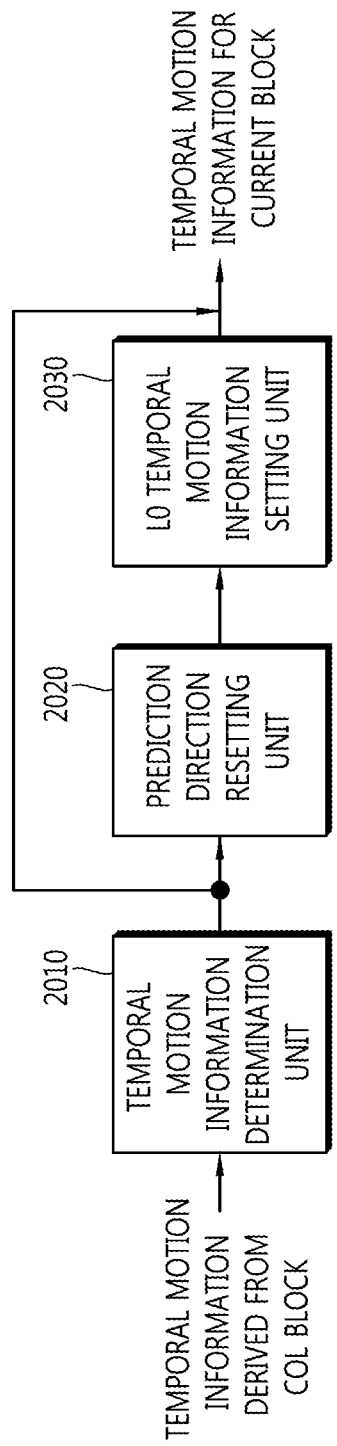
FIG. 20 is a block diagram schematically showing an inter prediction apparatus capable of performing a temporal motion information deriving process according to an exemplary embodiment of FIG. 19.

FIG. 20 is a block diagram schematically showing an inter prediction apparatus capable of performing a temporal motion information deriving process according to an exemplary embodiment of FIG. 19. The inter prediction apparatus according to the exemplary embodiment of the present invention of FIG. 20 may include a temporal motion information determination unit 2010, a prediction direction resetting unit 2020, and an L0 temporal motion information setting unit 2030.

As described above, the temporal motion information may be derived from the motion information of the col block corresponding to the current block within the previously reconstructed reference pictures. The temporal motion information derived from the col block may include the prediction direction information, the L0 reference picture number, the L1 reference picture number, the L0 motion vector, the L1 motion vector, and the like. In this case, when the L0 temporal motion information and the L1 temporal motion information are the same, that is, when the L0 reference picture number and the L1 reference picture number are the same and the L0 motion vector and the L1 motion vector are the same, the inter prediction apparatus may use only the L0 temporal motion information as the temporal motion information of the current block.

Referring to FIG. 20, the temporal motion information determination unit 2010 may determine whether the L0 temporal motion information and the L1 temporal motion information are the same in the temporal motion information derived from the col block, that is, the L0 reference picture number and the L1 reference picture number are the same and the L0 motion vector and the L1 motion vector are the same.

When the L0 temporal motion information and the L1 temporal motion information are not the same, the inter prediction apparatus may use the temporal motion information derived from the col block as the temporal motion information of the current block as it is. When the AMVP is applied, the temporal motion information of the current block may be determined or registered as the prediction motion vector candidate for the current block. In addition, when the merge is applied, the temporal motion information of the current block may be determined or registered as the merge candidates for the current block.

When the L0 temporal motion information and the L1 temporal motion information are the same, the prediction direction resetting unit 2020 may set the prediction directions of the temporal motion information of the current block as the unidirectional prediction. Further, in this case, the L0 motion information setting unit 2030 may determine or use only the L0 temporal motion information among the temporal motion information derived from the col block as the temporal motion information of the current block. In this case, when the AMVP is applied, only the L0 temporal motion information may be determined or registered as the prediction motion vector candidate of the current block. In addition, when the merge is applied, only the L0 temporal motion information may be determined or registered as the merge candidates for the current block.

Figure 21:
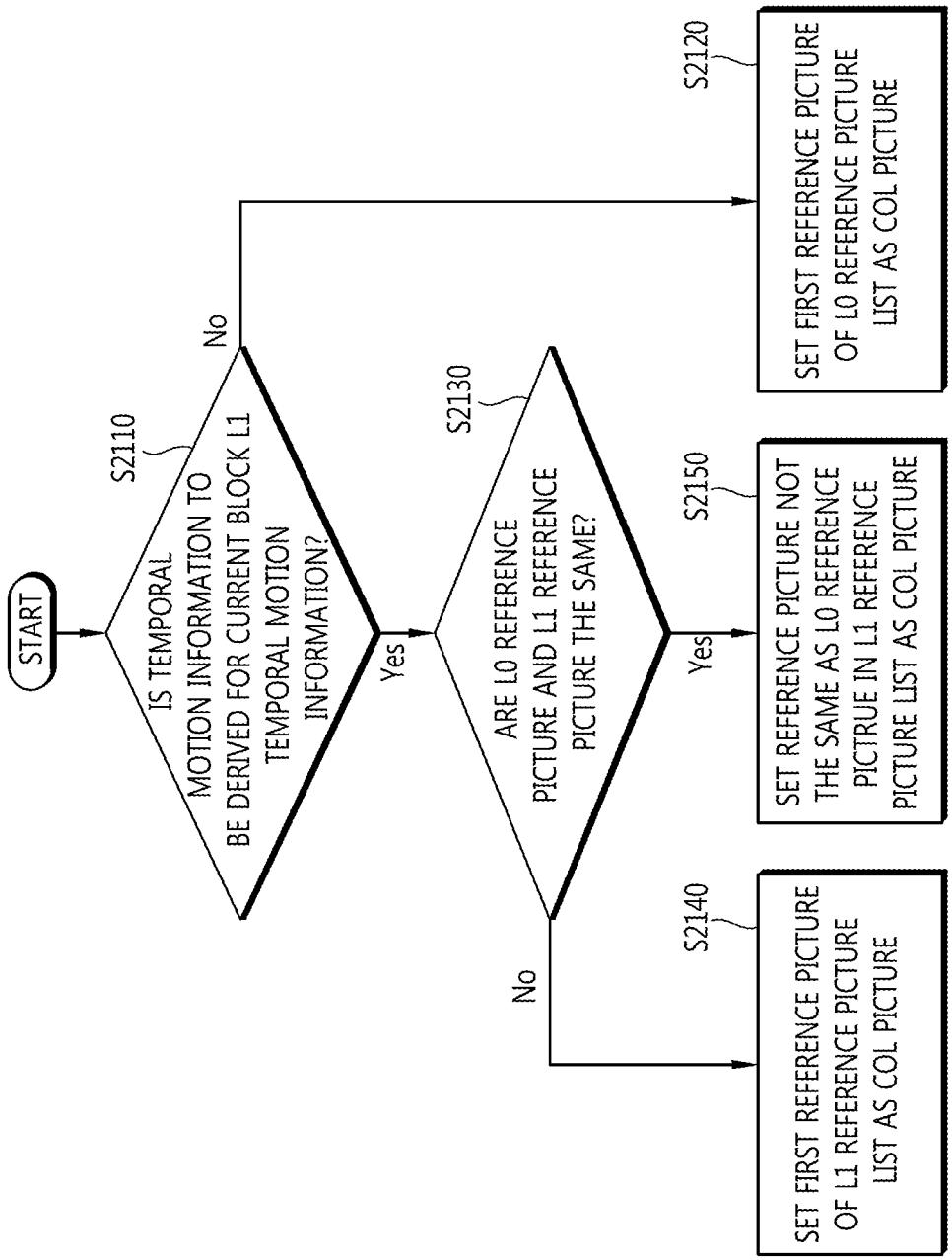
FIG. 21 is a flow chart schematically showing a collocated (col) picture determining method according to an exemplary embodiment of the present invention when the temporal motion information of the current block is derived.

FIG. 21 is a flow chart schematically showing a collocated (col) picture determining method according to an exemplary embodiment of the present invention when the temporal motion information of the current block is derived.

In the exemplary embodiment of FIG. 21, it is assumed that the current picture and/or the current slice are the forward B picture and/or the forward B slice. As described above, in the forward B picture and/or the forward B slice, generally, the L0 reference picture list and the L1 reference picture list may be identically set.

In addition, as described above, the temporal motion information may be derived from the motion information of the col block corresponding to the current block within the previously reconstructed reference pictures. In this case, the col picture may mean the previously reconstructed reference pictures including the col block. The col picture may be a picture that is encoded and decoded in advance and is present as the reference pictures within the reference picture list. The encoder and the decoder may use at least one reference picture among all the reference pictures included in the reference picture list as the col picture, at the time of deriving the temporal motion information.

Generally, the encoder and the decoder may determine or set a picture having the smallest difference between a current encoding object picture and a picture number (hereinafter, referred to as a picture number) according to a POC order among the reference pictures included in the reference picture list as the col picture for the current block. For example, when the picture having the smallest difference between the current encoding object picture and the picture number is a first picture within the reference picture list, the first reference picture within the reference picture list may generally be determined or set as the col picture.

As another example, the encoder may determine the col picture for the current block and then, encodes a col picture index that indicates the reference picture used as the col picture among the reference pictures within the reference picture list and transmit the encoded col picture index to the decoder. In this case, the decoder may receive and decode the col picture index and then, determine or set the reference pictures used as the col picture within the reference picture list based on the decoded col picture index.

Hereinafter, in connection with the exemplary embodiment of FIG. 21, the first reference picture within the L0 reference picture list is referred to as the L0 reference picture and the first reference picture within the L1 reference picture list is referred to as the L1 reference picture. In the exemplary embodiment of FIG. 21, the exemplary embodiment of the case in which the first reference picture within the reference picture list is determined as the col picture will be described.

However, the exemplary embodiment of the present invention is not limited thereto and the contents to be described below with reference to FIG. 21 may be identically or similarly applied to even the case in which the col picture is determined based on the col picture index. In this case, the L0 reference picture may mean the reference picture indicated by the col picture index among the reference pictures within the L0 reference picture list and the L1 reference picture may mean the reference picture indicated by the col picture index among the reference pictures within the L1 reference picture list.

Referring to FIG. 21, when the current block is a block within the forward B picture and/or the forward B slice, the encoder and the decoder may determine the col picture used to derive the temporal motion information of the current block based on the list information of the current block. In the exemplary embodiment of FIG. 21, the list information may mean the information indicating whether the temporal motion information to be derived for the current block is the L0 temporal motion information or the L1 temporal motion information.

First, the encoder and the decoder may determine whether the temporal motion information to be derived for the current block is the L1 temporal motion information (S2110). When the temporal motion information to be derived for the current block is not the L1 temporal motion information, that is, when the temporal motion information to be derived for the current block is the L0 temporal motion information, the encoder and the decoder may determine or set the first reference picture (when the col picture index is used, the reference picture indicated by the col picture index) within the L0 reference picture list as the col picture for the current block (S2120). When the temporal motion information to be derived for the current block is the L1 temporal motion information, the encoder and the decoder may determine whether the L0 reference picture and the L1 reference picture are the same (S2130).

When the L0 reference picture is not the same as the L1 reference picture, the encoder and the decoder may determine or set the first reference picture (when the col picture index is used, the reference picture indicated by the col picture index) within the L1 reference picture list as the col picture for the current block (S2140). When the L0 reference picture is the same as the L1 reference picture, the encoder and the decoder may determine or set the reference picture that is not the same as the L0 reference picture among the reference pictures within the L1 reference picture list as the col picture for the current block (S2150). In this case, when the number of reference pictures within the L1 reference picture list is one or less, the encoder and the decoder may also set the first reference picture (when the col picture index is used, the reference picture indicated by the col picture index) within the L1 reference picture list as the cal picture for the current block.

Figure 22:
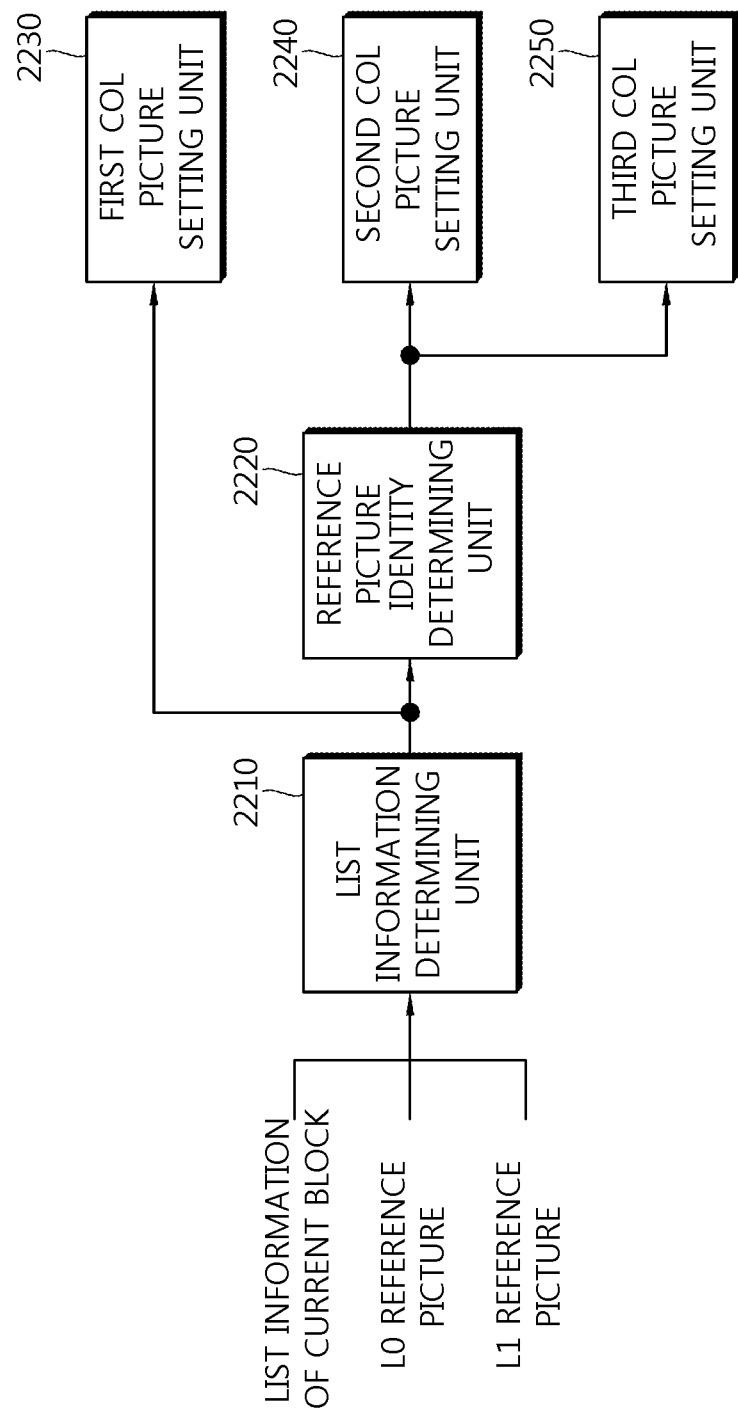
FIG. 22 is a block diagram schematically showing an inter prediction apparatus capable of performing a col picture determining process according to an exemplary embodiment of FIG. 21.

FIG. 22 is a block diagram schematically showing an inter prediction apparatus capable of performing a col picture determining process according to an exemplary embodiment of FIG. 21. The inter prediction apparatus according to the exemplary embodiment of FIG. 22 may include a list information determination unit 2210, a reference picture identity determination unit 2220, a first col picture setting unit 2230, a second col picture setting unit 2240, and a third col picture setting unit 2250.

In the exemplary embodiment of FIG. 22, it is assumed that the current picture and/or the current slice are the forward B picture and/or the forward B slice. As described above, in the forward B picture and/or the forward B slice, generally, the L0 reference picture list and the L1 reference picture list may be identically set.

Also, hereinafter, in connection with the exemplary embodiment of FIG. 22, the first reference picture within the L0 reference picture list is referred to as the L0 reference picture and the first reference picture within the L1 reference picture list is referred to as the L1 reference picture. In the exemplary embodiment of FIG. 22, the exemplary embodiment of the case in which the first reference picture within the reference picture list is determined as the col picture will be described.

However, the exemplary embodiment of the present invention is not limited thereto and the contents to be described below with reference to FIG. 22 may be identically or similarly applied to even the case in which the col picture is determined based on the col picture index described in FIG. 21. In this case, the L0 reference picture may mean the reference picture indicated by the col picture index among the reference pictures within the L0 reference picture list and the L1 reference picture may mean the reference picture indicated by the col picture index among the reference pictures within the L1 reference picture list.

The inter prediction apparatus according to the exemplary embodiment of the present invention of FIG. 22 may determine or set the col picture used to derive the temporal motion information of the current block by receiving the list information, the L0 reference picture, and the L1 reference picture by the current block. When the current block is a block within the forward B picture and/or the forward B slice, the inter prediction apparatus may determine the col picture used to derive the temporal motion information of the current block based on the list information. In the exemplary embodiment of FIG. 22, the list information may mean the information indicating whether the temporal motion information to be derived for the current block is the L0 temporal motion information or the L1 temporal motion information.

Referring to FIG. 22, the list information determination unit 2210 may determine whether the temporal motion information to be derived for the current block is the L1 temporal motion information. When the temporal motion information to be derived for the current block is not the L1 temporal motion information, that is, when the temporal motion information to be derived for the current block is the L0 temporal motion information, the first col picture setting unit 2230 may determine or set the first reference picture (when the col picture index is used, the reference picture indicated by the col picture index) within the L0 reference picture list as the col picture for the current block. When the temporal motion information to be derived for the current block is the L1 temporal motion information, the reference picture identity determination unit 2220 may determine whether the L0 reference picture and the L1 reference picture are the same.

When the L0 reference picture is the same as the L1 reference picture, the second col picture setting unit 2240 may determine or set the reference picture that is not the same as the L0 reference picture among the reference pictures within the L1 reference picture list as the col picture of the current block. In this case, when the number of reference pictures within the L1 reference picture list is one or less, the second col picture setting unit 2240 may also set the first reference picture (when the col picture index is used, the reference picture indicated by the col picture index) within the L1 reference picture list as the cal picture of the current block. When the L0 reference picture is not the same as the L1 reference picture, the third col picture setting unit

2250 may determine or set the first reference picture (when the col picture index is used, the reference picture indicated by the col picture index) within the L1 reference picture list as the col picture for the current block.

Figure 23:
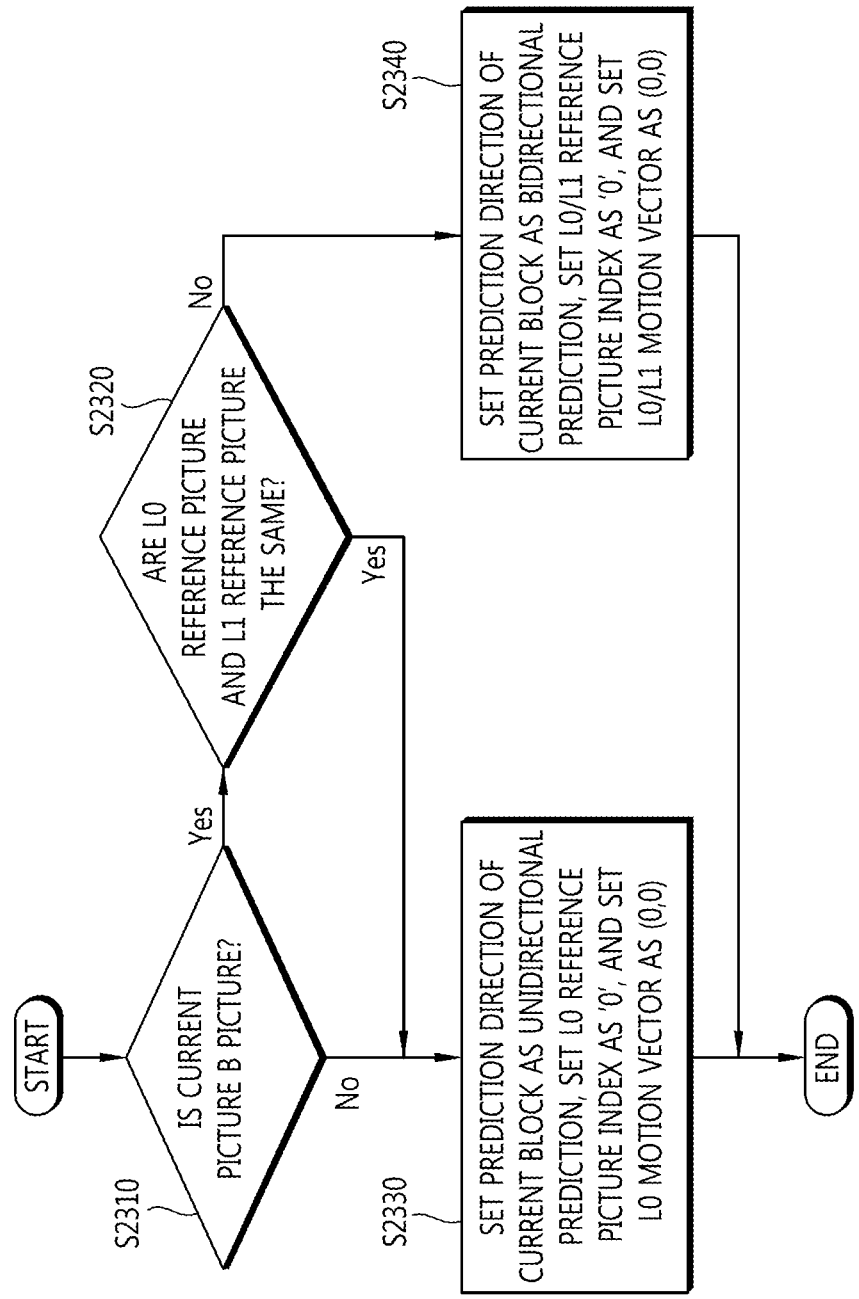
FIG. 23 is a flow chart schematically showing a method for determining motion information of a current block according to an exemplary embodiment of the present invention when all the blocks used to derive the motion information candidates do not have the motion information.

FIG. 23 is a flow chart schematically showing a method for determining motion information of a current block according to an exemplary embodiment of the present invention when all the blocks used to derive the motion information candidate do not have the motion information. Herein, the motion information candidates mean the prediction motion vector candidates in the case of the AMVP mode and the merge candidates in the case of the merge mode.

As described above, in the AMVP and the merge mode, in order to derive the motion information of the current block, the motion information of the reconstructed neighboring blocks and/or the motion information of the col block may be used. The motion information of the reconstructed neighboring blocks and/or the col block may be used as the motion information candidates and the encoder and the decoder may derive the motion information of the current block based on the motion information candidates. However, all the blocks (the reconstructed neighboring blocks and/or the col block) used to derive the motion information candidates may not have the motion information and therefore, in this case, a method for deriving or setting the motion information of the current block may be provided.

Hereinafter, in connection with the exemplary embodiment of FIG. 23, the first reference picture within the L0 reference picture list is referred to as the L0 reference picture and the first reference picture within the L1 reference picture list is referred to as the L1 reference picture.

Referring again to FIG. 23, the encoder and the decoder may determine whether a picture type of the current picture is the B picture (S2310). When the picture type of the current picture is not the B picture, for example, when the picture type of the current picture is the P picture, the encoder and the decoder may set the prediction directions of the current block as the unidirectional prediction and the L0 reference picture index may be set as 0 and the L0 motion vector may be as (0,0) (S2330). When the value assigned to the L0 reference picture index is 0, the L0 reference picture index may indicate that the first picture among the reference pictures within the L0 reference picture list is used as the reference picture of the current picture. When the picture type of the current picture is the B picture, the encoder and the decoder may determine whether the L0 reference picture and the L1 reference picture are the same (S2320).

In order to determine whether the L0 reference picture and the L1 reference picture are the same, the encoder and the decoder may determine the identity between the reference picture number of the first reference picture within the L0 reference picture list and the reference picture number of the first reference picture within the L1 reference picture list. In addition, generally, the encoder and the decoder may determine whether the L0 reference picture and the L1 reference picture are the same by determining the identity between the L0 reference picture number of the L0 reference picture and the L1 reference picture number of the L1 reference picture. The method for determining the identity of the reference pictures may be variously changed in some cases.

When the L0 reference picture and the L1 reference picture are the same, the encoder and the decoder may set the prediction directions of the current block as the unidirectional prediction, the L0 reference picture index as 0, and the L0 motion vector as (0,0) (S2330). When the L0 reference picture and the L1 reference picture are not the same, the encoder and the decoder may set the prediction directions of the current block as the bidirectional prediction, the L0 reference picture index and the L1 reference picture index as 0, and set the L0 motion vector and the L1 motion vector as (0,0) (S2340). When the value assigned to the L1 reference picture index is 0, the L1 reference picture index may indicate that the first picture among the reference pictures within the L1 reference picture list is used as the reference picture of the current picture.

Hereinafter, in terms of the decoder, the exemplary embodiment of the motion information determining process according to the exemplary embodiment of FIG. 23 will be described.

When the motion information is not present in the reconstructed neighboring blocks and/or the col block, mvLX, refIdxLX, and predFlagLX may be differently defined according to the picture type of the current picture. Here, X may be replaced with 0 or 1. For example, when X is 0, mvLX, refIdxLX, and predFlagLX may each indicate mvL0, refIdxL0, and predFlagL0, which may mean L0 motion information related variables. Here, the mvLX may mean the motion vector of the current block, mvLX [0] may mean the motion vector of x component, and mvLX [1] may mean the motion vector of y component. The refIdxLX may mean the LX reference picture index that is an index indicating the reference picture used for the inter prediction of the current block among the reference pictures included in the LX reference picture list. For example, when the refIdxLX value is '0', the refIdxLX may indicate the first picture among the reference pictures within the LX reference picture list and when the refIdxLX value is '−1', the refIdxLX may indicate that the reference picture used for the inter prediction of the current block is not present in the LX reference picture list. The predflagLX may indicate the flag indicating whether the prediction block is generated by performing the LX motion compensation on the current block. For example, when the 'pregflagLX' value is 1, the encoder and/or the decoder may perform the LX motion compensation on the current block.

When the picture type of the picture including the current block is the P picture and/or the slice type of the slice including the current block is the P slice, the decoder may perform the following process.

$$mvLX[0] = 0$$

$$mvLX[1] = 0$$

$$refIdxL0 = 0$$

$$refIdxL1 = -1$$

$$predFlagL0 = 1$$

$$predFlagL1 = 0$$

Otherwise, that is, when the picture type of the picture including the current block is the B picture and/or the slice type of the slice including the current block is the B slice, the decoder may perform the following process.

If the first reference picture within the L0 reference picture list and the first reference picture within the L1 reference picture list are the same, the decoder may perform the following process.

$$mvLX[0] = 0$$
$$mvLX[1] = 0$$
$$refIdxL0 = 0$$
$$refIdxL1 = -1$$
$$predFlagL0 = 1$$
$$predFlagL1 = 0$$

Otherwise, that is, if the first reference picture within the L0 reference picture list and the first reference picture within the L1 reference picture list are not the same, the decoder may perform the following process.

$$mvLX[0] = 0$$
$$mvLX[1] = 0$$
$$refIdxL0 = 0$$
$$refIdxL1 = 0$$
$$predFlagL0 = 1$$
$$predFlagL1 = 1$$

Figure 24:
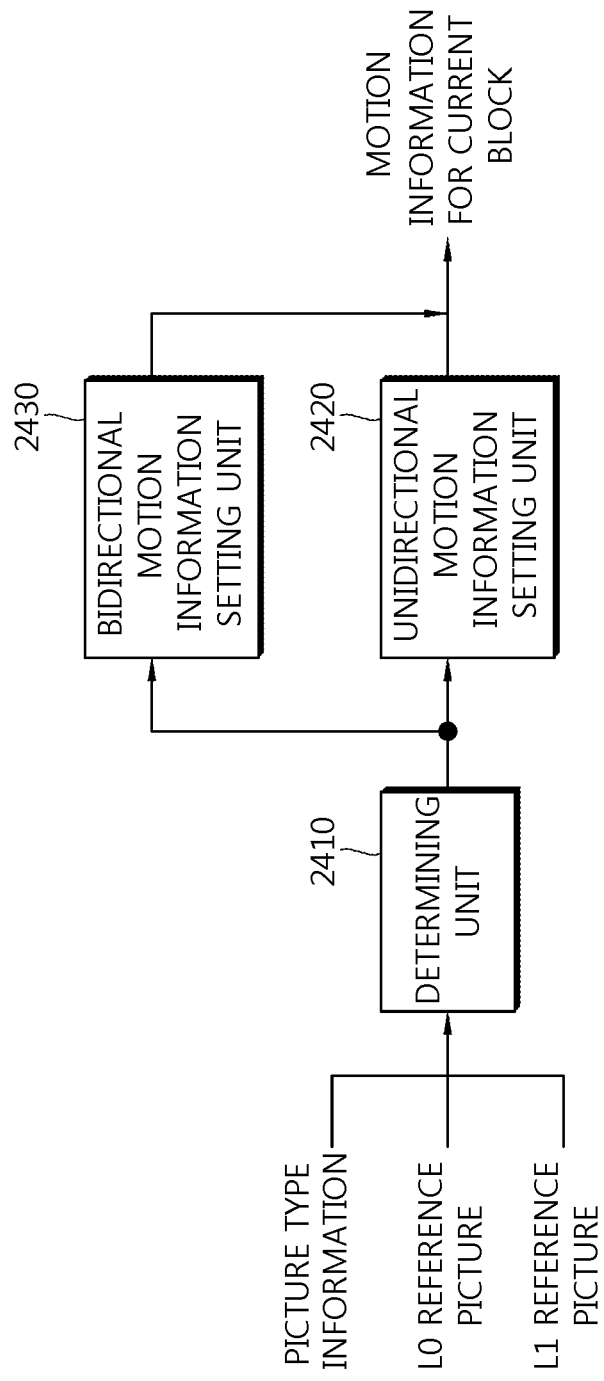
FIG. 24 is a block diagram schematically showing an inter prediction apparatus capable of performing a motion information determining process according to an exemplary embodiment of FIG. 23.

FIG. 24 is a block diagram schematically showing an inter prediction apparatus capable of performing a motion information determining process according to an exemplary embodiment of FIG. 23. The inter prediction apparatus according to the exemplary embodiment of FIG. 24 may include a determination unit 2410, a bidirectional motion information setting unit 2420, and a unidirectional motion information setting unit 2430.

As described above, in the AMVP and the merge mode, in order to derive the motion information of the current block, the motion information of the reconstructed neighboring blocks and/or the motion information of the col block may be used. The motion information of the reconstructed neighboring blocks and/or the col block may be used as the motion information candidates and the encoder and the decoder may derive the motion information of the current block based on the motion information candidates. Herein, the motion information candidates mean the prediction motion vector candidates in the case of the AMVP mode and the merge candidates in the case of the merge mode. However, all the blocks (the reconstructed neighboring blocks and/or the col block) used to derive the motion information candidates may not have the motion information. Therefore, in this case, the inter prediction apparatus for deriving or setting the motion information of the current block may be provided.

Hereinafter, in connection with the exemplary embodiment of FIG. 24, the first reference picture within the L0 reference picture list is referred to as the L0 reference picture and the first reference picture within the L1 reference picture list is referred to as the L1 reference picture.

Referring to FIG. 24, the determination unit 2410 receives the picture type information, the L0 reference picture, and the L1 reference picture and then, may determine whether the picture type of the current picture is the B picture and the L0 reference picture and the L1 reference picture are the same. The inter prediction apparatus may perform the unidirectional motion information setting by the unidirectional motion information setting unit 2420 or the bidirectional motion information setting by the bidirectional motion information setting unit 2430. In detail, when the current picture is not the B picture (for example, when the picture type of the current picture is the P picture) or when the current picture is the B picture and the L0 reference picture and the L1 reference picture are the same, the unidirectional motion information setting may be set and when the current picture is the B picture and the L0 reference picture and the L1 reference picture are not the same, the bidirectional motion information setting may be performed.

When the current picture is not the B picture or the current picture is the B picture and the L0 reference picture and the L1 reference picture are the same, the unidirectional motion information setting unit 2420 may set the prediction directions of the current block as the unidirectional prediction. In addition, the unidirectional motion information setting unit 2420 may set the L0 reference picture index as 0 and the L0 motion vector as (0,0). When the current picture is the B picture and the L0 reference picture and the L1 reference picture are not the same, the bidirectional motion information setting unit 2430 may set the prediction directions of the current block as the bidirectional prediction. In addition, the unidirectional motion information setting unit 2430 may set the L0 reference picture index and the L1 reference picture index as 0 and the L0 motion vector and L2 motion vector as (0,0).

Figure 25:
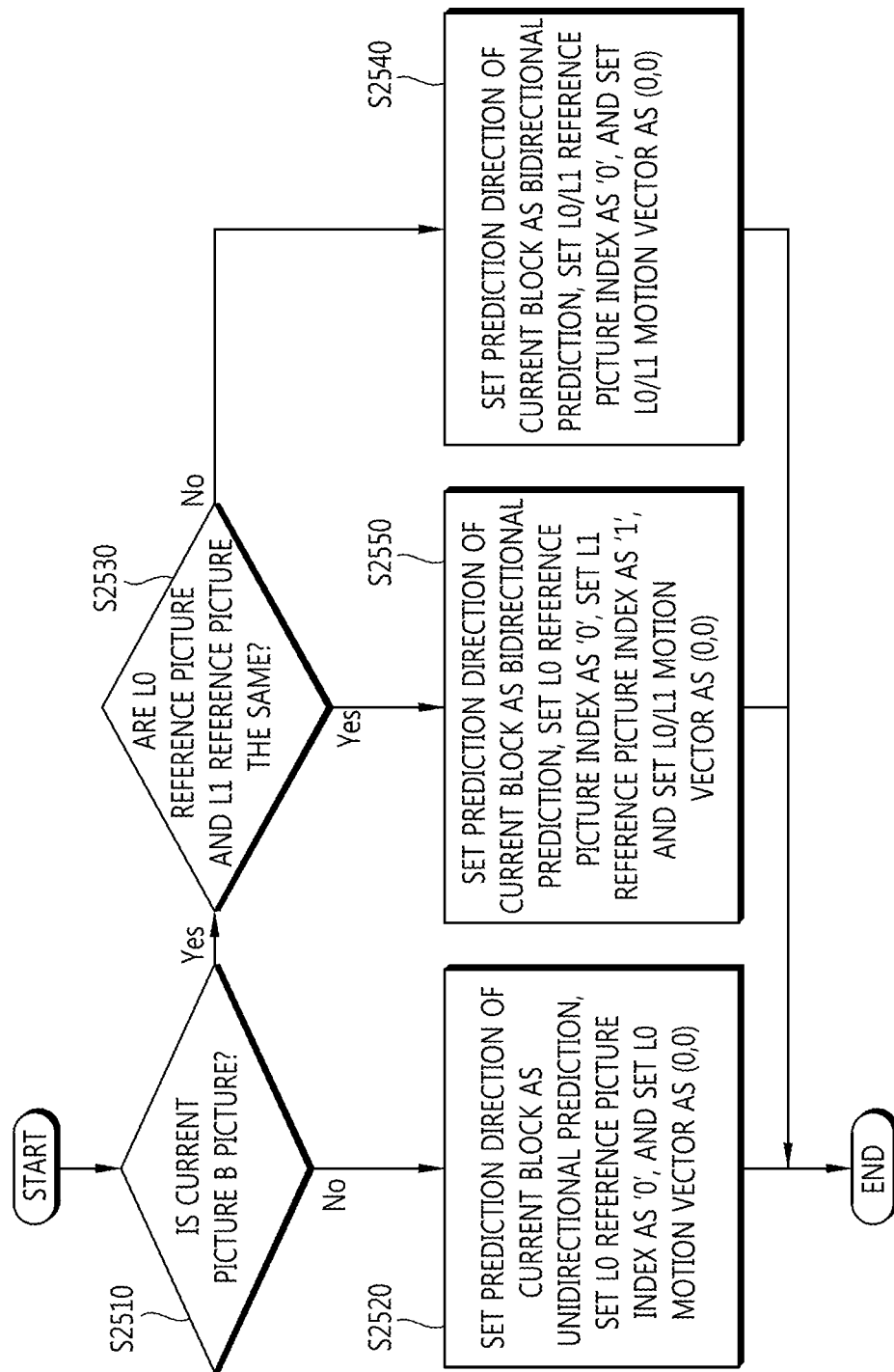
FIG. 25 is a flow chart schematically showing a method for determining motion information of a current block according to another exemplary embodiment of the present invention when all the blocks used to derive the motion information candidates do not have the motion information.

FIG. 25 is a flow chart schematically showing a method for determining motion information of a current block according to another exemplary embodiment of the present invention when all the blocks used to derive the motion information candidates do not have the motion information. Herein, the motion information candidates mean the prediction motion vector candidates in the case of the AMVP mode and the merge candidates in the case of the merge mode.

In the exemplar embodiment of FIG. 25, it is assumed that the B picture is the forward B picture. As described above, in the forward B picture, generally, the L0 reference picture list and the L1 reference picture list may be identically set. In addition, as described above, in the specification, the "picture" may be replaced with "frame", "field", and/or "slice" according to the context, which may be easily understood to a person skilled in the art to which the present invention pertains.

In the AMVP and the merge mode, in order to derive the motion information of the current block, the motion information of the reconstructed neighboring blocks and/or the motion information of the col block may be used. The motion information of the reconstructed neighboring blocks and/or the col block may be used as the motion information candidates and the encoder and the decoder may derive the motion information of the current block based on the motion information candidates. However, all the blocks (the reconstructed neighboring blocks and/or the col block) used to derive the motion information candidates may not have the motion information and therefore, in this case, a method for deriving or setting the motion information of the current block may be provided.

Hereinafter, in connection with the exemplary embodiment of FIG. 25, the first reference picture within the L0 reference picture list is referred to as the L0 reference picture and the first reference picture within the L1 reference picture list is referred to as the L1 reference picture.

Referring to FIG. 25, the encoder and the decoder may determine whether the picture type of the current picture is the B picture (S2510). When the picture type of the current picture is not the B picture, for example, when the picture type of the current picture is the P picture, the encoder and the decoder may set the prediction directions of the current block as the unidirectional prediction and the L0 reference picture index may be set as 0 and the L0 motion vector may be set as (0,0) (S2520). When the value assigned to the L0 reference picture index is 0, the L0 reference picture index may indicate that the first picture among the reference pictures within the L0 reference picture list is used as the reference picture of the current picture. When the picture type of the current picture is the B picture, the encoder and the decoder may determine whether the L0 reference picture and the L1 reference picture are the same (S2530).

In order to determine whether the L0 reference picture and the L1 reference picture are the same, the encoder and the decoder may determine the identity between the reference picture number of the first reference picture within the L0 reference picture list and the reference picture number of the first reference picture within the L1 reference picture list. In addition, generally, the encoder and the decoder may determine whether the L0 reference picture and the L1 reference picture are the same by determining the identity between the L0 reference picture number of the L0 reference picture and the L1 reference picture number of the L1 reference picture. The method for determining the identity of the reference pictures may be variously changed in some cases.

When the L0 reference picture and the L1 reference picture are not the same, the encoder and the decoder may set the prediction directions of the current block as the bidirectional prediction, the L0 reference picture index and the L1 reference picture index as 0, and set the L0 motion vector and the L1 motion vector as (0,0) (S2540). When the value assigned to the L1 reference picture index is 0, the L1 reference picture index may indicate that the first picture among the reference pictures within the L1 reference picture list is used as the reference picture of the current picture. When the L0 reference picture and the L1 reference picture are the same, the encoder and the decoder may set the prediction directions of the current block as the bidirectional prediction, the L0 reference picture index as 0 and the L1 reference picture index as 1, and the L0 motion vector and the L1 motion vector as (0,0) (S2550). When the value assigned to the L1 reference picture index is 1, the L1 reference picture index may indicate that the second picture among the reference pictures within the L1 reference picture list is used as the reference picture of the current picture. Here, when the number of reference pictures included in the L1 reference picture list are one or less, the encoder and the decoder may set the prediction directions of the current block as the unidirectional prediction, the L0 reference picture index as 0, and the L0 motion vector as (0,0).

Hereinafter, in terms of the decoder, the exemplary embodiment of the motion information determining process according to the exemplary embodiment of FIG. 25 will be described.

When the motion information is not present in the reconstructed neighboring blocks and/or the col block, mvLX, refIdxLX, and predFlagLX may be differently defined according to the picture type of the current picture. Here, X may be replaced with 0 or 1. For example, when X is 0, mvLX, refIdxLX, and predFlagLX may each indicate mvL0, refIdxL0, and predFlagL0, which may mean L0 motion information related variables. Here, the mvLX may mean the motion vector of the current block, mvLX [0] may mean the motion vector of x component, and mvLX [1] may mean the motion vector of y component. The refIdxLX may mean the LX reference picture index that is an index indicating the reference picture used for the inter prediction of the current block among the reference pictures included in the LX reference picture list. For example, when the refIdxLX value is '0', the refIdxLX may indicate the first picture among the reference pictures within the LX reference picture list and when the refIdxLX value is '−1', the refIdxLX may indicate that the reference picture used for the inter prediction of the current block is not present in the LX reference picture list. The predflagLX may indicate the flag indicating whether the prediction block is generated by performing the LX motion compensation on the current block. For example, when the 'pregflagLX' value is 1, the encoder and/or the decoder may perform the LX motion compensation on the current block.

When the picture type of the picture including the current block is the P picture and/or the slice type of the slice including the current block is the P slice, the decoder may perform the following process.

$$mvLX[0] = 0$$
$$mvLX[1] = 0$$
$$refIdxL0 = 0$$
$$refIdxL1 = -1$$
$$predFlagL0 = 1$$
$$predFlagL1 = 0$$

Otherwise, that is, when the picture type of the picture including the current block is the B picture and/or the slice type of the slice including the current block is the B slice, the decoder may perform the following process.

If the first reference picture within the L0 reference picture list and the first reference picture within the L1 reference picture list are the same, the decoder may perform the following process.

$$mvLX[0] = 0$$
$$mvLX[1] = 0$$
$$refIdxL0 = 0$$
$$refIdxL1 = 1$$
$$predFlagL0 = 1$$
$$predFlagL1 = 1$$

Otherwise, that is, if the first reference picture within the L0 reference picture list and the first reference picture within the L1 reference picture list are not the same, the decoder may perform the following process.

$$mvLX[0] = 0$$
$$mvLX[1] = 0$$
$$refIdxL0 = 0$$
$$refIdxL1 = 0$$
$$predFlagL0 = 1$$
$$predFlagL1 = 1$$

Figure 26:
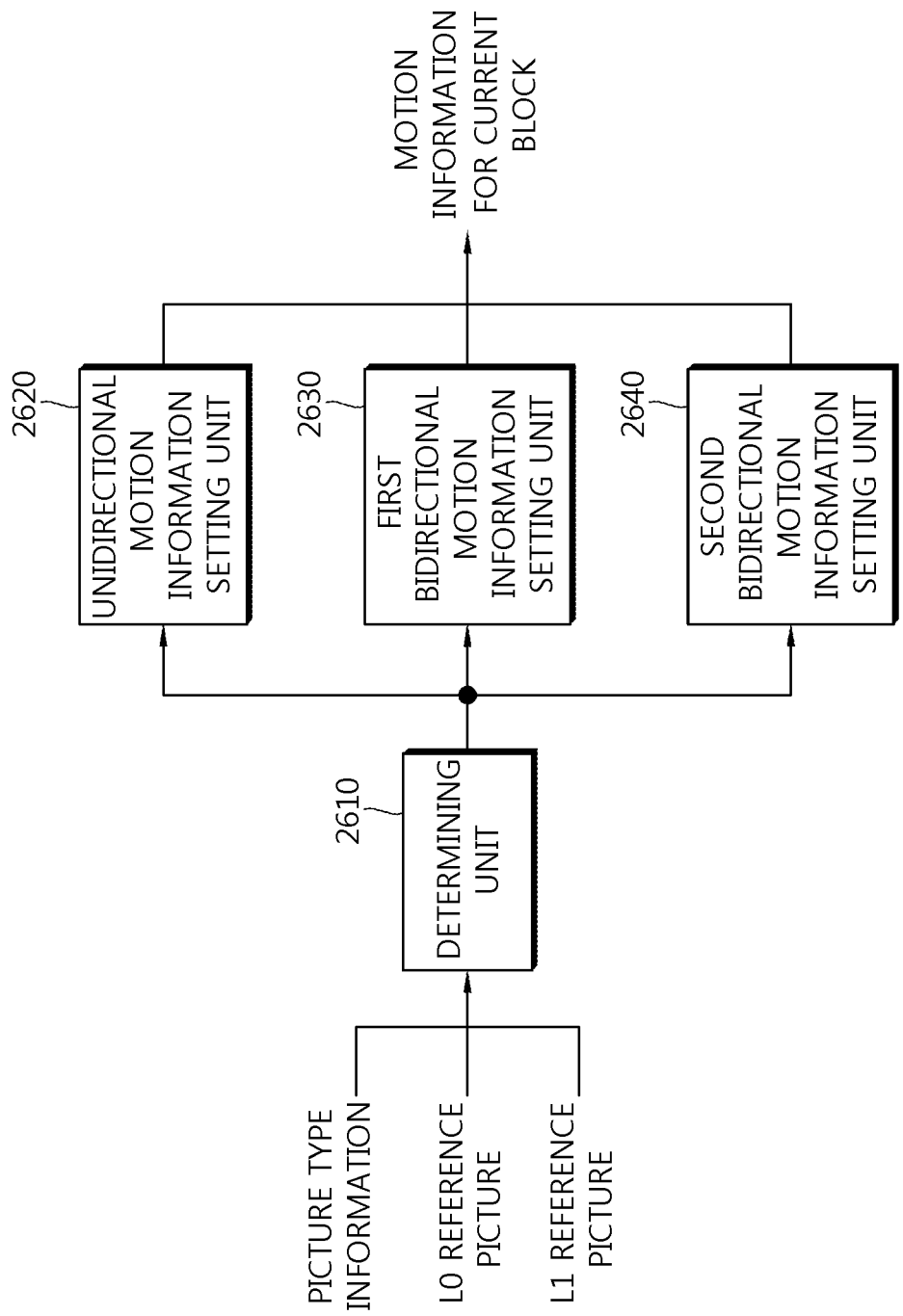
FIG. 26 is a block diagram schematically showing an inter prediction apparatus capable of performing a motion information determining process according to an exemplary embodiment of FIG. 25.

FIG. 26 is a block diagram schematically showing an inter prediction apparatus capable of performing a motion information determining process according to an exemplary embodiment of FIG. 25. The inter prediction apparatus according to the exemplary embodiment of FIG. 26 may include a determination unit 2610, a unidirectional motion information setting unit 2620, a first bidirectional motion information setting unit 2630, and a second bidirectional motion information setting unit 2640.

In the exemplar embodiment of FIG. 26, it is assumed that the B picture is the forward B picture. As described above, in the forward B picture, generally, the L0 reference picture list and the L1 reference picture list may be identically set. In addition, as described above, in the specification, the "picture" may be replaced with "frame", "field", and/or "slice" according to the context, which may be easily understood to a person skilled in the art to which the present invention pertains.

In the AMVP and the merge mode, in order to derive the motion information of the current block, the motion information of the reconstructed neighboring blocks and/or the motion information of the col block may be used. The motion information of the reconstructed neighboring blocks and/or the col block may be used as the motion information candidates and the encoder and the decoder may derive the motion information of the current block based on the motion information candidates. Herein, the motion information candidates mean the prediction motion vector candidates in the case of the AMVP mode and the merge candidates in the case of the merge mode. However, all the blocks (the reconstructed neighboring blocks and/or the col block) used to derive the motion information candidates may not have the motion information and therefore, in this case, the inter prediction apparatus for deriving or setting the motion information of the current block may be provided.

Hereinafter, in connection with the exemplary embodiment of FIG. 26, the first reference picture within the L0 reference picture list is referred to as the L0 reference picture and the first reference picture within the L1 reference picture list is referred to as the L1 reference picture.

Referring to FIG. 26, the determination unit 2610 receives the picture type information, the L0 reference picture, and the L1 reference picture and then, may determine whether the picture type of the current picture is the B picture and the L0 reference picture and the L1 reference picture are the same. The inter prediction apparatus may perform the unidirectional motion information setting by the unidirectional motion information setting unit 2620, the first bidirectional motion information setting by the first bidirectional motion information setting unit 2630, or the second bidirectional motion information setting by the second bidirectional motion information setting unit 2640 according to the determination results.

In detail, when the current picture is not the B picture (for example, when the current picture is the P picture), the unidirectional motion information setting may be performed. In addition, when the current picture is the B picture, the determination unit 2610 may determine whether the L0 reference picture and the L1 reference picture are the same. In this case, when the L0 reference picture and the L1 reference picture are not the same, the first bidirectional motion information setting may be performed and the L0 reference picture and the L1 reference picture are the same, the second bidirectional motion information setting may be performed. Here, when the number of reference pictures included in the L1 reference picture list is 1 or less, the unidirectional motion information setting may also be performed.

The unidirectional motion information setting unit 2620 may set the prediction directions of the current block as the unidirectional prediction. In addition, the unidirectional motion information setting unit 2620 may set the L0 reference picture index as 0 and the L0 motion vector as (0,0). The first bidirectional motion information setting unit 2630 may set the prediction directions of the current block as the bidirectional prediction. In addition, the first bidirectional motion information setting unit 2630 may set the L0 reference picture index and the L1 reference picture index as 0 and the L0 motion vector and the L1 motion vector as (0,0). The second bidirectional motion information setting unit 2640 may set the prediction directions of the current block as the bidirectional prediction. In addition, in this case, the second bidirectional motion information setting unit 2640 may set the L0 reference picture index as 0, the L1 reference picture index as 1, and the L0 motion vector and the L1 motion vector as (0,0).

The exemplary embodiments of FIGS. 7 to 26 as described above may individually be applied, but may be combined and applied in various methods according to the encoding mode of each block. Hereinafter, in the exemplary embodiments of the present invention to be described below, the block in which the encoding mode is the merge mode is referred to as the merge block. The block other than the merge block may include a block in which the encoding mode is the AMVP mode, and the like. In addition, in the exemplary embodiments of the present invention to be described below, the current block may correspond to one of the merge block and the block other than the merge block in some cases.

As the exemplary embodiments of the present invention, the merge candidate determining method according to the exemplary embodiment of FIG. 15 may be applied to the merge block and the inter prediction method according to the exemplary embodiment of FIG. 7 or 8 may be applied to the blocks other than the merge block. In this case, in the merge block, when the L0 motion information (the L0 reference picture number and the L0 motion vector) and the L1 motion information (the L1 reference picture number and the L1 motion vector) of the reference block are the same, only the L0 motion information of the reference block may be used or registered as the merge candidate of the current block. In addition, in the blocks other than the merge block, when the L0 motion information (the reference picture number and the motion vectors) and the L1 motion information (the reference picture number and the motion vectors) are the same, the unidirectional motion compensation process may be performed on the current block.

As another exemplary embodiments of the present invention, the temporal motion information deriving method according to the exemplary embodiment of FIG. 19 may be applied to the merge block and the inter prediction method according to the exemplary embodiment of FIG. 7 or 8 may be applied to the blocks other than the merge block. In this case, in the merge block, when the L0 reference picture number and the L1 reference picture number are the same and the L0 motion vector and the L1 motion vector are the same, only the L0 temporal motion information may be used as the temporal motion information of the current block. In addition, in the blocks other than the merge block, when the L0 motion information (the reference picture number and the motion vectors) and the L1 motion information (the reference picture number and the motion vectors) are the same, the unidirectional motion compensation process may be performed on the current block.

As another exemplary embodiment of the present invention, the temporal motion information deriving method according to the exemplary embodiment of FIG. 19 and the motion information determining method according to the exemplary embodiments of FIG. 23 may be applied to the merge block and the inter prediction method according to the exemplary embodiments of FIG. 10 may be applied to the blocks other than the merge block. In this case, in the merge block, when the L0 reference picture number and the L1 reference picture number are the same and the L0 motion vector and the L1 motion vector are the same, only the L0 temporal motion information may be used as the temporal motion information of the current block. In addition, in the merge block, when all the blocks (the reconstructed neighboring blocks and/or the col block) used to derive the merge candidates do not have the motion information, the motion information of the current block may be determined by the predetermined method (for example, using the motion vector of (0,0)) described in FIG. 23. In addition, in the blocks other than the merge block, when the L0 motion information (the reference picture number and the motion vectors) and the L1 motion information (the reference picture number and the motion vectors) are the same, only the L0 motion information may be used ad the motion information of the current block.

As another exemplary embodiments of the present invention, the temporal motion information deriving method according to the exemplary embodiment of FIG. 17 may be applied to the merge block and the inter prediction method according to the exemplary embodiment of FIG. 10 may be applied to the blocks other than the merge block. In this case, the temporal motion information deriving method for deriving the temporal motion information of the current block may be applied to the merge block according to the list information described in FIG. 17. Here, the list information may mean the information indicating whether the L0 motion information and/or the L1 motion information are present in the col block. In addition, in the blocks other than the merge block, when the L0 motion information (the reference picture number and the motion vectors) and the L1 motion information (the reference picture number and the motion vectors) are the same, only the L0 motion information may be used ad the motion information of the current block.

As another exemplary embodiment of the present invention, the temporal motion information deriving method according to the exemplary embodiment of FIG. 21 and the motion information determining method according to the exemplary embodiments of FIG. 23 may be applied to the merge block and the inter prediction method according to the exemplary embodiments of FIG. 7 may be applied to the blocks other than the merge block. In this case, in the merge block, when the current block is a block within the forward B picture and/or the forward B slice, the col picture used to derive the temporal motion information may be determined according to whether the currently derived temporal motion information is the L0 temporal motion information or the L1 temporal motion information. In addition, in the merge block, when all the blocks (the reconstructed neighboring blocks and/or the col block) used to derive the merge candidates do not have the motion information, the motion information of the current block may be determined by the predetermined method (for example, using the motion vector of (0,0)) described in FIG. 23. In addition, in the blocks other than the merge block, when the L0 motion information (the reference picture number and the motion vectors) and the L1 motion information (the reference picture number and the motion vectors) are the same, the unidirectional motion compensation process may be performed on the current block.

As another exemplary embodiment of the present invention, the temporal motion information deriving method according to the exemplary embodiment of FIG. 21 and the motion information determining method according to the exemplary embodiments of FIG. 25 are applied to the merge block and the inter prediction method according to the exemplary embodiments of FIG. 10 may be applied to the blocks other than the merge block. In this case, in the merge block, when the current block is a block within the forward B picture and/or the forward B slice, the col picture used to derive the temporal motion information may be determined according to whether the currently derived temporal motion information is the L0 temporal motion information or the L1 temporal motion information. In addition, in the merge block, when all the blocks (the reconstructed neighboring blocks and/or the col block) used to derive the merge candidates do not have the motion information, the motion information of the current block may be determined by the predetermined method (for example, using the motion vector of (0,0) of the forward B picture and/or the forward B slice) described in FIG. 25. In addition, in the blocks other than the merge block, when the L0 motion information (the reference picture number and the motion vectors) and the L1 motion information (the reference picture number and the motion vectors) are the same, only the L0 motion information may be used ad the motion information of the current block.

The combinations of the exemplary embodiments of FIGS. 7 to 26 are not limited to the above-mentioned exemplary embodiments but the above-mentioned exemplary embodiments of the present invention and various types of combinations may be provided as needed.

According to the above-mentioned exemplary embodiments of the present invention, it is possible to reduce the calculation complexity in the motion compensation process and improve the encoding/decoding efficiency.

In the above-mentioned exemplary embodiments, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

The invention claimed is:

1. A method for decoding a video signal, the method comprising:
   determining a prediction mode for a current block as an inter prediction mode;
   determining a temporal motion information reference picture including temporal motion information of the current block from a reference picture list based on temporal motion information reference picture information;

determining a temporal motion information reference block from the temporal motion information reference picture based on a spatial location of the current block;

determining the temporal motion information of the current block from the temporal motion information reference block;

determining a motion candidate list of the current block by using spatial motion information of the current block from neighboring blocks spatially adjacent to the current block and the temporal motion information of the current block from the neighboring blocks temporally adjacent to the current block, determining motion information of the current block based on the motion candidate list and a motion candidate index;

determining a prediction method for the current block between uni-prediction or bi-prediction according to a size of the current block;

generating a prediction block of the current block by predicting the current block based on the prediction method and the motion information; and reconstructing the current block based on the prediction block of the current block, wherein the motion candidate index indicates a motion candidate included in the motion candidate list;

wherein the derived motion information includes prediction direction information and both of L0 motion information and L1 motion information, wherein, when the prediction direction information of the current block indicates a bi-prediction and a size of the current block is smaller than a pre-determined size, the prediction direction information indicating the bi-prediction is changed to indicate a uni-prediction and the prediction block of the current block is generated by performing motion compensation based on only the L0 motion information among the L0 motion information and the L1 motion information, and wherein, when the prediction direction information indicates the bi-prediction and the size of the current block is equal to or greater than the pre-determined size, the prediction direction information indicating the bi-prediction is not changed to indicate the uni-prediction and the prediction block of the current block is generated by performing the motion compensation based on both the L0 motion information and the L1 motion information, wherein the temporal motion information reference picture information includes reference picture list information and reference picture index information, the reference picture list information indicating whether the temporal motion information reference picture is included in an L0 reference picture list or an L1 reference picture list, and the reference picture index information indicating an index of the temporal motion information reference picture in the reference picture list selected based on the reference picture list information.

2. The method of claim 1, wherein the L0 motion information includes an L0 motion vector and an L0 reference picture index, the L0 reference picture index is an index assigned to an L0 reference picture according to a picture order count (POC) order, the L1 motion information includes an L1 motion vector and an L1 reference picture index, and the L1 reference picture index is an index assigned to an L1 reference picture according to the POC order.

3. The method of claim 2, wherein generating the prediction block comprising:

generating an L0 motion compensated block by performing L0 motion compensation on the current block based on the L0 motion information;

generating an L1 motion compensated block by performing L1 motion compensation on the current block based on the L1 motion information; and generating the prediction block by performing a weighting average on the L0 motion compensated block and the L1 motion compensated block.

4. The method of claim 1, further comprising:

determining whether default weighting prediction is applied to the current block or non-default weighting prediction is applied thereto, wherein the prediction block is generated by performing one of the default weighting prediction and the non-default weighting prediction according to the determination result.

5. The method of claim 4, wherein whether the default weighting prediction is applied to the current block or the non-default weighting prediction is applied thereto is indicated by a weighting prediction index.

6. A method for encoding a video signal, the method comprising:

determining a prediction mode for a current block as an inter prediction mode;

determining a temporal motion information reference picture including temporal motion information of the current block from a reference picture list;

determining a temporal motion information reference block from the temporal motion information reference picture based on a spatial location of the current block;

determining the temporal motion information of the current block from the temporal motion information reference block;

determining a motion candidate list of the current block by using spatial motion information of the current block from neighboring blocks spatially adjacent to the current block and the temporal motion information of the current block from the neighboring blocks temporally adjacent to the current block, determining a motion candidate index of the current block based on motion information of the current block and the motion candidate list;

determining a prediction method for the current block between uni-prediction or bi-prediction according to a size of the current block;

generating a prediction block of the current block by predicting the current block based on the prediction method and the motion information;

encoding information on the current block based on the prediction block of the current block; and generating a bitstream including the motion candidate index, temporal motion information reference picture information and the information on the current block, wherein the motion information of the current block includes prediction direction information and both of L0 motion information and L1 motion information, wherein, when the prediction direction information of the current block indicates a bi-prediction and a size of the current block is smaller than a pre-determined size, the prediction direction information indicating the bi-prediction is changed to indicate a uni-prediction and the prediction block of the current block is generated by performing motion compensation based on only the L0 motion information among the L0 motion information and the L1 motion information, and wherein, when the prediction direction information indicates the bi-prediction and the size of the current block is equal to or greater than the pre-determined size, the prediction direction information indicating the bi-prediction is not changed to indicate the uni-prediction and the prediction block of the current block is generated by performing the motion compensation based on both the L0 motion information and the L1 motion information, wherein, the temporal motion information reference picture information includes reference picture list information and reference picture index information, the reference picture list information indicating whether the temporal motion information reference picture is included in an L0 reference picture list or an L1 reference picture list, and the reference picture index information indicating an index of the temporal motion information reference picture in the reference picture list selected based on the reference picture list information.

7. The method of claim 6, wherein the L0 motion information includes an L0 motion vector and an L0 reference picture index, the L0 reference picture index is an index assigned to an L0 reference picture according to a picture order count (POC) order, the L1 motion information includes an L1 motion vector and an L1 reference picture index, and the L1 reference picture index is an index assigned to an L1 reference picture according to the POC order.

8. The method of claim 7, wherein generating the prediction block comprising:
   generating an L0 motion compensated block by performing L0 motion compensation on the current block based on the L0 motion information;
   generating an L1 motion compensated block by performing L1 motion compensation on the current block based on the L1 motion information; and
   generating the prediction block by performing a weighting average on the L0 motion compensated block and the L1 motion compensated block.

9. The method of claim 6, further comprising:
   determining whether default weighting prediction is applied to the current block or non-default weighting prediction is applied thereto,
   wherein the prediction block is generated by performing one of the default weighting prediction and the non-default weighting prediction according to the determination result.

10. The method of claim 9, wherein whether the default weighting prediction is applied to the current block or the non-default weighting prediction is applied thereto is indicated by a weighting prediction index.

11. A bitstream transmitting method to transmit a bitstream generated by a video encoding method, the bitstream transmitting method comprising:
   generating a bitstream by encoding video data based on the video encoding method; and
   transmitting the bitstream;
   wherein the video encoding method comprises:
   determining a prediction mode for a current block as an inter prediction mode;
   determining a temporal motion information reference picture including temporal motion information of the current block from a reference picture list;
   determining a temporal motion information reference block from the temporal motion information reference picture based on a spatial location of the current block;
   determining the temporal motion information of the current block from the temporal motion information reference block;
   determining a motion candidate list of the current block by using spatial motion information of the current block from neighboring blocks spatially adjacent to the current block and the temporal motion information of the current block from the neighboring blocks temporally adjacent to the current block,
   determining a motion candidate index of the current block based on motion information of the current block and the motion candidate list;
   determining a prediction method for the current block between uni-prediction or bi-prediction according to a size of the current block;
   generating a prediction block of the current block by predicting the current block based on the prediction method and the motion information;
   encoding information on the current block based on the prediction block of the current block; and
   generating the bitstream including the motion candidate index, temporal motion information reference picture information and the information on the current block,
   wherein the motion information of the current block includes prediction direction information and both of L0 motion information and L1 motion information,
   wherein, when the prediction direction information of the current block indicates a bi-prediction and a size of the current block is smaller than a pre-determined size, the prediction direction information indicating the bi-prediction is changed to indicate a uni-prediction and the prediction block of the current block is generated by performing motion compensation based on only the L0 motion information among the L0 motion information and the L1 motion information, and
   wherein, when the prediction direction information indicates the bi-prediction and the size of the current block is equal to or greater than the pre-determined size, the prediction direction information indicating the bi-prediction is not changed to indicate the uni-prediction and the prediction block of the current block is generated by performing the motion compensation based on both the L0 motion information and the L1 motion information,
   wherein, the temporal motion information reference picture information includes reference picture list information and reference picture index information,
   the reference picture list information indicating whether the temporal motion information reference picture is included in an L0 reference picture list or an L1 reference picture list, and
   the reference picture index information indicating an index of the temporal motion information reference picture in the reference picture list selected based on the reference picture list information.

* * * * *